(12) United States Patent
Meyrignac et al.

(10) Patent No.: US 12,079,453 B2
(45) Date of Patent: Sep. 3, 2024

(54) DEVICE, SYSTEM, AND METHOD FOR ELECTRONIC BOOK ENHANCEMENT

(71) Applicant: Cali's Books LLC, Los Angeles, CA (US)

(72) Inventors: Carinne Meyrignac, Los Angeles, CA (US); Michael Pursey, Los Angeles, CA (US); David S. Young, Berkeley, CA (US)

(73) Assignee: Cali's Books LLC, Los Angeles, CA (US)

( * ) Notice: Subject to any disclaimer, the term of this patent is extended or adjusted under 35 U.S.C. 154(b) by 0 days.

(21) Appl. No.: 17/964,322

(22) Filed: Oct. 12, 2022

(65) Prior Publication Data

US 2024/0126411 A1    Apr. 18, 2024

(51) Int. Cl.
 *G06F 3/0483* (2013.01)
 *G06F 3/04886* (2022.01)
 (Continued)

(52) U.S. Cl.
 CPC ........ *G06F 3/0483* (2013.01); *G06F 3/04886* (2013.01); *G06F 3/165* (2013.01); *G06F 3/167* (2013.01); *G06F 16/635* (2019.01)

(58) Field of Classification Search
 CPC .......... B42D 9/005; B42D 9/04; B42D 1/007; B42D 3/12; B42D 9/02; B42D 3/02; B42D 5/005; B42D 9/001; B42D 9/06; B42D 1/00; B42D 1/002; B42D 1/006; B42D 1/06; B42D 3/00; B42D 3/10; B42D 3/123; B42D 3/16; B42D 3/18; B42D 9/065; G06F 16/9535; G06F 16/24578; G06F 16/248; G06F 16/90335; G06F 16/9035; G06F 16/9537; G06F 16/24575; G06F 16/958; G06F 16/41; G06F 16/48; G06F 21/34; G06F 2221/2149; G06F 13/4027; G06F 15/00; G06F 16/2455; G06F 16/285; G06F 16/3331; G06F 16/335; G06F 16/93; G06F 16/955; G06F 16/9566; G06F 16/9577;
 (Continued)

(56) References Cited

U.S. PATENT DOCUMENTS 10,755,596 B1 *   8/2020   Rudie ................... G09B 19/00
2003/0170604 A1 * 9/2003   Mullen .................. B42D 1/007
                                                         434/317

(Continued)

*Primary Examiner* — Rayeez R Chowdhury
(74) *Attorney, Agent, or Firm* — Peter Jensen-Haxel

(57) ABSTRACT

Disclosed are a method, a device, a system, and/or manufacture of electronic book enhancement. In one embodiment, a device includes a housing, a book coupler to secure a book to the housing, a page detection sensor generating a page signal usable to determine an open page of the book, a computer processor, a computer readable memory, and an audio output device. The computer readable memory stores an audio dataset including one or more page UIDs, one or more associated audio files, and an audio routine that includes computer readable instructions that when executed receive the page signal from the page detection sensor, determine a page UID for the open page, query the audio dataset for the audio file associated with the page UID, and generate an audio signal of the audio file on the audio output device to enhance a reading experience of the book based on the open page.

20 Claims, 18 Drawing Sheets

(51) Int. Cl.
*G06F 3/16* (2006.01)
*G06F 16/635* (2019.01)

(58) Field of Classification Search
CPC ........ G06F 3/00; G06F 3/1205; G06F 3/1219;
G06F 3/1228; G06F 3/1239; G06F
3/1268; G06F 3/1273; G06F 3/1275;
G06F 3/1287; G06F 3/1288; G06F 3/167;
G06F 40/10
See application file for complete search history.

(56) References Cited

U.S. PATENT DOCUMENTS

| | | | | |
|---|---|---|---|---|
| 2008/0268415 | A1* | 10/2008 | Kwong | G09B 5/062 434/317 |
| 2010/0167258 | A1* | 7/2010 | Ravizza | B42B 5/12 434/317 |
| 2012/0188154 | A1* | 7/2012 | Lee | G06F 3/0483 345/156 |
| 2012/0310649 | A1* | 12/2012 | Cannistraro | G06F 16/685 704/260 |
| 2016/0148521 | A1* | 5/2016 | Bujsaim | G06F 3/0418 345/174 |

* cited by examiner

Book Enhancement Network 150

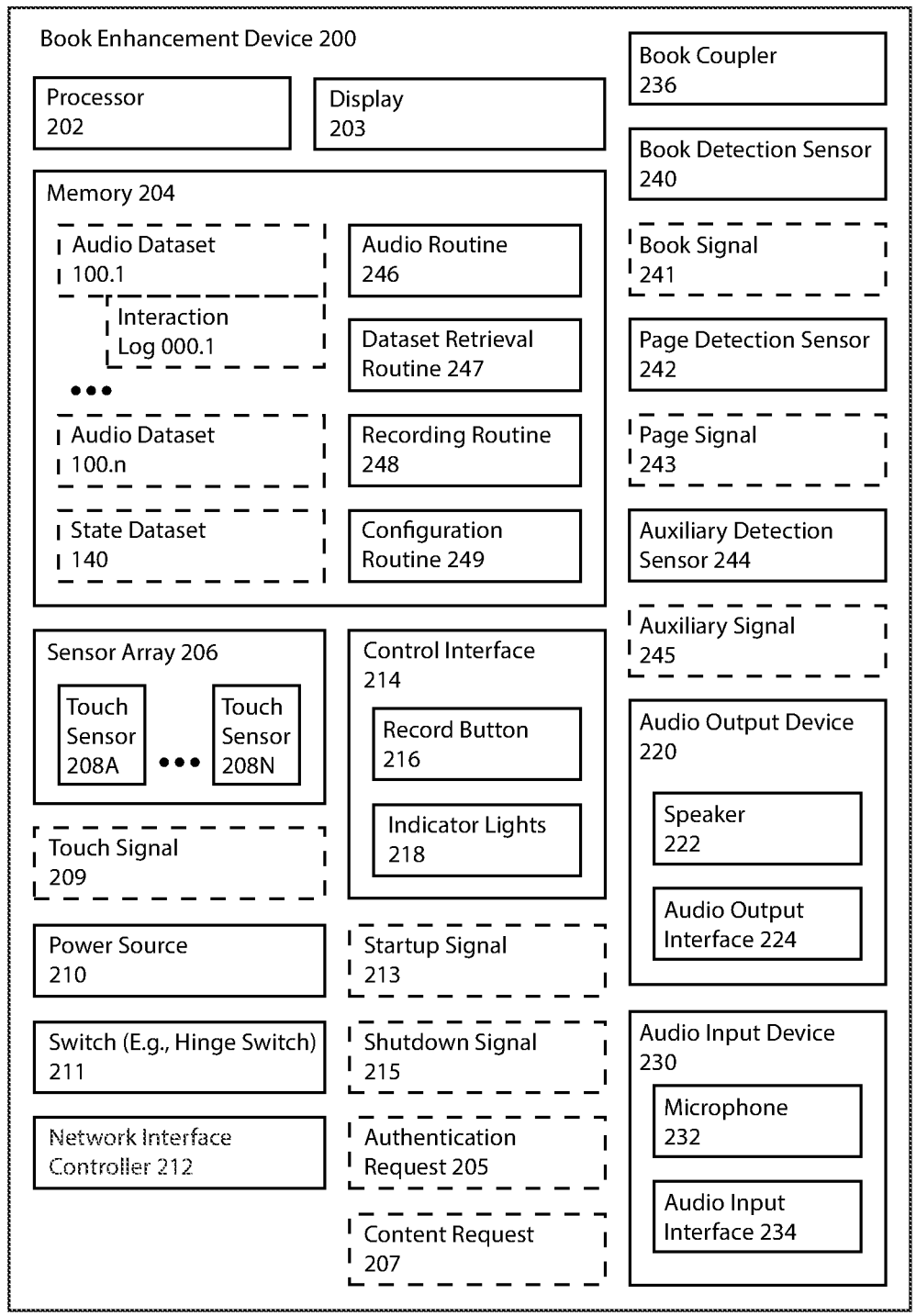
Fig. 2.1

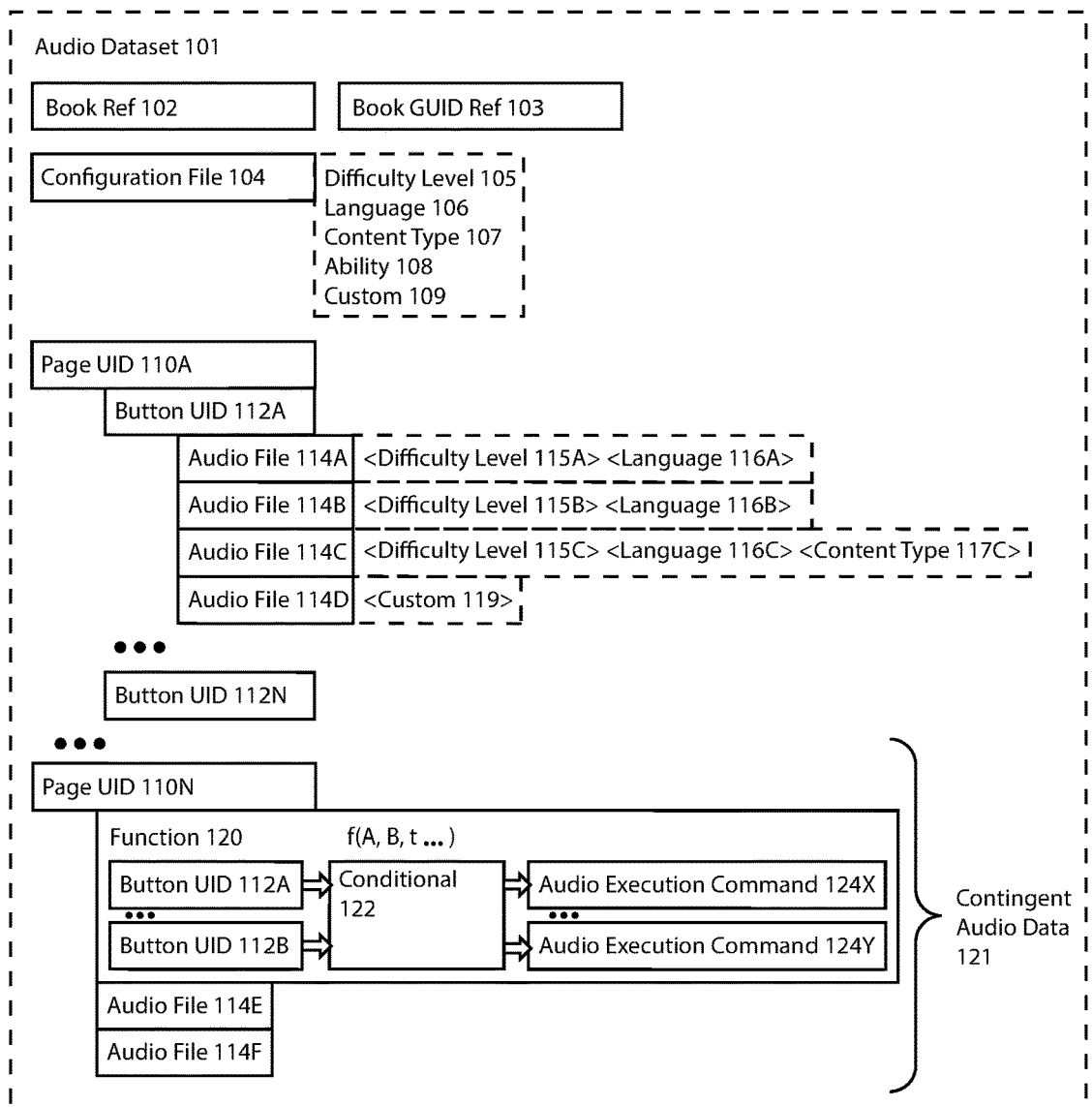
Fig. 2.2
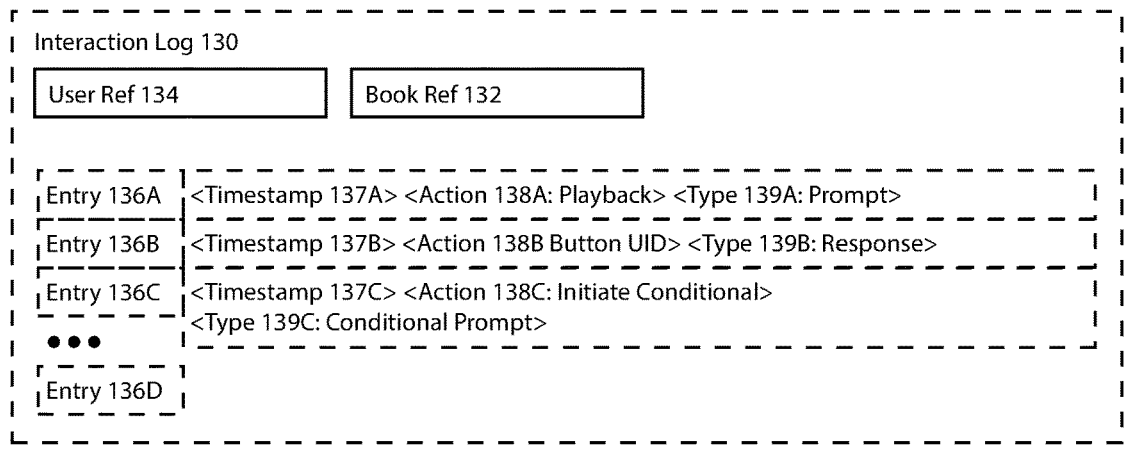
Fig. 2.3

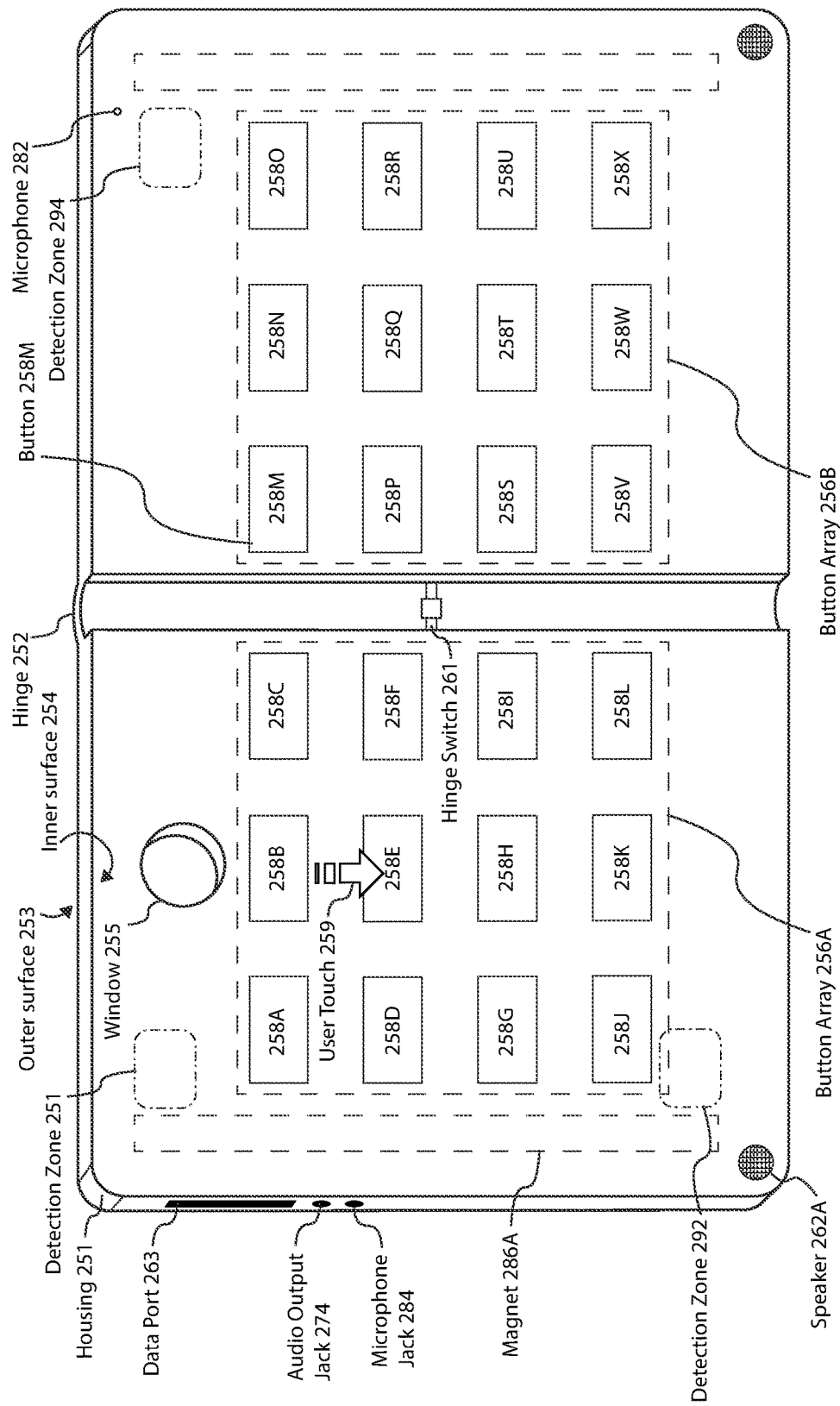

Book Provisioning Process Flow 750

Audio Dataset Generation Process Flow 850

Audio Dataset Generation Process Flow 950

Book Initiation Process Flow 1050

*Fig. 11*  Enhancement Execution Process Flow 1150

*Fig. 12*    Custom Content Generation Process Flow 1250

Group Enhancement Setup
Process Flow 1350

Interaction Log
Process Flow 1450

Voice Extension Process Flow 1550

DEVICE, SYSTEM, AND METHOD FOR ELECTRONIC BOOK ENHANCEMENT

FIELD OF TECHNOLOGY

This disclosure relates generally to data processing devices and, more particularly, to a method, a device, a system, and/or manufacture of electronic book enhancement.

BACKGROUND

There has been a proliferation of e-readers in the past decades. At the same time, people (e.g., users) continue to purchase and enjoy paper books. E-readers may have the advantage of a large catalog of almost instantly available content, the ability to backup and store notes or bookmarks, flexibility in content (e.g., interactive content), and other advantages. However, paper books continue to have a talismanic quality that many users treat as on-par or superior to e-readers or other electronic or digital reading platforms. Many users prefer the feeling of turning pages, and believe such interactions important for childhood development and building a lifelong connection with books in any format. There have been several attempts to design e-readers which are more book-like, for example creating a display screen which is black and white and has the texture of paper. At the same time, basic audio has been added to paper books, especially children's books, to encourage interaction and create new content opportunities for authors and publishers.

There is a continuing need to develop new electronics that have one or more advantages of both an e-reader and a traditional book, especially without diminishing the core experience of reading a paper book, which parents, teachers, and students still highly value.

SUMMARY

Disclosed are a method, a device, a system, and/or manufacture of electronic book enhancement. In one embodiment, a book enhancement device includes a housing that has an inner surface and an outer surface, a book coupler attached to the housing to secure a book to the housing, and a page detection sensor generating a page signal usable to determine an open page of the book. The book enhancement device also includes a computer processor communicatively coupled to the page detection sensor, an audio output device communicatively coupled to the computer processor, at least one of a speaker and an audio output interface, and a power source electrically coupled to the audio output device and the computer processor.

The book enhancement device also includes a computer readable memory communicatively coupled to the computer processor. The computer readable memory stores an audio dataset that includes one or more page UIDs and one or more audio files, each of the one or more page UIDs associated with an audio file within a data structure of the audio dataset. The computer readable medium also includes an audio routine that includes computer readable instructions that when executed on the computer processor: (i) receive the page signal from the page detection sensor, (ii) determine a page UID for the open page within the one or more page UIDs, (iii) query the audio dataset for the audio file associated with the page UID, and (iv) generate an audio signal of the audio file on the audio output device to enhance a reading experience of the book based on the open page.

The book enhancement may include one or more touch sensors distributed on the inner surface of the housing and communicatively coupled to the computer processor. The audio dataset may further include one or more button UIDs associated with each of the one or more page UIDs. Each of the one or more audio files may be associated with each of one or more button UIDs. The audio routine may further include computer readable instructions when executed on the computer processor receive a touch signal and query the audio dataset for the audio file associated with the button UID associated with the page UID.

The audio dataset may include a contingent audio data associated with at least one of the one or more page UIDs, the contingent audio data activating the audio file upon satisfaction of a conditional. An activation condition activating the audio file may include a sequence of two or more touch signals and/or a timing of one or more touch signals. The audio routine may further include computer readable instructions that when executed on the computer processor query the audio dataset for the contingent audio data associated with the page UID, detect two or more touch signals, and generate an input data that includes a button UID associated with each of the two or more touch signals. The audio routine may further include computer readable instructions that when executed pass the input data into a function evaluating the contingent audio data, determine satisfaction of the conditional, and generate an audio signal of the audio file on the audio output device to increase interactive options of the book for the user.

The book enhancement device may further include an audio input device communicatively coupled to the computer processor including a microphone and/or an audio input interface. The book enhancement device may include a recording button communicatively coupled to the computer processor. The computer readable memory further includes a recording routine that includes computer readable instructions that when executed receive an activation signal from the recording button, select a page UID (the page UID may be detected by the page detection sensor), optionally select a button UID (the button UID may be detected by the one or more touch sensors), receive an audio signal of a user on the audio input device, and record a user audio file of the audio signal. The user audio file may be stored in the audio dataset in association with the page UID, and optionally the button UID of the page UID. The computer readable memory may further include a custom playback subroutine that includes computer readable instructions that when executed switch between playback of the audio file and the user audio file.

The book enhancement device may also include a hinge in the housing allowing a first portion of the inner surface to fold onto a second portion of the inner surface. A hinge switch that may be included in the book enhancement device may generate an open signal when the first portion and the second portion are greater than a first angle, and generate a closed signal when the first portion and the second portion are detected to be less than a second angle. The computer readable memory may further includes a shutdown routine that includes computer readable instructions that when executed turn off the power source and/or place the computer processor in a power conservation mode.

The computer readable memory may further include a state dataset that may include a page UID of a last open page, a page UID of a previous open page, a button UID of a last button for which the touch signal was detected, a button UID of a previous button for which the touch signal was detected, an audio UID of a last instance of the audio file that was played, and/or an audio UID of a previous instance of the audio file that was played. The computer readable memory may further includes a state storage routine includes computer readable instructions that when executed detect a shutdown signal, store the state dataset, detect a startup signal, and retrieve the state dataset.

The computer readable memory further includes a configuration file that includes a different page UID associated with a configuration page of the book. The computer readable memory may further include a configuration routine includes computer readable instructions that when executed: (i) detect the different page UID associated with the configuration page of the book, (ii) detect the touch signal, (iii) determine the button UID associated with the touch signal, (iv) query the configuration file for a configuration option associated with the button UID, and (v) set the configuration option of the configuration file to enable customization of the reading experience using the configuration page of the book as a user interface.

The computer readable memory may also include an interaction log storing a first interaction entry associated with a prompt for the user and a second interaction entry associated with a response of the user. Each of the first interaction entry and the second interaction entry may include a timestamp from which an elapse time from the prompt to the response can be calculated.

The book enhancement device may also include a window in the housing such that a visual identifier of the book may be visible to the user when the book is mounted in the housing even when the hinge is closed. The book enhancement device may include a data port, where the computer readable memory can be installed in the data port and may be removable. The book enhancement device may include a wireless network interface controller. The wireless network interface controller may be a Bluetooth controller and/or a WiFi controller.

The computer readable memory further may include a configuration beacon subroutine that includes computer readable instructions that when executed detects a configuration beacon attachable to the book and automatically adjusts the configuration option of the configuration file.

The audio dataset may include a book UID identifying the book. The page detection sensor may include: (i) a magnetic sensor detecting a magnetic ink on a page of the book, (ii) an optical sensor determining a pattern on the page of the book, (iii) a light sensor determining light input received through one or more sheets of the book, and/or (iv) an electronic proximity detector for detecting a beacon coupled to one or more sheets of the book. The electronic proximity detector may be a near-field communication (NFC) detector and/or a radio frequency identifier (RFID) detector. The one or more touch sensors defined on a touch sensor pad may have an x-axis and a y-axis forming a touch plane on the first portion of the inner surface and/or the second portion of the inner surface. The one or more touch sensors may be arranged in a grid on the first portion of the inner surface and/or the second portion of the inner surface. The book coupler may also include a magnet.

In another embodiment, a book enabling audio and interactive enhancement includes two or more sheets bound with a binding, each sheet of the two or more sheets including two pages. The book includes a book identifier electronically storing a book UID readable with a book detection sensor and one or more beacons storing a page UID readable by a page detection sensor to enable detection of an open page which a user is reading and/or interacting to enable automatic and/or interactive content enhancement.

The book may include a visual content on one or more pages of the book that includes one or more interaction indicators for receiving a touch input of a user. An interaction indicator of the one or more interaction indicators may be positioned on the page for communicative coupling with a touch sensor of a book enhancement device.

The book may include one or more magnets attached to a sheet of the two or more sheets configured to couple to a magnet of the book enhancement device while still enabling flexing of the sheet of the two or more sheets. The magnet may include a magnetic strip that is embedded in a first sheet of one or more sheets of the book such that that the magnetic strip is hidden from view and the book remains softback when uncoupled from the book enhancement device.

The book may include a beacon of the one or more beacons that is assigned to the two or more sheets, and two or more interaction indicators may be allocated among the two or more sheets such that a page UID and button UID pairing that is unique within the book may be determined with minimal use of beacons. The book identifier may electronically store a book GUID readable with the book detection sensor that uniquely distinguishes a copy of the book having a book title and a book content against other copies of the book having the book title and the book content. A page of the book may further include a configuration indicator for receiving an attachable beacon that when detected by the book enhancement device can automatically change a configuration option of a configuration file.

In yet another embodiment, a method for electronically enhancing a book includes selecting a page UID of a page of the book that includes a beacon physically coupled to the page of the book and selecting a button UID associated with the interaction indicator visible to a user on the page of the book. The method receives a first audio signal, stores an audio file of the first audio signal, and generates an audio dataset associated with a book UID on a computer readable memory. The method associates within the audio dataset the page UID, the button UID, and the audio file such that the book can be sound enhanced when the user turns to the page associated with the page UID and selects an interaction indicator associated with the button UID.

The method may also select the page UID of the page of the book, select the button UID associated with the interaction indicator, and receive a second audio signal. The method may then store an audio file of the second audio signal and associate within the audio dataset the page UID, the button UID, and the audio file of the second audio signal such that the book can be alternatively enhanced when the user turns to the page associated with the page UID and selects the interaction indicator associated with the button UID.

The method may store within a configuration file data specifying the audio file of the first audio signal and the audio file of the second audio signal. The audio file of the first audio signal may include a first language, a first difficulty level, and/or a first content type. The audio file of the second audio signal may include a second language, a second difficulty level, and/or a second content type.

The method may store within a configuration file data specifying the audio file of the first audio signal and the audio file of the second audio signal. The audio file of the first audio signal may include a default content and the audio file of the second audio signal may include a custom content. The method may select a second button UID associated with a second interaction indicator visible to a user on the page of the book, and define a function that includes a first input that is a first button UID and a second input that is the second button UID, the function upon satisfaction of a conditional outputting an audio execution command for generation of an audio signal of the audio file on an audio output device to enhance complex interaction with the book.

The method may further generate an interaction log including the book UID, detect a first touch signal of the user, generate an interaction entry including an elapse time from a previous instance of a touch signal, and compare one or more interaction entries of the interaction log. The method may then determine the interaction entry is less than an interaction threshold and automatically update a configuration file data such that the audio file of the second audio signal is played when a second touch signal is received to automatically adjust a first difficulty level to a second difficulty level to improve an enhanced reading experience of the user.

The method may additionally generate a book GUID and embed the book GUID in a book identifier electronically readable by a book detection sensor and store a second audio file and/or the configuration file data on a server in association with the book GUID. The method may detect mounting of the book in a book enhancement device, determine the book GUID is absent from a computer readable memory of the book enhancement device, generate a content request for a custom content associated with the book, and download to the computer readable memory of the book enhancement device the second audio file and/or the configuration file data from the server over a network. This may enable the custom content to be transferred with the book between book enhancement devices.

BRIEF DESCRIPTION OF THE DRAWINGS

The embodiments of this disclosure are illustrated by way of example and not limitation in the figures of the accompanying drawings, in which like references indicate similar elements and in which:

FIG. 2.1 illustrates the book enhancement device of FIG. 1, including a memory storing a set of routines for playing and generating enhancements such as audio files, a sensor array comprising one or more touch sensors, a book coupler, a page detection sensor, and/or other elements, according to one or more embodiments.

FIG. 2.2 illustrates an enhancement dataset associated with a book enabling flexible enhancement of the book, and specifically illustrates an audio dataset comprising an audio enhancement as may be customer defined by a user, according to one or more embodiments.

FIG. 2.3 illustrates an interaction log storing interaction data of a user with a book coupled with the book enhancement device, according to one or more embodiments.

FIG. 2.4 illustrates an example of the book enhancement device of FIG. 2.1, implemented as a book-binding with incorporated electronics, the book enhancement configured to allow for coupling of a that is or can be enhanced, including a detection zone for detecting a book identifier of the book, detection zones for detection of an open page of the book, and many other elements, according to one or more embodiments.

Other features of the present embodiments will be apparent from the accompanying drawings and from the detailed description that follows.

DETAILED DESCRIPTION

Disclosed are a method, a device, a system, and/or manufacture of electronic book enhancement. Although the present embodiments have been described with reference to specific example embodiments, it will be evident that various modifications and changes may be made to these embodiments without departing from the broader spirit and scope of the various embodiments.

Figure 1:
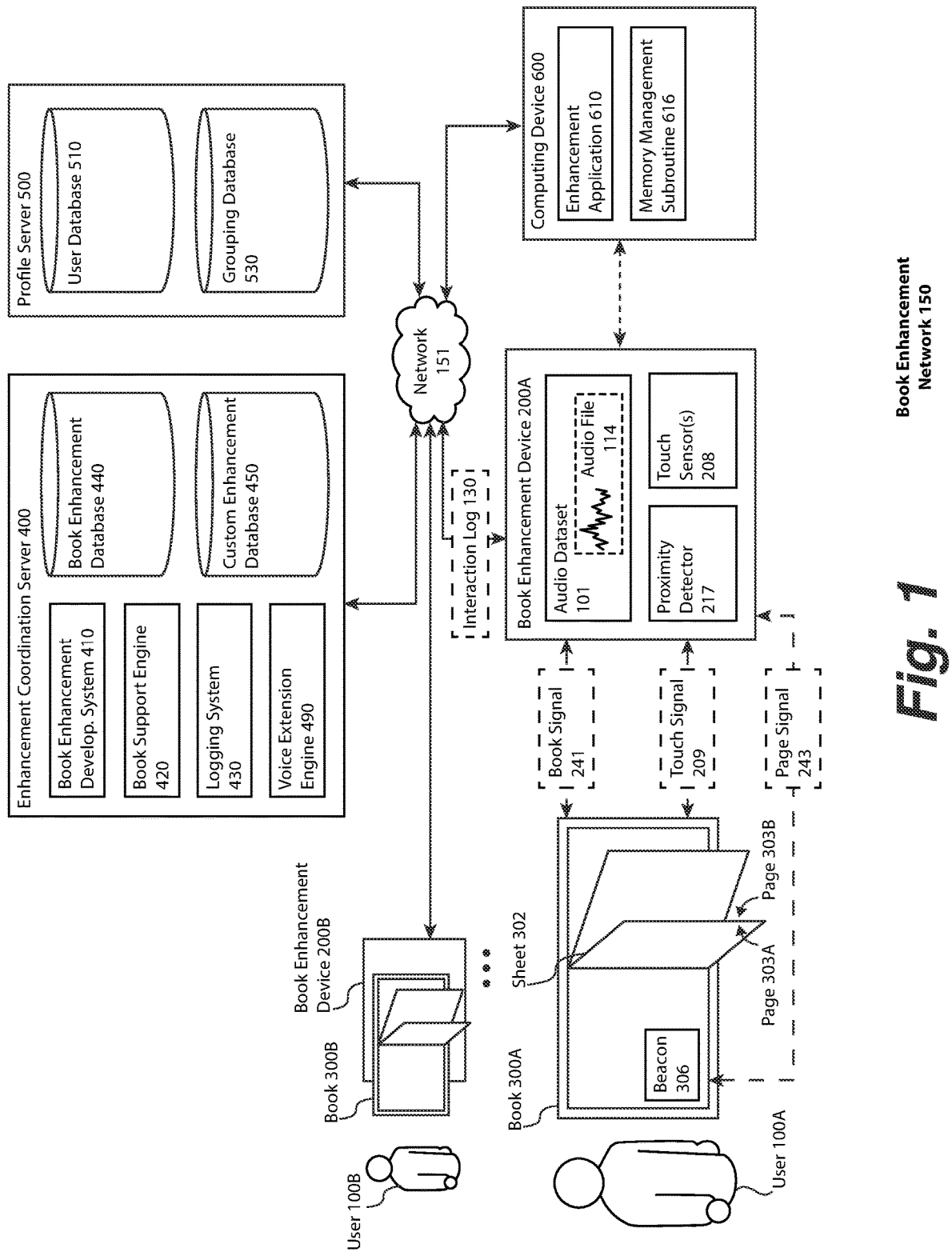
FIG. 1 illustrates a book enhancement network including a book enhancement device that can be coupled to a book to enhance the experience of a user reading the book, for example with audio and/or interaction such as when the user touches the book or turns a page, the book enhancement network further including a computing device such as a smartphone, a coordination server, and a profile server usable to create and coordinated shared learning and/or shared enhancement experiences, according to one or more embodiments.

FIG. 1 is a book enhancement network 150, according to one or more embodiments. In one or more embodiments, the book enhancement network 150 includes one or more instances of a book enhancement device 200, each of which may be coupled to one or more books 300 to be read by a user 100. The book enhancement network 150 may further include a coordination server 400, a profile server 500, and/or a computing device 600, each communicatively coupled, including to each of the one or more instances of the book enhancement device 200, through a network 151. The network 151 may be a communication network such as a local area network (LAN), a wide area network (WAN), and/or the internet.

As further shown and described in conjunction with FIG. 2.1 through FIG. 2.4, the book enhancement device 200 may enable electronic and/or digital enhancement of a book 300, for example with enhancements such as sound, vibration, lighting, visuals, and/or other sensory enhancements perceivable to the user 100. In one or more embodiments, such enhancements may be designed to carefully enhance the experience of reading the book 300, for example which may be a paper book that may comprise paper or paper-like pages and thus retain many traditional qualities. In one or more embodiments, the enhancements may occur due to interaction of the user 100 with the book 300, such as turning pages, touching visual indicators on the pages, and assessing other interactions of the user 100 with the book 300, as shown and described throughout the present embodiments. The books 300 may be detachable and interchangeable, which may create a reusable platform with a large library of enhanceable books 300.

In one or more embodiments and the embodiment of FIG. 1, the book enhancement device 200A includes an enhancement dataset that includes at least one enhancement having a specified trigger, such as sensing a touch of the user 100 or a turning sheet 302 of the book 300. In one or more embodiments and the embodiment of FIG. 1, the book enhancement device 200A may include an audio dataset 101 that is an enhancement dataset that includes at least one audio file 114 having a specified trigger, such as sensing a touch of the user 100 or a turning sheet 302 of the book 300. The enhancement dataset, including one instance of a data structure therefore illustrating the audio dataset 101, is shown and described in conjunction with FIG. 2.2, FIG. 7, FIG. 8, and FIG. 9. The book enhancement device 200A may include one or more proximity detectors 217 that may detect proximity to a book or page, for example by detecting one or more beacons 306 coupled to the book 300. For example, the book detection sensor 240, the page detection sensor 242, and/or the auxiliary sensor 244 are each examples of a proximity sensor 217, according to one or more embodiments. Such beacons (e.g., the beacon 306, the beacon 307, the beacon 309) may be used to detect an instance of the book 300 coupled to the book enhancement device 200A (by communication of a book signal 241), a currently open page 303 that the user 100 may be actively reading and/or interacting with (e.g., by communication of a page signal 243), and/or additional enhancement instances of the beacon that may be used to change a configuration of the audio dataset 101 and/or otherwise change an enhancement for the user 100 (e.g., the configuration indicator 310 as shown and described in conjunction with FIG. 3).

One or more instances of the book 300, for example each with a different title and content, may be able to be coupled to the book enhancement device 200, according to one or more embodiments. In one or more embodiments, the book 300 may be a book with flexible pages (e.g., made of paper or polymer) and may have a traditional book binding. As used throughout the present embodiments, a sheet 302 may be used to refer to a full piece of paper or similar material of the book 300 up to the binding, and the sheet 302 may comprise a page 303A and a page 303B on the front and back, respectively. As shown in FIG. 1, the book 300A may include one or more detectable beacons 306. As further shown and described in conjunction with the embodiment of FIG. 3, the book 300 may include content (e.g., text, pictures, drawings, prompts or areas for the user 100 to add text or drawing, etc.), interaction indicators 358 (e.g., area on a page 303 that interface with detectors of the book enhancement device 200 when the book 300 is coupled to the book enhancement device 200), and couplers configured to allow coupling between the book 300 and the book enhancement device 200. It should be noted that a detachable capability of the book 300 may enable a first user 100A to share the book 300 with a second user 100B that may own and/or have access to a different instance of the book enhancement device 200B, according to one or more embodiments. Detachability may also allow libraries, educational institutions, and other organizations to purchase a "library" of instances of the book 300A that may allow for users 100 to borrow, trade, or exchange the book 300.

At the same time, the book enhancement device 200 may enable flexible and adaptable content subscriptions. For example, as will be further shown and described throughout the present embodiments, the user 100 may be able to install and/or download updated versions of the audio dataset 101, for example that: (i) fix a typo or error; (ii) provide new configuration options, such as audio in the Spanish language or a new difficulty level of interactive content; (iii) a special edition version such as a reading by a celebrity or commentary from the author; (iv) custom content created by another user (e.g., the user 100B creating content for the user 100A, as may be delivered through the network 151); and/or (v) a user 100 who may be a teacher or organizer creating content for a group or class (e.g., the user 100A and the user 100B may be students or otherwise members of the group). Although the audio dataset 101 is shown, it will be appreciated that the audio dataset 101 may include non-audio enhancements. In a more general form, the book enhancement device 200 may store an enhancement dataset. For example, in one or more embodiments, it is possible that all enhancements of the book 300 may be visual (e.g., changes in lighting of LEDs on the book enhancement device 200 to reinforce the content of the book, the time of day in the story, the narrative "mood" of a chapter as determined by the author or publisher, etc.).

The book enhancement device 200 may be designed for different form factors depending on the target audience and/or consumer. For example, the sensors and enhancements of one version may be appropriate to corporate training seminars, while another form factor may be best suited toward users 100 that are children. As just one example, a children's version of the book enhancement device 200 may require touch sensors 208 that are more spread out and a stronger material selected for the housing 251, as each are shown and described in conjunction with FIG. 2.1 and FIG. 2.4. Many more aspects, capabilities, features, and embodiments of both the book enhancement device 200 and the book 300 will be shown and described throughout the present embodiments.

In one or more embodiments, the book enhancement device 200 may operate as a stand-alone electronic device without support of any other devices or networks. For example, the book enhancement device 200 may come preinstalled with a library of the audio dataset 101 and/or may be have a data port (e.g., the data port 263) to receive a data card or memory stock comprising new or updated content associated with one or more books 300 purchased by the user 100. However, in one or more other embodiments, the book enhancement device 200 may be serviced by, supported by, and/or interface with one or more other devices over a network 151.

In one or more embodiments, a coordination server 400 may be utilized to create and manage content for the book enhancement device 200, for example content created by book publishers and/or custom content of a user 100. The user 100 may then select and download content, for example an enhancement dataset such as the audio dataset 101, from the coordination server 400. The coordination server 400 may also provide operating system upgrades, security updates, and/or firmware updates to the book enhancement device 200, according to one or more embodiments.

In one or more embodiments, the coordination server 400 may include a book enhancement development system 410 usable to define the enhancement dataset such as the audio dataset 101. The coordination server 400 may further include a book support engine 420 that may authenticate books 300, initialize content, and/or synchronize data and files stored on the book enhancement device 200 (and/or the computing device 600) with the coordination server 400 and/or the profile server 500. In one or more embodiments, the coordination server 400 may include a logging system 430 that may be used to log, evaluation, and/or take actions in response to various logged interactions between the user 100 and the book 300, for example detecting difficulty the user 100 may be experiencing and, in response, changing a configuration option for the enhancement of the book 300.

The coordination server 200 may include a voice extension engine 490 that may allow a voice sample of a user 100 to be extended to other content, e.g., to have the voice of the user 100 read an entire book 300. This feature may be useful, for example, for grandparents who desire for a grandchild to hear their voice reading one or more books 300, yet are unable to record content for all text due to time, health, or disability constraints. In one or more embodiments, the coordination server 400 may include a book enhancement database 440 storing one or more enhancement datasets such as the audio datasets 101 that may be each associated with a book 300. The coordination server 400 may also include a custom enhancement database 450 that may include custom enhancements and/or audio of a user 100, for example as may be created by the user 100A for personal use (e.g., the commentary of the user 100 while reading the book 300), created by the user 100A for the user 100B (e.g., a child reading a book for another child who is a friend), and/or a user 100C (e.g., a course taught by a teacher for the students who may be the user 100A and the user 100B). Many more possible aspects of the coordination server 400 are illustrated in conjunction with the embodiment of FIG. 4.

In one or more embodiments, the book enhancement network 150 may include a profile server 500. The profile server 510 may be utilized to store one or more user profiles 521 remotely. The user profile 521 may allow for authentication of the book enhancement device 200 and/or users 100, designation of ownership of a book 300, the storage and management of purchased content (including downloadable content, or DLC to further enhance an audio dataset 101), the storage and management of custom content, and other purposes that will be evident to one skilled in the art of computer science. The profile server 500 may also include a grouping database 530 that may be used to group user profiles 521 to designate groups of users 100 (e.g., seminar groups, elementary school classes, book clubs, etc.) that may be sharing content generated by one or more members of the group.

In one or more embodiments, the book enhancement network 150 may further include a computing device 600, for example a smartphone, tablet, laptop, or PC of the user 100A. The computing device 600 may be used support the book enhancement device 200, for example with a mobile or desktop application assisting with the content download and installed content management (e.g., through a memory management subroutine 616). For example, an enhancement application 610 may display to the user 100 which audio datasets 101 are currently stored on the book enhancement device 200, what their configuration options are (e.g., language, difficulty), and/or may be used to manage a parental control (e.g., not letting certain books 300 be utilized with the book enhancement device 200 without "unlocking" the book 300). In one or more other embodiments, the computing device 600 may be a device of a different user 100C who may generate content for a group (e.g., a teacher using a PC application to generate content for each of the user 100A and the user 100B). The computing device 600 may also comprise an enhancement application 610 that aids in the creation of custom content, for example helping the user 100 through visual prompts on a display of the computing device 600 and/or using a microphone of the computing device 600 to record the user 100. However, it should be noted that in one or more embodiments and as described throughout the specification, custom content may be created directly on the book enhancement device 200 without support of the computing device 500 and/or the network 151.

The book enhancement network 150 therefore provides a flexible system in which a plurality of book enhancement devices 200 may enhance a library of books 300 (that may emulate the experience of paper books) for a number of users 100, with robust support for updating enhancement content, developing new content, developing custom content, and coordinating effective group experiences and studies, according to one or more embodiments. It is possible for the book enhancement network 150 to be comprised of disparate components and profiles, each of which may be individually tracked. For example, some users 100 may own a book enhancement device 200 while others may borrow or rent one. At the same time, some users 100 may own a book 300 while others may borrow or rent. Some users 100 may utilize the support of a computing device 600 to manage the book enhancement device 200 while others may not. Designation and management of "enhancement units" through which custom content, configuration, state, and/or logs can be tracked is further shown and described throughout the present embodiments. Each of the components will now be further described, starting with the book enhancement device 200, the audio dataset 101, and the book 300 in FIG. 2.1 through FIG. 3.

FIG. 2.1 illustrates the book enhancement device 200, according to one or more embodiments. The book enhancement device 200 may include a processor 202 such as a computer processor or microcontroller (e.g., MCU) and a memory 204 that is a computer readable memory such as a solid state memory (e.g., SATA drive), a magnetic memory (e.g., a hard disk), etc. The book enhancement device 200 may also include a display 203. However, it should be noted that in one or more embodiments the display 203 may be omitted to help re-enforce the traditional aspect of the book 300 that may be coupled to the book enhancement device 200. Although not shown connected, it will be recognized that each of the components in FIG. 2.2 may be communicatively coupled, for example, the processor 202, the memory 204, the sensor array 206, the power source 210, the network interface controller 212, the control interface 214, the book detection sensor 240, the page detection sensor 242, the audio output device 220, and/or the audio input device 230.

In one or more embodiments, the book enhancement device 200 may generate an authentication request 205, for example to authenticate the book enhancement device 200 and/or a book 300 within a service offered by a company running the coordination server 400 and/or the profile server 500, according to one or more embodiments. For example, a user 100 may need to log into a user profile 521, especially if the user 100 is borrowing the book enhancement device 200. Similarly, the authentication request 205 may be generated to verify authenticity of a book 300, for example to determine if a book UID 441 and/or a book GUID 443 is registered in a database such as the book enhancement database 440.

The book enhancement device 200 may also generate a content request 207, for example where the book enhancement device 200 is communicatively coupled with the computing device 600 and/or the coordination server 400. In one or more embodiments, the content request 207 may be initiated in response to a determination that the memory 204 does not contain a needed and/or updated version of the audio dataset 101, as further described with referenced to the dataset retrieval routine 247, below. In one or more embodiments, the content request 207 may be initiated by the coupling of a book 300 to the book enhancement device 200, for example through automatic detection of the book 300 and a book signal 241 identifying the book 300, as also further described below.

In one or more embodiments, the book enhancement device 200 may include a sensor array 206 that may include sensors for interactions of the user 100 with the book 300. The sensor array 206 may include a number of sensors, generically referred to as the sensor 113 (not shown), that may sense a variety of interactions and/or inputs from the user 100. For example, other sensors 113 may include a touch sensor detection contact in the x-y plane, an accelerometer, a gyroscope sensor, a pressure sensor, a proximity sensor, a magnetometer, or other sensors, such as sensors wirelessly connected to the book enhancement device. For example, in one or more embodiments the sensor array 206 may include a set of touch sensors 208 (e.g., the touch sensor 208A through the touch sensor 208N). In a specific example, the touch sensor 208 may be a button (e.g., the button 258 of FIG. 2.4), a resistive sensor, and/or other types of touch sensor. Each sensor may generate a sensor signal, for example the touch sensor 208 may generate a touch signal 209 when activated by the user 100 that may initiate a query of the enhancement dataset such as the audio dataset 101. In one or more embodiments, the sensor array 206 and/or each of the included touch sensors 208 may be arranged in a grid on the inner surface 254 of the book enhancement device 200, for example, as shown in FIG. 2.4, a first portion of the sensor array 206 is on the left-hand side of the inner surface 254 and the second portion of the sensor array 206 is on the right-hand side of the inner surface 254.

The book enhancement device 200 may include a power source 210, for example a battery that may be replaceable and/or rechargeable, a DC power supply that may be plugged into a wall socket, a solar panel, and/or other power sources. In one or more preferred embodiments, the book enhancement device 200 may include an integrated rechargeable battery that may be charged through a power adapter and/or a USB adapter.

The book enhancement device 200 may include a switch 211 that may be used to automatically turn the book enhancement device 200 on or off, and/or initiate a sleep mode. For example, the book enhancement device 200 may include a shutdown routine (not shown) comprising computer readable instructions that when executed turn off the power source 210 and place the computer processor 202 in a power conservation mode. The shutdown routine may be initiated by a shutdown signal 215, which may result from activation of the switch 211. In one or more embodiments, the switch 211 may be a mechanical switch that may reinforce the traditional aspect of the book 300 such as the hinge switch 261. As shown and described in conjunction with FIG. 2.4, the hinge switch 261 may allow for automatic shutdown and/or a power saving mode when the book enhancement device 200 is "closed" (for example where the book enhancement device 200 includes a hinge 252 to emulate a book binding and hardback cover surrounding the book 300, as further described below). Upon opening, the switch 211 may cause generation of a startup signal 213, and upon closing may generate a shutdown signal 215, according to one or more embodiments.

In one or more embodiments, the book enhancement device 200 may include a network interface controller 212, for example for wired and/or wireless communication over the network 151 (including via WiFi®, ethernet, cellular protocols such as LTE and/or 5G, low earth orbit satellite protocols, etc), or wired or wireless pairing with the computing device 600 (e.g., via USB-C connection, Bluetooth®, etc.).

The book enhancement device 200 may include a control interface 214 that may allow for certain control functions and communication to the user 100, for example a set of one or more indicator lights 218 and/or a record button 216, according to one or more embodiments. As one example, the indicator lights 218 may be used to indicate to the user 100 when an audio dataset 101 is being loaded (e.g., a yellow light) and when the audio dataset 101 is ready to be utilized for the coupled book 300 (e.g., a green light). As another example: indicator lights 218 may communicate usage information, such as indicating progress towards completing a workbook's activities content, or notifying that new content is available. In one or more other embodiments, the indicator lights 218 may indicate when a classroom evaluation is to start or stop (e.g., yellow indicates only 5 minutes of the test remain, red indicates the test should be stopped). The indicator lights 218 may also communicate when new custom content is available, for example a recording from a family member or new DLC. The record button 216 may be a dedicated button that may allow for the recording of audio and/or other enhancements of the book 300 on the book enhancement device 200, according to one or more embodiments. For example, creating custom content directly while holding the book 300 may help reinforce the traditional nature of the book 300, and provide a natural interface, for the user 100 to interact directly with the book while recording audio. As further shown and described below, the user 100 may turn a sheet 302 to a new page 303, then depress the record button 216 or otherwise activate the recording function to record an audio file 114 that will automatically play when a different user 100 first turns to that page 303. Similarly, the user 100 may activate a touch sensor 208 and then depress the record button 216 to record audio that will play when the different user 100 activates that touch sensor 208. Alternatively, or in addition, the book enhancement device 200 may be programmed to allow for recording when the user 100 depresses and holds a touch sensor 208 (e.g., creates a prolonged or continuous touch signal 209).

The book enhancement device 200 may include a book coupler 236 that is configured to couple the book 300 to the book enhancement device 200, according to one or more embodiments. In one or more embodiments, the book coupler 236 may be attached to the housing 251 to secure a book 300 to the housing 251. It should be noted that in one or more embodiments, such physical coupling may not be necessary (the book 300 could be placed on top of the book enhancement device 200, or coupled through detachable means such as bands). The book coupler 236 may assist in enhancing the traditional aspect of the book 300 (e.g., creating the feeling of a "single piece" in the hands of the user 100, especially where the book enhancement device 200 is configured to feel like a book binding and hardback cover). The book coupler 236 may also assist in aligning the sensor array 206 and/or other sensors with interaction indicators and/or beacons of the book 300, and/or may assist in protecting the book 300 during storage and transport. The book coupler 236, for example, may include a variety of fasteners or fastening methods as may be known in the art. In one or more embodiments, the book coupler 236 may include mechanical fasteners (e.g., friction fit pegs, screws), adhesive fasteners (e.g., tape, tacky adhesive surfaces), clips (e.g., similar to a clipboard), folding tabs that hold the book 300 in place, and/or magnets (e.g., as illustrated in the embodiment of FIG. 2.4 and FIG. 3). Other book couplers 236 will be evident to one skilled in the art. The book 300 may have a corresponding portion of the fastener to implement the book coupler 236.

In one or more embodiments, the book 300 may comprise a book identifier that comprises information that can be used to identify the book 300 for purposes of loading and/or querying a correct instance of the enhancement dataset to render the enhanced reading experience. In one or more embodiments, the book identifier may be a written code that the user 100 can enter on the book enhancement device 200 and/or in a supporting application (e.g., the enhancement application 610, for example running on the computing device 600). In one or more embodiments, the book identifier may electronically store the information, for example a book UID 441 and/or book GUID 443. The book identifier may be readable with a book detection sensor 240.

Figure 3:
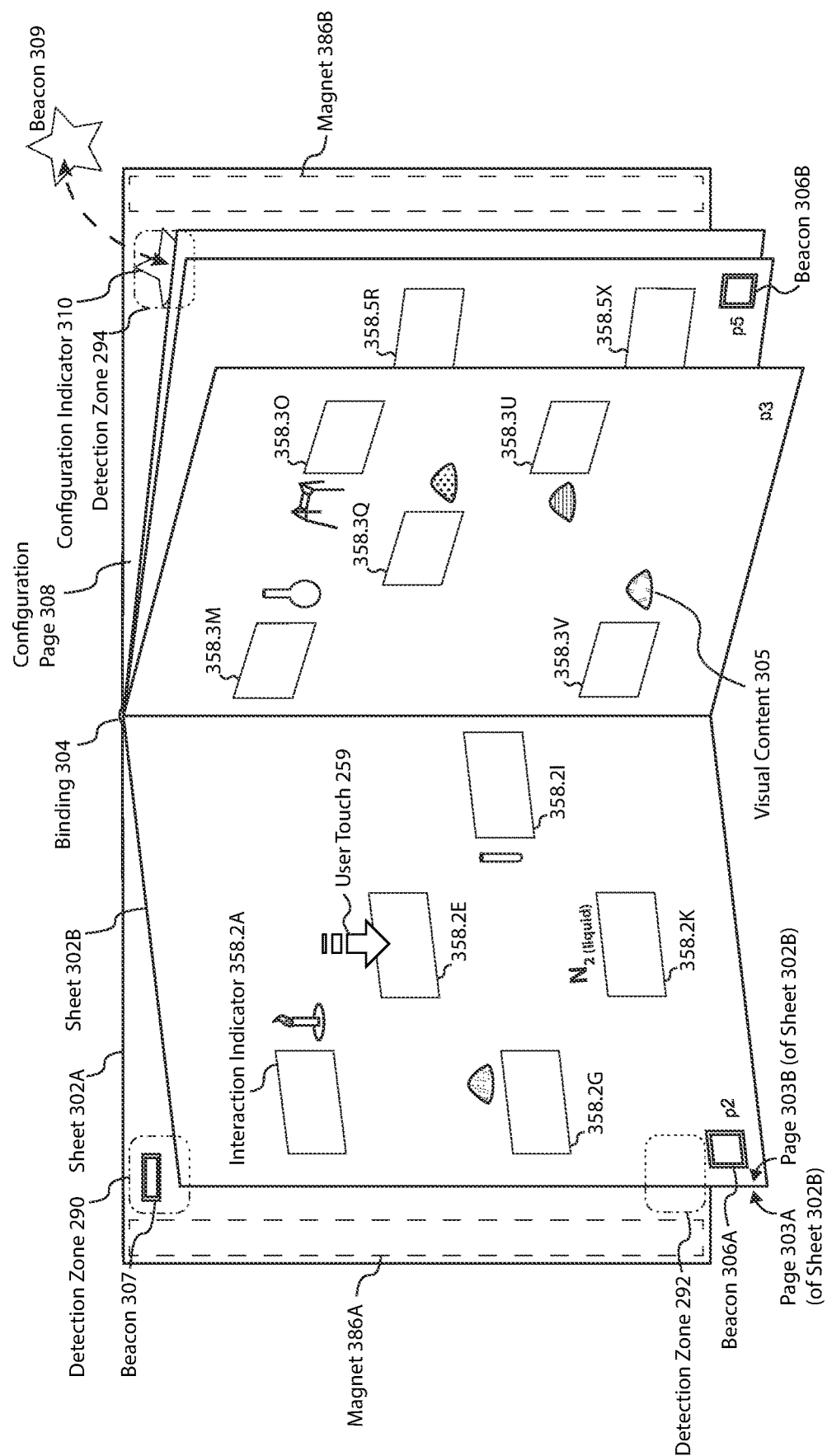
FIG. 3 illustrates a book which may be coupled to the book enhancement device, for example the book enhancement device of FIG. 2.4, the book including a beacon implementing the book identifier of the book, a set of beacons for identification of an open page, and a set of interaction indicators that may be associated with touch sensors distributed on the book enhancement device, according to one or more embodiments.

The book enhancement device 200 may include a number of sensors, each of which may sense one or more beacons or other sensible elements of the book 300 to derive signals and/or information usable for selecting the audio dataset 101 and/or triggering enhancements such as playback of an audio file 114. In one or more embodiments, a book detection sensor 240 may be utilized to detect a beacon 307 (e.g., as shown in FIG. 3) that may carry information (e.g., information that may be carried or embodied in the book signal 241) identifying the book 300, for example a book UID 441 and/or a book GUID 443. In one or more embodiments, the book detection sensor 240 may comprise an RFID sensor (e.g., detecting and/or reading an RFID chip of the book 300), a nearfield communication sensor (e.g., detecting and/or reading an NFC chip of the book 300), and/or an optical sensor (e.g., detecting and/or reading a barcode, QR code, and/or other optical code of the book 300). The book detection sensor 240 is further shown and described in conjunction with the embodiment of FIG. 2.4 and FIG. 3.

In one or more embodiments, the book enhancement device 200 may include a page detection sensor 242 generating a page signal 243, for example upon the turning of a sheet 302 of the book 300 such that there is a new active and/or currently viewed page 303 by the user 100. For example, the page detection sensor 242 may be placed in a lower left-hand corner of the book enhancement device 200 to define a detection zone (e.g., a detection zone 292 that may correspond with a location of a beacon 306 on a sheet 302 of the book 300 when the book 300 is coupled to the book enhancement device 200). In one or more embodiments, the page detection sensor 242 may comprise an RFID sensor (e.g., detecting and/or reading an RFID chip of the book 300), a nearfield communication sensor (e.g., detecting and/or reading an NFC chip of the book 300), a magnetic sensor for detecting magnets or magnetic ink, and/or an optical sensor (e.g., detecting and/or reading a barcode, QR code, and/or other optical code of the book 300). In one or more embodiments, the page detection sensor 242 (and/or the book detection sensor 240 or the auxiliary detection sensor 244) may include an optical sensor determining a pattern on a page 303 of the book 200, a light sensor determining light input received through one or more sheets 302 of the book 300 (including with respect to a reference luminosity), a magnetic sensor determining the location or configuration of magnetic ink, and/or an electronic proximity detector 217 for detecting a beacon 306 coupled to one or more sheets 302 of the book 300, for example a near-field communication (NFC) detector and/or a radio frequency identifier (RFID) detector. In one or more embodiments, the book 300 comprises one or more beacons 306 storing a page UID 110 readable by a page detection sensor 242 to enable detection of an open page 303 which a user 100 is reading and/or interacting with, to enable automatic or interactive content enhancement. In one or more embodiments, the page detection sensor 242 may detect magnetic ink, including patterns encoding information, on one or more sheets 302 of the book 300. In one or more embodiments, multiple sheets 302 each having a different configuration of magnetic ink may be detected to determine the active page 303. Optionally, one or more sheets 302 may also include notches or cut-outs such that a portion of each of the one or more sheets 302 is in direct adjacency and/or contact with the detection zone 292.

The book enhancement device 200 may include an auxiliary detection sensor 244 that may generate an auxiliary signal 245 indicating the presence of one or more beacons that may be attachable and/or addable to the book 300, for example an NFC-based sticker or RFID-based sticker. For example, an auxiliary beacon may be used to detect whether the user 100 has received a "mastery sticker" from a teach or instructor, and/or whether the user 100 has completed certain activities or interactions with the book 300 that involve addition of the auxiliary beacon to the book 300. Another example is illustrated in conjunction with the embodiment of FIG. 2.4 and FIG. 3 utilizing a configuration indicator 310 that may receive an auxiliary beacon to change a configuration option with the configuration file 104. Addition of the auxiliary beacon can possibly alert the enhancements to be experienced by the user 100 when reading and/or interacting with the book 300.

The book enhancement device 200 may include an audio output device 220 that may comprise a device for outputting audio signals and/or sound. The audio output device 220, for example, may include a speaker 222 and/or an audio output interface 224 (e.g., a USB port, an auxiliary sound port, an audio output jack, a headphone jack, etc.). In one or more embodiments, the book enhancement device 200 may include an audio input device 230, for example a microphone 232 and/or an audio input interface 234. The audio input interface 334, for example, may include a USB port, a microphone jack, and/or other input devices and methods).

The memory 204 may include a set of audio datasets 101, specifically shown in FIG. 2.1 as the audio dataset 101.1 through the audio dataset 101.n. For example, the audio dataset 101.1 may be associated with a first book 300A, the audio dataset 101.2 may be associated with a second book 300B, etc. Each audio dataset 101 may have associated an interaction log 130 comprising data related to the interactions of the user 100 with the book 300, as further shown and described in conjunction with FIG. 2.3. The memory 204 may also store a state dataset 140, which may store a state of the user 100 interaction with the book 300 (and which may or may not be related to, or overlapping with, the data of the interaction log 130). For example, in one or more embodiments the state dataset 140 may store: (i) a last active page 303 with which the user 100 interacted before the book 300 was closed and/or the book enhancement device 200 was turned off; (ii) previous selections or interactions made by the user 100 during a current read-through of the book 300, for example as may be useful for books 300 implementing multiple choice testing, or children's "choose your own adventure" modules; and/or (iii) selections or interactions made by the users 100 during one or more previous read-throughs or interactions with the book 300, for example to track previous choices and provide the user 100 with variation in content on each readthrough. In one or more embodiments, The memory 204 may include a state storage routine (not shown) comprising computer readable instructions that when executed: detect a shutdown signal 215, store the state dataset 140, detect a startup signal 213, and retrieve the state dataset 140 (e.g., loading data of the state dataset 140 back into random access memory and/or into registers of the processor 202).

The memory 204 may also include an audio routine 246. In one or more embodiments, the audio routine 246 comprises computer readable instructions that when executed: (i) receive the page signal 243 from the page detection sensor 242; (ii) determine a page UID 110 for the open sheet 302 within the one or more page UIDs 110 (e.g., that may be specified within the audio dataset 101 of the book 300); (iii) query the audio dataset 101 for an audio file 114 (or other defined enhancement) associated with the page UID 110; and (iv) generate an audio signal of the audio file 114 on the audio output device 230 (e.g., the speaker 222) to enhance a reading experience of the book 300 based on the open sheet 302. In one or more embodiments, the audio routine 246 comprises computer readable instructions that when executed: (i) receive a touch signal 209; (ii) determine a page UID 110 for the open page 303 within the one or more page UIDs 110 (e.g., via a query to the audio dataset 101); (iii) query the audio dataset 101 for the audio file 114 associated with a button UID 112 associated with the page UID 110, and (iv) generate an audio signal of the audio file 114 on an audio output device 220 to enhance the reading experience of the book 300 based on the open page and the touch signal 209. The audio routine 246 may also include a custom playback subroutine comprising computer readable instructions that when executed switch between playback of an audio file 114 (e.g., the audio file 114A of FIG. 2.1 that may be a default audio file) and the user audio file 114 (e.g., the audio file 114D of FIG. 2.2 that may be a custom content), according to one or more embodiments. The custom playback subroutine, for example, may updated the custom 109 field o the configuration file 104 (e.g., to a value of "1", or "true").

In one or more embodiments, the memory 204 may include a dataset retrieval routine 247 for detecting local storage of files such as the audio dataset 101.1, and retrieving missing files (or retrieving updated copies of out-of-date files). Custom content or configuration may also be determined to be detected for a given instance of the user 100 and/or user profile 521. In one or more embodiments, the dataset retrieval routine 247 may comprise computer readable instructions that when executed: (i) detect mounting of the book 300 in a book enhancement device 200, for example through generation of the book signal 241 comprising a book UID 441, (ii) determine an audio dataset 101 matching the book UID 441 is absent from the memory 204 (as may be ordinarily stored as a value in the book reference 102 attribute), and (iii) generating a content request 207 comprising the book UID 441. A similar check may be completed for any identified book GUID 443, which may have custom content associated. A similar check may be also completed for retrieval of data associated with a user profile 521 utilizing the book enhancement device 200, for example to download a configuration file 104 having a non-default settings selected by the user 100, and/or a state dataset 140 associated with the book UID 441. In one or more embodiments, mounting of the book 300 in a book enhancement device 200 may be detected, and it may be determine the book GUID 443 is absent from a computer readable memory 204 of the book enhancement device 200 (and/or the memory 604).

In one or more embodiments, the memory 204 may comprise a recording routine 248 usable for recording custom content. In one or more embodiments, the recording routine 248 comprises computer readable instructions that when executed: (i) receive an activation signal from the record button 216; (ii) select a page UID 110 (e.g., by determining the page UID 110 associated with an active page 303 of the book 300 through the page detection sensor 242); (iii) optionally select a button UID 112 (e.g., the button UID 112 may be detected by the one or more touch sensors 208, for example activated by the user 100); (iv) receive an audio signal of a user 100 on the audio input device 230; and (v) record a user audio file 114 of the audio signal, where the user audio file 114 may be stored in the audio dataset in association with the page UID 110, and optionally may be also stored in association with the button UID 112 of the page UID 110. In this way, a user 100 may continue to turn the pages 303 of the book 300, auding audio content and/or other enhancements that may be stored in a custom content file associated with the book UID 441 and/or book GUID 443, according to one or more embodiments. The user 100 may therefore use the pages 303 of the book 300 as the interface for creating the enhancement content, according to one or more embodiments.

In one or more embodiments, the memory 204 may also include a configuration routine 249 that uses one or more user inputs to adjust a configuration option, for example options specified in the configuration file 104. In one or more embodiments, the configuration options may be set through a tethered and/or paired instance of the computing device 600, through a native interface of the book enhancement device 200, and/or through the book 300 coordinating with the book enhancement device 200. For example the book 300 may include a configuration page in which the touch sensors 208 have been allocated to control functions changing configuration options. In one or more embodiments, the configuration routine 249 may comprise computer readable instructions that when executed: (i) detect the different page UID 110 associated with a configuration page of the book 300 (e.g., the configuration page 308 of FIG. 3); (ii) detect a touch signal 209; (iii) determine the button UID 112 associated with the touch signal 209; (iv) query the audio dataset 101 and/or the configuration file 104 for a configuration option associated with the button UID 112; and (v) set the configuration option of the configuration file 104 to enable customization of the reading experience using the configuration page of the book 300 as a user interface. In one or more other embodiments, the configuration routine 249 may include a configuration beacon subroutine comprising computer readable instructions that when executed detect a configuration beacon (e.g., an instance of the auxiliary beacon) that is attachable to the book 300 and automatically adjust the configuration option of the configuration file 104. For example, the configuration option may increase the enhancement difficulty, or specify a switch from a default language to a different language.

FIG. 2.2 illustrates an instance of the enhancement dataset, specifically an audio dataset 101 including audio enhancements, according to one or more embodiments. The audio dataset 101 may comprise a book reference 102 and/or a unique book reference 103, a configuration file 104, and/or enhancement data specifying one or more triggers and/or set conditions upon which to generate an enhancement. For example, as shown in FIG. 2.2, a button UID 112A may act as a trigger for any of a set of one or more audio files 114 depending on a selected configuration option.

The book reference 102 may be a data attribute storing a value that is a book UID 441. The book UID 441 may be a unique identifier of a book or book title, for example an alphanumeric string of 32 random characters associated with a publisher release (e.g., a title and version), or even a human-readable title and printing (e.g., "Concepts in Paleontology, 6th ed."). The book reference 102 may therefore comprise a reference to a book profile 442 that may be stored elsewhere in the book enhancement network 150, for example in the book enhancement database 440. Similarly, the unique book reference 103 may be a data attribute storing a value that is the book GUID 443, as further described below.

Figure 4:
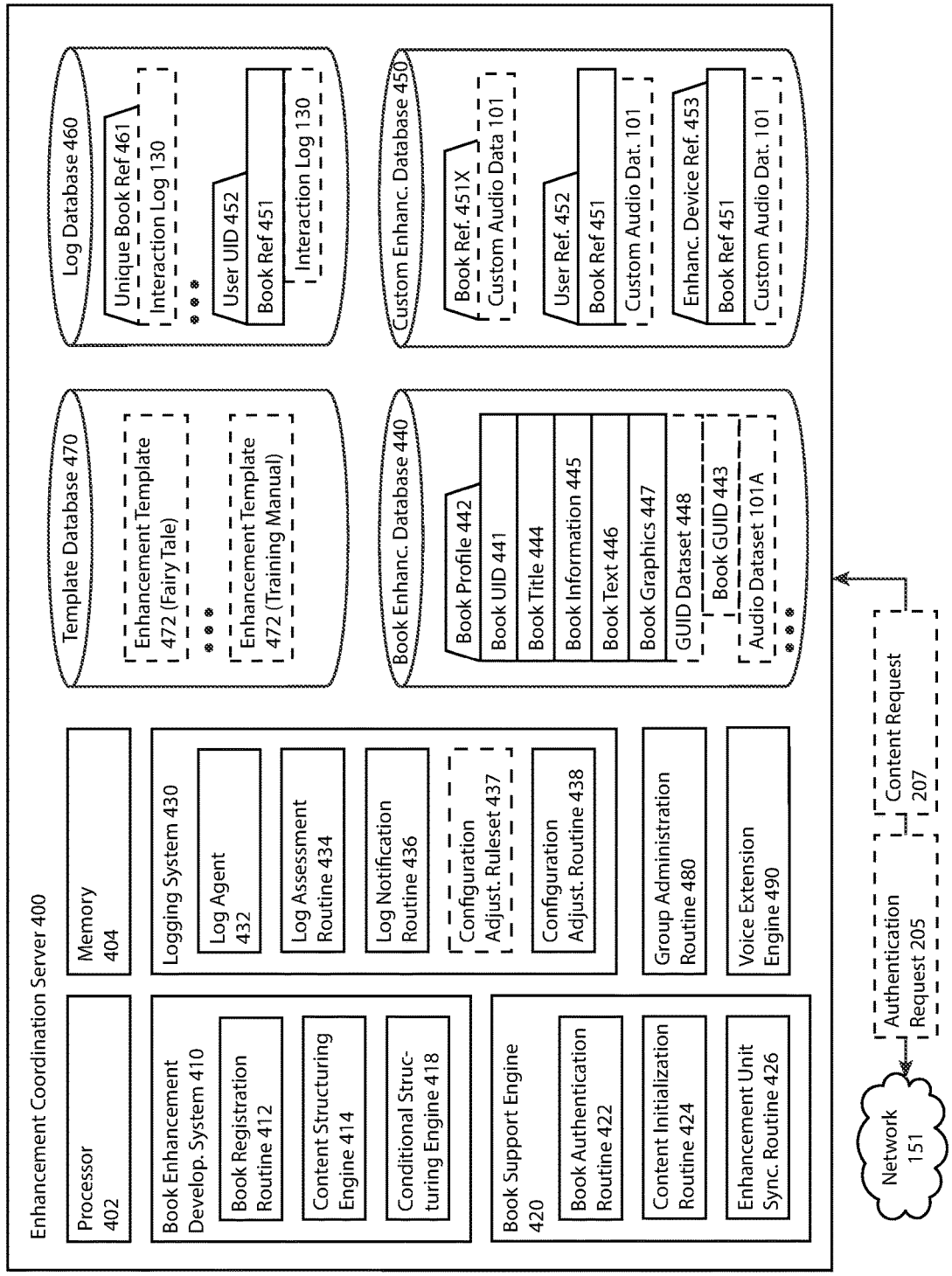
FIG. 4 illustrates an enhancement coordination server that may be used to support the creation, storage, and/or management of book enhancement data, for example including custom enhancement data created by users and evaluation of interaction logs resulting in automatic content adjustments to configuration of book enhancement devices, according to one or more embodiments.

The audio dataset 101 may comprise a configuration file 104 that may include one or more configuration options and/or settings that may be selected by the user 100 and/or by one or more automatic processes (including the logging system 430, as shown and described in conjunction with the embodiment of FIG. 4). The configuration file 104, for example, can include attributes and/or settings to specify a difficulty level 105, a language 106, a content type 107, an ability 108 (e.g., an ability level), and/or a custom 109 field, each of which may be attributes with one or more selectable values. The difficulty level 105, for example, may enable defining multiple levels of difficulty of the enhancement content. For instance, where the book 300 is a mystery story in which the user 100 may attempt to select a perpetrator of a crime, the difficulty level 105 may have numerous values ("easy", "medium", "hard") that may change an audio file 114 played back to the user 100 such that less information is provided. In another example, where the book 300 includes a multiple choice exam, for example as critical reading exercises following passages, the audio file 114 may be changed such that it provides a different prompt and/or different potential multiple choice answers to adjust difficulty. The language 106 may allow for selection of a language in which audio is profiled, for example values may include "English", "Spanish," "German," "Chinese", etc. The content type 107 may allow for selection of certain content, for example turning on author commentary, or selecting a different reading voice. The ability 108 attribute may act as another attribute storing selectable configuration options about the ability of the user 100, for example: users 100 requiring physical assistance may select between touch button sensitivity configurations, or users 100 requiring visual assistance may activate enhanced haptic feedback configurations. The custom 109 field may store a value designating whether custom enhancements and/or audio for a read through of the book 300 are turned "on", and if so may include further specification of, or reference to, such customization. For example, the user 100 may be able to switch between a default recording of a fairy tale in a voiceover of a book publisher and a reading in their own voice recorded for a child instance of the user 100. The configuration file 104 may also specify other parameters, such as control over audio signal. As just one example, there may be configuration options to determine: whether an audio file 114 should play completely before a different audio file 114 plays (e.g., serialized and/or scheduled playback); whether the audio file 114 stops and the different audio file 114 plays; and/or, whether playback for the audio file 114 and the different audio file 114 are layered (e.g., played at the same time with an overlayed audio signal) on the audio output device 220.

In one or more embodiments, the audio dataset 101 may comprise a set of page UIDs 110, for example a page UID 110A through a page UID 110N. The page UID 110 may have an audio file 114 associated, for example that may automatically play when the a new page-turn and/or active page 303 is detected. The audio dataset 101 may also include a set of one or more buttons UIDs 112 associated with each of the one or more page UIDs 110. For example, and as shown in FIG. 2.2, the page UID 110A may have associated a set of button UIDs 112, the button UID 112A through the button UID 112N. The button UIDs 112 may corresponding to touch sensors 208, for example as implemented with buttons 258, and as may be further paired with indication indicators 358 (e.g., as shown and described in conjunction with FIG. 2.4 and FIG. 3).

Each button UID 112 may further have associated one or more audio files 114. For example, in the embodiment of FIG. 2.2, the button UID 112A may have associated the audio file 114A through the audio file 114D. Each audio file 114 may serve a separate purpose, such as supporting a different configuration option. As an example, the audio file 114A may specify the audio to play at a first difficulty level 115 in a language 116 that is English, the audio file 114B may specify the audio to play at a second difficulty level 115 in a language 116 that is English, the audio file 114C may specify the audio to play author commentary as a content type 117, and the audio file 114C may be a custom defined audio recorded by a user 100.

It should be noted that the button UID 112A may reference a button 258 of the book enhancement device 200. Each button 258 may be used on many different pages 303 and therefore be reused across multiple pages 303. It will be recognized that the page UID 110 may form a unique combination with the button UID 112 with the audio dataset 101.

Although audio files 114 are shown associated with the page UID 110A and/or the button UID 112, it will be appreciated that in one or more embodiments other forms of enhancement may also be specified, for example vibration, lighting changes, and/or other perceptible elements.

The description above has described a straightforward relation between a touch sensor 208 and an enhancement such as an audio file 114. However, in one or more embodiments, complex interactions between the user 100 and the book 300 may be defined. In one or more embodiments, a set of complex interactions may be in the form of a contingent audio data 121 in which certain actions (e.g., playing an audio file 114) are contingent on other actions occurring, according to an activation condition. In one or more embodiments, an activation condition activating the audio file 114 includes a sequence of two or more touch signals 209 (e.g., a touch signal 209A associated with a touch sensor 208A and a touch signal 209B associated with a touch sensor 208B) and a timing of one or more touch signals 209 (e.g., within 1500 milliseconds of one another).

In one or more embodiments, the contingent audio data 121 may be implemented with a function 120, as may also be associated with a page UID 110 (specifically in the embodiment of FIG. 2.2, the page UID 110N). In one or more embodiments, and the embodiment of FIG. 2.2, the page UID 110N is shown associated with a function 120 and two audio files, the audio file 114E and the audio file 114F. The function 120 is shown as a function having at least three inputs, "A", "B", and "time". In one or more other embodiments, the function 120 may have at least two inputs, e.g., "A" and "B", or "A" and "time". Depending on inputs passed into a conditional 122 of the function 120, an audio execution command 124X or an audio execution command 124Y may be generated for playback of the audio file 114E or the audio file 114F, respectively. As just one example, the conditional 122 may require that if the button UID 112A is input AND the button UID 112B is input within 6 seconds of the input for the button UID 112A, THEN the audio execution command 124X may be generated to play the audio file 114E, otherwise the audio execution command 124Y will be generated for the audio file 114F. This example may be used to illustrate a book 300 involving mixing chemical compound, for example providing the user 100 with the audio prompt upon turning the page 303: "quick, you only have six seconds! Select the acid and neutralize it with the base!".

As illustrated, there may be an arbitrary number of inputs (one, two, fifteen, one hundred) to the conditional 122, and an arbitrary number of outputs. Although button UIDs 112 are illustrated as inputs, additional inputs are possible, for example the page UID 110, data from the state dataset 140, or other input provided by the user. Similarly, many output commands are possible across many types of enhancement, including non-audio enhancements.

Although one method of providing conditional enhancement including audio playback is provided, many other methods are possible. For example, and as described in conjunction with the embodiment of FIG. 9, arbitrary software script or code may also be specified for execution within the enhancement dataset, according to one or more embodiments.

FIG. 2.3 is an interaction log 130, according to one or more embodiments. In one or more embodiments and the embodiment of FIG. 2.3, the interaction log 130 may be stored data that tracks and/or records interactions of the user 100 with the book 300 as may be detected by the book enhancement device 200. In one or more embodiments, the interaction log 130 comprises a user reference 134 that may be an attribute storing a value that us a user UID 512. In one or more embodiments, the user 100 may have logged into the book enhancement device 200 such that the user reference 134 may be determined. The user reference 134 may also be determined through other methods, for example where a book GUID 443 is associated with a user profile 521 of a user 100 who purchased and/or registered the book 300. The interaction log 130 may comprise a book reference 132 that may be an attribute storing the book UID 441 and/or the book GUID 443, according to one or more embodiments.

The interaction log 130 may comprise a set of one or more entries 136 for each specified interaction of the user 100 with the book 300 and/or the book enhancement device 200. The interaction may be an action taken by the user 100, or an action taken by the book enhancement device 200. As just one example, the specified interactions initiated by the user 100 could include: starting a new book 300, turning a page 303, touching a touch sensor 208, generating a certain outcome of the function 120, a period of inaction or closing the book 300, etc. More complex interactions also may be logged, for example audio of the user 100 may be recorded and stored in association with the entry 136, accelerometer data stored (in such case that the book enhancement device contains an accelerometer), etc. In one or more embodiments, each entry 136 may include a timestamp 137, an action 138 taken by the user 100 (e.g., playback of audio, selection of a button UID 112, and/or initiation of a prompt for the function 120 and/or conditional 122, etc. Each entry 136 may also include a type 139, for example whether the action is a prompt requesting the user 100 to engage in an interaction or a response of the user 100 (e.g., the interaction). Many other types 139 of entry 136 are also possible.

The interaction log 130 may be analyzed and/or evaluated to determine characteristics of the particular interactions of a user 100 with the book 300, and/or analytics of a number of users 100 using a book 300. For example, it may be able to be determined that a user 100 may be struggling with understanding the book 300 if many "page turns" are detected without any other interaction. In another example, a user 100 may find the content too easy where an elapse time between a prompt and a response by the user 100 is consistently less than two seconds, as may be measured as the time between the timestamps 137 of each action. As yet another example, the interaction logs 130 of multiple users 100 may be analyzed to determine that a majority of the users 100 are havening difficulty reading the prose of a certain page 303A based on a high ratio of the word count divided by the time before turning to a next page 303B. As further described in conjunction with the embodiment of FIG. 4, the interaction log 130 may be uploaded to the coordination server 400 over the network 151 for evaluation and/or data analytics.

In one or more embodiments, the state dataset 140 may be implemented with the interaction log 130. For example, by querying the interaction log 130, a last active page 303 viewed by the user 100 and/or interacted with by the user 100 may be able to be determined. Upon the book 300 being re-opened, the book enhancement device 200 may then be able to remind the user 100 where they left off.

FIG. 2.4 is an example embodiment of the book enhancement device 200, referred to as the book enhancement device 250, according to one or more embodiments. The book enhancement device 250 may demonstrate an instance of the book enhancement device 200 which is configured to emulate a "book binding", including a housing 251 having an outer surface 253 and an inner surface 254, and a hinge 252. The hinge 252 may enable the two inner surfaces 254 to fold together to "close" the "book binding" (along with closing any instance of the coupled book 300). In one or more embodiments, the housing 251 may be made of plastic, polymer, cardboard of sufficient strength and durability for wear and tear, or composite material. The housing 251 may include interior cavities, fixtures, and/or compartments to fix internal components, for example electronics of one or more of the components illustrated in FIG. 2.1 (e.g., processor 202, the memory 204, the electronics of the sensor array 206, the power source 210 that includes an internal battery, the network interface controller 212, etc.). The book enhancement device 250 is not shown to scale: although the housing 251 is shown with a certain thickness in FIG. 2.4 for illustrative purposes, it should be noted that one objective may be to reduce the thickness of the housing 251 to assist the user 100 in experiencing the book 300 as a traditional book.

In the example embodiment of the book enhancement device 250, a window 255 may be set in the housing 251. The window 255 is an optional feature that may enable a portion of the book 300 to be visible through the housing 251 when the book 300 is mounted. This may allow for a determination that the book 300 is coupled to the book enhancement device 250, even when the book enhancement device 250 is closed. For example, the book 300 may contain a graphic and/or title visible through the window 255. In one or more embodiments, a window 255 in the housing 251 may be set such that a visual identifier of the book 300 (e.g., a picture of the main character on the cover) is visible to the user 100 when the book 300 is mounted in the housing 251 even when the hinge 252 is closed. In one or more other embodiments, each book 300 may be sold with a cover (e.g., a dust jacket or other cover) that may be placed around the housing 251 to hide electronics and/or further reinforce the feeling of a paper book Although not shown, a similar window may be utilized along the "spine" of the hinge 252, according to one or more embodiments. The window 255 may include a light that illuminates the graphic and/or title, for example the light ring 257 comprising a set of LEDs installed along the edge of the window 255. In one or more embodiments, the light and/or the light ring 257 may also act as the indicator lights 218 as part of the control interface 214. For example, the light ring 257 may glow yellow when the audio dataset 101 for a new book 300 is being downloaded or installed.

The book enhancement device 250 includes a sensor array 206 comprising a set of touch sensors 208, specifically the button array 256A and the button array 256B (covering the left and right hand side of the inner surface 254, respectively), and a set of buttons 258, shown as the button 258A through the button 258X. In the present embodiment, the user 100 may provide a user touch 259, the user touch 259 provided through one or more sheets 302 of the book 300 to generate the touch signal 209 with a button 258.

It will be recognized that many other configurations and methods of providing a sensor array 206 are possible, for example a capacitive touch sensor pad and/or resistive touch sensor pad, with software-programmable and/or firmware-programmable touch zones specifiable along an x-axis and a y-axis of the touch pad. Such touch zones may implement the touch sensor 208, and may change for each instance of the active page 303, as may be specified and stored in the audio dataset 101. In one or more embodiments, one or more touch sensors 208 may be defined on one or more touch sensor pads having an x-axis and a y-axis forming a touch plane that can be placed on any portion of the inner surface 254 of the book enhancement device 150 (e.g., exactly in the location of the dashed line specifying the button array 256A and the button array 256B in FIG. 2.4). A touch pad may also have variable detection based on thickness of the number of sheets 302. For example, where it is detected (e.g., via the beacon 306) that the active page is page 303 is page number eight, there may be four sheets 302 between the sensor array 206 and an indication indicator 358 (as shown in FIG. 3). Therefore, due to the increased thickness of the paper of the book 300, a sensitivity may be automatically increased on the sensor array 206 each time the user 100 turns a page of the book 300. In one or more embodiments, the paper or other polymer of the sheets 302 or coatings thereof may be selected for its conductive and/or electrical properties.

The book enhancement device 250 may include a hinge switch 261, which may be an example of the power switch 211, according to one or more embodiments. The hinge switch 210 may generate the startup signal 213 and/or the shutdown signal 215. In one or more embodiments, the hinge 252 in the housing 251 may allow a first portion of the inner surface 254 (e.g., the left-hand portion) to fold onto a second portion of the inner surface 254 (e.g., the right-hand portion), where the hinge switch 261 generates an open signal when the first portion and the second portion are greater than a first angle (e.g., 15 degrees, 30 degree, 90 degrees, etc.) and generates a closed signal when the first portion and the second portion at least are detected to be less than a second angle (e.g., 15 degrees, 30 degree, 90 degrees, etc.). For example, the open signal may be generated when the first angle is greater than 90 degrees, and the closed signal may be generated when the second angle is less than 30 degrees. The open signal may initiate the startup signal 213, and the closed signal may initiate the shutdown signal 215.

The book enhancement device 250 may include a data port 263, for example an SD card reader, a micro SD card reader, a USB stick reader, etc. The data port 263 may be used, for example, to either install new content on other memory of the book enhancement device 200 (e.g., the memory 204), and/or may be used to insert a memory card that acts as the memory of the book enhancement device 200 (e.g., is the memory 204). The data port 263 may be used, for example, to update the audio dataset 101, install new audio datasets 101, add new routines, modules, or other applications or components thereof to the memory, and/or update an operating system of the book enhancement device 200. In one or more embodiments, the computer readable memory 204 may be installed in the data port (e.g., as a flash drive or SD card that is removable).

The book enhancement device 250 may include an audio output jack 274 that may be an example of the audio output interface 224, according to one or more embodiments. This may allow a user 100 to plug in headphones or another audio output cable or device. It should be noted that the book enhancement device 250 may also be capable of a Bluetooth® or other wireless connection to audio output equipment (e.g., a smart speaker), depending on the capability of any network interface controller 212. Therefore, in one or more embodiments, the network interface controller 212 may comprise a wireless network interface controller. The book enhancement device 200 may also include a microphone jack 284 that may be an example of the audio input interface 334, and may allow for connection of a microphone. In one or more embodiments, the audio output jack 274 and the microphone jack 284 may be combined, for example enabling connection of a headset. Use of a headset may be especially useful if the book enhancement device 250 collects and/or records audio of the user 100 as part of the interaction the user 100 may have with the book 300 and/or the book enhancement device 200. The book enhancement device 250 may include a set of speakers 262, the speaker 262A and the speaker 262B (e.g., examples of the speaker 222 of FIG. 2.1), according to one or more embodiments. Although the speakers 262 are shown for clarity, they may be hidden along an edge of the housing 251, according to one or more other embodiments, for example to reduce visibility of electronic components for the user 100. The book enhancement device 250 may similarly include a microphone 282 (e.g., an example of the microphone 232).

The book enhancement device 250 may include a book coupler 236, specifically a set of magnets 286. Although many configurations are possible, the magnet 286A is illustrated located along an outside edge of the left-hand instance of the inner surface 254, and the magnet 286B is illustrated located along an outside edge of the right-hand instance of the inner surface 254. Additional fasteners and/or magnets may be useful, for example to couple the book 300 to the hinge 252 that acts as the spine of the emulated "book binding" of the book enhancement device 250. The magnet 286A may magnetically couple to the magnet 386A of FIG. 3, and the magnet 286B may magnetically couple to the magnet 386B of FIG. 3. In one or more other embodiments, the book enhancement device 200 and/or the book enhancement device 250 does not need a book coupler 236.

The book enhancement device 250 may include one or more detection zones (e.g., the detection zone 290, the detection zone 292 and/or, the detection zone 294). Each detection zone may include a detection sensor (e.g., the book detection sensor 240, the page detection sensor 242, the auxiliary detection sensor 244). Each detection sensor may detect a beacon (e.g., the beacon 307, the beacon 306, the beacon 309) and/or another detectable element (e.g., optically detectable text or code, page thickness, magnetic field strength of a magnet as sensed through the set of sheets 302 of the book 300, magnetic ink, etc.).

In one or more embodiments, and the embodiment of FIG. 2.4, the book detection sensor 240, which may be positioned under and/or on the surface of the housing 251, may be able to sense a beacon such as the beacon 307 and/or read information of the beacon 307 within the detection zone 290. In one or more embodiments, and the embodiment of FIG. 2.4, the page detection sensor 242, which may be positioned under and/or on the surface of the housing 251, may be able to sense a beacon such as the beacon 306 and/or read information of the beacon 306 within the detection zone 292. In one or more embodiments and the embodiment of FIG. 2.4, the auxiliary detection sensor 244, which may be positioned under and/or on the surface of the housing 251, may be able to sense a beacon such as the beacon 309 (e.g., when placed or adhered to the book 300) and/or may be able to read information of the beacon 309 within the detection zone 294. For example, the detection zone 290, the detection zone 292, and/or the detection zone 294 may be based on operational distances for a near-field communication or RFID protocol, in one or more embodiments.

The number and arrangement of the detection zones may vary depending on how the active sheet 302 is detected and/or a page UID 110 is determined. As just one example, there may be a detection zone 292A based on NFC covering the left-hand page (in the position shown as the detection zone 292 of FIG. 2.4), but another detection zone (e.g., a detection zone 292) on the right-hand side of the inner surface 254 symmetrically opposed to the detection zone 292A, such that a beacon 306 attached to a sheet 302 may be detected when the sheet 302 is lifted by the user 100 at the beginning of a page turn, and also when it is deposited on the left-hand side at the end of the page turn. In another example, there may be a limit to how many beacons 306 may be vertically stacked on multiple sheets 302 (e.g., a limit of three beacons 306), such that multiple instances of the detection zone 292 may be specified along the bottom of the inner surface 254 to detect each stack of beacons 306 within the book 300. There also may be different methods of detection working simultaneously, for example an optical sensor (e.g., an instance of the page detection sensor 242) able to determine a light transmissibility of the stack of sheets 302 of the book 300 to determine an open page, in conjunction with an NFC detector (e.g., another instance of the page detection sensor 242).

The hinge 252 may be implemented with a suitably flexible material, for example plastic, vinyl, or other polymer, and/or may be accomplished through one or more traditional methods of binding, for example a comb binding, a sewn book binding, a ring binding, glue, etc.

It will be appreciated that the book enhancement device 200, in one or more embodiments, need not have a hinge 252. For example, the book enhancement device 200 may have a housing 251 that is shaped like a flat panel and/or a clipboard. An enhancement device 200 that is a flat panel may still include the inner surface 254, to which the book 300 is attachable, and on which the user 100 may primarily interact, and the outer surface 253.

FIG. 3 illustrates an example of the book 300 that is can be enhanced, referred to as the book 350, according to one or more embodiments. The book 350 may comprise one or more sheets 302 that may be bound with a binding 304, according to one or more embodiments. The book 350 may be a paper book that, although having certain elements that may interface with and/or communicate with the book enhancement device 200, may still look and feel like a traditional paper book. The sheets 302 of a book 300 generally may be made from paper, polymer, cardstock, cardboard, or other sheet-like materials, and may be flexible or ridged. The sheets 302 may be selected to be of a type that work with a given type of the touch sensor 208 of the book enhancement device 200. For example, thinner (e.g., 28 pound paper) may be required for certain pressure-based touch sensors 208. In the present example, the book 350 includes sheets 302 that are made of paper with a binding 304 of simple staples or glue.

The book 300 may include a book coupler 336 (not shown), for example an adhesive or tacky polymer, a mechanical fastener, one or more holes to interface with a mechanical fastener, a magnet, etc. In one or more other embodiments, the book 300 and/or the book 350 does not need a book coupler 336. In the present example, the book 350 comprises a book coupler 336 that includes a magnet 386A and a magnet 386B, each of which may be flexible magnets integrated into a first sheet 302 of the book 350 (e.g., between two fused or laminated pieces of paper, or adhered to an exterior of the first sheet 302A and the last sheet 302F). In one or more embodiments, the magnet 386 is a magnetic strip that may be embedded in a first sheet 302 of one or more sheets 302 of the book 300 such that that the magnetic strip is hidden from view and the book 300 remains softback when uncoupled from the book enhancement device 200. In one or more embodiments, the magnet 386 may still enable flexing of the sheet 302 of the two or more sheets 302. The magnet 386A may magnetically couple with the magnet 286A of FIG. 2.4 and the magnet 386B may magnetically couple to the magnet 286B of FIG. 2.4. The flexible instances of the magnets 386 may be, for example silicone-based magnetic sheets.

Each sheet 302 may comprise two pages. For example, the sheet 302B may comprise the page 303A ("page 1" of the book 350 from a perspective of the user 100) and the page 303B ("page 2"). Each page 303 may include content such as text and/or graphics. In addition, certain textual, graphical, visual, or tactile (e.g., braille) elements on each page 303 may be an interaction indicator 358 which may indicate to the user 100 that an enhancement may result when the user interacts with the indicated region, for example through the user touch 259. In the present example embodiment, and also referring to the example embodiment of FIG. 2.4, the book 350 includes an interaction indicator 358A that is associated with the button 258A, an interaction indicator 358E that is associated with the button 258E, etc. The user touch 259 indicated in FIG. 3 may therefore be the same as the user touch 259 of FIG. 2.4, propagating as a pressure through the sheet 302B and the sheet 302A to the button 258E. In one or more embodiments, an interaction indicator 358 (e.g., the interaction indicator 358A) of the one or more interaction indicators 358 may be positioned on a sheet 302 for communicative coupling with a touch sensor 208 (e.g., the button 258) of the book enhancement device 200.

Each page 303 may include visual content 305. A simple example of the visual content 305 and a programmed interaction is now provided. When "page 3" of the book 350 is the active page, reading the audio dataset 101 may initiate an audio file 114 asking the user 100 to "mix the chemicals in the appropriate order to create a reagent." The user 100 may then have to select a first chemical by applying a first user touch 259 to the interaction indicator 358.3Q, select a second chemical by applying a second user touch 259 to the interaction indicator 358.3V, select the appropriate piece of glassware by applying a third user touch 259 to the interaction indicator 358.3M (e.g., a round-bottomed flask), and then select the appropriate temperature source by applying a fourth user touch 259 to the interaction indicator 358.2A (e.g., a Bunsen burner). An audio file 114 may then be initiated depending on whether the correct combination was selected in the right order, for example as may be able to be implemented with the function 120 of FIG. 2.2.

The book 300 may include one or more beacons that may be detectable and/or may be capable of storing information which can be extracted upon detection of such beacon. In one or more embodiments, and the embodiment of FIG. 3, the book 300 may include a beacon 307 that is a book beacon carrying information about the book, for example its title and version and/or other bibliographic information. The beacon may be based on RFID, NFC, and other methods of close-range detection (e.g., detection at 3 inches, 1 inches, 0.25 inches, 0.01 inches). In one or more embodiments, the book may comprise a beacon 306 that is a page beacon carrying information about a sheet 302 that has been turned and/or a sheet that is an active page 303 and/or active pages 303 of the book 300. In the example of the book 350, one beacon 306 may be associated with every other sheet 302, with the total number of buttons 258 in the button array 256 then allocated among each four instances of the page 303. In one or more embodiments, a beacon 306 (e.g., the beacon 306A) of the one or more beacons 306 may be assigned to the two or more sheets 302, and two or more interaction indicators 358 then allocated among the two or more sheets 302 such that a page UID 110 and button UID 112 pairing may be unique within the book 300, and therefore may be determined with minimal use of beacons 306.

To illustrate such allocation, the interaction indicator 358.2A, the interaction indicator 358.2E, the interaction indicator 358.2G, the interaction indicator 358.2I, and the interaction indicator 358.2K have been allocated to "page 2" of the book 350 (the page 303B of the sheet 302B), leaving possible use of the interaction indicator 358.2B, the interaction indicator 358.2C, the interaction indicator 358.2D, the interaction indicator 358.2F, the interaction indicator 358.2H, the interaction indicator 358.2J, and the interaction indicator 358.2L on "page 4" of the book 350. In this way, the number of beacons 306 may be reduced while still determining a correct audio file 114 to play paired with a given interaction indicator 358. In such case, it can be noted that the detected page UID 110 within the audio dataset 101 may designate a set of pages ("page 2" through "page 4") on which possible buttons 258 may be pressed.

The book 350 also illustrates the detection zone 290, the detection zone 292, and the detection zone 294 of the book enhancement device 200, as each may be "mapped" or projected onto the book 350 when the book 350 is mounted and/or coupled to the book enhancement device 250. When mounted, the beacon 307 is within the detection zone 290. Each of the beacons 306A through the beacon 306B are potentially within the detection zone 292 once the appropriate sheet 302 has been turned. Likewise, any attachable instance of the beacon 309 is within the detection zone 294, as further described below.

In one or more embodiments, the book 300 may include a configuration page 308 and/or a page otherwise allowing for control of the enhancements or experience of the user 100. As an example, the configuration page 308 may include one or more interaction indicators 358 that designate a difficulty level, a language type, etc. For example, the user 100 may turn to the configuration page 308 and provide the user touch 259 to an interaction indicator specifying "French" such that the configuration file 104 is updated to play instances of the audio file 114 in French. The configuration page 308 may therefore include information matching the available options in the configuration file 104. Other options are possible, including control options of the book enhancement device 200 (e.g., volume up or down, display or lighting brightness, selecting a user profile, etc.). In one or more embodiments, when the book 300 is removed and/or dismounted from the book enhancement device 200, each of the touch sensors 208 may have separate configuration rules or options roles. Such roles can revert to enhancement triggering sensors once the book 300 is coupled and/or mounted.

In one or more embodiments, the book 300 may include attachable beacons 309, for example a sticker with an embedded NFC chip. The beacon 309 may be attached at a designated location, for example the configuration indicator 310. In one or more embodiments, a page 303 of the book 300 may further comprising the configuration indicator 310, for example for receiving an attachable beacon (e.g., the beacon 309) that when detected by the book enhancement device 200 can automatically change a configuration option of a configuration file 104. The beacon 309 may be, for example, a way to continue a tactile and more traditional relationship with a paper book.

However, the beacon 309 also may be used as a security or control feature: for example the beacon 309 may be required to be attached to unlock certain content (e.g., a special redeemable offer by mail-order in which the beacon 309 is returned by mail to unlock hidden audio files 114), certain difficulty levels (e.g., acting as a "gold star" awardable by a teacher to a student to unlock a new difficulty level), etc. In one or more embodiments, the beacon 309 also may be non-permanently attached, for example through magnets, a "pocket" in which the beacon 309 can be held with a friction fit, and/or a temporary adhesive.

In one or more embodiments, the book 300 may allow for the user 100 to create content, including the visual content 305. For example, the book 300 may be a coloring book, a drawing book, a book of puzzles or mazes, an academic book with exercises in which the user physically writes in the book 300, etc. In one or more embodiments, the book 300 may be assigned its own book GUID 443 and comprise blank pages enabling the user 100 to completely define the custom enhancement content. In yet another example, the book 300 may include basic text or graphics for organization of other information, for example implementing a planner in which the user 100 can both write and leave recordings (e.g., the audio file 114) next to various entries.

FIG. 4 illustrates an enhancement coordination server 400, according to one or more embodiments. The enhancement coordination server 400 may be implemented by one or more physical computing servers over the network 151, and may serve multiple roles in supporting, maintaining, and/or managing book enhancement devices 200, books 300, and/or associated data, according to one or more embodiments. The enhancement coordination server 400 may include a processor 402 such as a computer processor and a memory 404, for example random access memory, magnetic storage media, solid state memory, memristors, and/or other forms of computer readable memory. Each of the systems, routines, agents, engines, databases and/or subroutines of the enhancement coordination server 400 may be stored on the memory 404, although for clarity are placed without the memory 404 in FIG. 4 (this is also true of the memory 504 in FIG. 5 and the memory 604 in FIG. 6).

In one or more embodiments, the enhancement coordination server 400 may include a book enhancement development system 410 that is usable by a publisher, author, and/or user 100 to define a new instance of the book 300. The book enhancement development system 410 may include a book registration routine 412, a content structuring engine 414, and/or a conditional structuring engine 418. The book registration routine 412 may be a computer application or portion thereof that may be used to create a new instance of the book profile 442. As just one example, the book registration routine 412 may implement one or more operations of the book provisioning process flow of FIG. 7, for example generating a book profile 442, generating a book UID 441, adding appropriate data to the book profile 442 such as the book title 444, and selecting an enhancement template 472.

The content structuring engine 414 may be a software application or portion thereof utilized to define enhancements to the book 300, including triggers for such enhancements, according to one or more embodiments. For example, the content structuring engine 414 may implement one or more operations of the audio dataset generation process flow 850. In one or more embodiments, the book structuring engine 414 may include computer readable instructions that when executed: (i) select a page UID 110 of a sheet 302 of the book 300 that comprises a beacon 306 physically coupled to the sheet 302 of the book 300; (ii) select a button UID 112 associated with the interaction indicator 358 visible to a user 100 on the sheet 302 of the book 300; (iii) receive a first audio signal (e.g., generated by the user 100); (iv) store an audio file 114 of the first audio signal; (v) generate an audio dataset 101 associated with a book UID 441 on a computer readable memory (e.g., the memory 404); and (vi) associate within the audio dataset 101 the page UID 110, the button UID 112, and the audio file 114. As a result, the book 300 can be sound enhanced when the user 100 turns to the sheet 302 associated with the page UID 110 and selects an interaction indicator 358 (e.g., with the user touch 259) associated with the button UID 112. The content structuring engine 414 may be used to repeat the process for other partitions or and configurations, for example define content in another language or at another difficulty level. For example, in reference to the above example, the computer readable instructions of the content structuring engine 414 may be executed to select the page UID 110 of the sheet 302 of the book 300, select the button UID 112 associated with the interaction indicator 358, receive a second audio signal, store an audio file 114 of the second audio signal (e.g., an audio file 114B, as shown in FIG. 2.2), and associate within the audio dataset 101 the page UID 110, the button UID 112, and the audio file 114 of the second audio signal. As a result, the book 300 can be alternatively enhanced when the user 100 turns to the sheet 302 associated with the page UID 110 and selects the interaction indicator 358 associated with the button UID 112. The alternative enhancement may be triggered in various ways, including randomly (e.g., a random or alternating playback of the audio file 114A and the audio file 114B), or as a result of selecting a configuration option of the configuration file 104. Although audio has been used in the present examples, other enhancements may be similarly defined (e.g., a vibration action)

The content structuring engine 414 also may be utilized to set a configuration option for one or more defined enhancements. In one or more embodiments, the content structuring engine 414 may include computer readable instructions that when executed store within a configuration file 104 data specifying the audio file 114A of the first audio signal and the audio file 114B of the second audio signal, where the audio file 114A of the first audio signal includes a first language 116A, a first difficulty level 115A, and/or a first content type 117A, and where the audio file 114B of the second audio signal includes a second language 116B, a second difficulty level 115B, and/or a second content type 117B.

The book enhancement development system 410 or portions thereof also may be able to run on the book enhancement device 200 and/or the computing device 600, alone or in combination from the enhancement coordination server 400, according to one or more embodiments. For example, the content structuring engine 414 running on the computing device 600 and/or the book enhancement device 200 may structure the audio dataset 101 locally (e.g., in the memory 204 and/or the memory 604). A newly defined trigger and/or audio file 114 may be provided with a custom field (e.g., the custom 119 attribute). In the above example, rather than specify a language 116A and/or different language 116B, one instance of the audio file 114A may be provided as a default audio file 114, and the other instance of the audio file 114B provided as a custom audio file 114. In one or more embodiments, the content structuring engine 414 may therefore comprise computer readable instructions that when executed store within the configuration file 104 data specifying the audio file 114A of the first audio signal and the audio file 114B of the second audio signal, where the audio file 114A of the first audio signal includes a default content (e.g., is a first index or otherwise designated audio file 114A) and the audio file 114B of the second audio signal includes a custom content (e.g., as designed by the custom 119 attribute and its stored value).

The content structuring engine 414 may also include and/or call a conditional structuring engine 418. The conditional structuring engine 418 may include a software application or portion thereof used to define complex triggers for enhancements, including triggers utilizing the state dataset 140 to define conditional enhancements. In one or more embodiments, the conditional structuring engine 418 may be used to define a function 120 including a set of inputs (e.g., page UIDs 110, buttons UIDs 112, time), a conditional and/or comparator, and a set of outputs that may be enhancements and/or data to be stored in the state dataset 140 (e.g., generation of audio execution commands 124, storage of a decision or interaction of the user 100 within the state dataset 140 and/or the interaction log 130, etc.). The conditional structuring engine 418 may implement one or more operations of the audio dataset generation process flow 950, according to one or more embodiments.

In one or more embodiments, the conditional structuring engine 418 includes computer readable instructions that when executed: (i) select a button UID 112 associated with an interaction indicator 358 visible to a user 100 on the sheet 302 of the book 300, and (ii) define a function 120 including a first input that is a first button UID 112A and a second input that is the second button UID 112B. The function 120, upon satisfaction of a conditional 122, may output an audio execution command 124 for generation of an audio signal of the audio file 114 on an audio output device (e.g., the audio output device 220) to enhance complex interaction with the book 300. For example, the conditional 122 may require that the first input be received before the second input, or vice versa. In another example, the conditional 122 may require that the first input and the second input are both received within a set timeframe (e.g., within 3 seconds of each other). Many other conditions may be provided, as will be recognized by one skilled in the art of computing science and/or software engineering.

The enhancement coordination server 400 may include a book support engine 420, including a book authentication routine 422, a content initialization routine 424, and/or an enhancement unit synchronization routine 426, according to one or more embodiments. In one or more embodiments, the book authentication routine 422 may authenticate a book 300 mounted to a book enhancement device 200. For example, a book GUID 443 assigned to the book 300 may have custom content created and associated with the book GUID 443, for example as stored in the custom enhancement database 450. The book authentication routine 422 may determine the user profile 521 associated with the book GUID 443 and request a login and/or authentication credential before enabling download of the audio dataset 101 comprising the custom content. In another example, the book 300 having a title and version may print tens of thousands of copies, with each assigned a book GUID 443 to track each physical copy. Upon mounting a copy of the book 300 having the book GUID 443 to a book enhancement device 200 for the first time, the book GUID 443 may be associated with a user profile 521 known to own and/or control the book enhancement device 200. It should be noted that each instance of the book enhancement device 200 that is manufactured may be tracked with a separate hardware identifier, device UID and/or device GUID, including without limitation a MAC address.

The content initialization routine 424 comprises a software application or portion thereof that may initialize an enhancement dataset such as the audio dataset 101. For example, upon mounting of the book 300 to the book enhancement device 200, it may be determined that the audio dataset 101 for the book 300 is absent from the memory 204, and a content request 207 may be generated and transmitted over the network 151. The determination may be made by extracting the book UID 441 and/or the book GUID 443 from the beacon 307 and comparing against a value stored in each book reference 102 and/or unique book reference 103 of each enhancement dataset stored in the memory 204. Even where a match is determined, a version of a current audio dataset 101 may be transmitted to the enhancement coordination server 400, which, if outdated, may return the updated instance of the enhancement dataset. In one or more embodiments, the content initialization routine 424 may comprise computer readable instructions that when executed receive a content request 207 generated upon a determination that the enhancement dataset such as the audio dataset 101 for the book profile 442 is absent from a memory of a client device (e.g., the memory 204 of the book enhancement device 200) when a book (e.g., the book 300, or a different book) matching the book profile 442 is mounted to the client device.

In one or more embodiments, the content initialization routine 424 may comprise computer readable instructions that when executed receive a content request 207 (which may comprise a version check) for the audio dataset 101 associated with the book 300, and then transmit to the computer readable memory 204 of the book enhancement device 200 the enhancement dataset (such as the audio dataset 101). The returned enhancement dataset may optionally include the configuration file 104, or data thereof.

In what may be a similar function to a version check, the content initialization routine 424 may respond to a download request for custom content that may become associated with a unique copy of a book 300, or the unique pair of the book 300 with a book enhancement device 200 (each of which are examples of potential "enhancement units," as further described below). In the first example, the book 300 may include a book GUID 443 that may allow custom content to become associated to the book 300 regardless of the user 100 interacting with the book 300 and regardless of the instance of the book enhancement device 200 to which the book 300 is mounted. As just one example, tracking custom content by useful copy could be useful as a guestbook in a library where people can both sign their name and leave an audio recording in conjunction with their signature. As another example, assigning a book GUID 443 may allow a permanent recognition that the book 300 with the book GUID 443 has been bound to a user profile 521, enabling access controls and/or other security features if anyone other than the user 100 attempts to access associated enhancement datasets, configuration files 104, interactions logs 130, and/or state datasets 140.

In both examples, attaching the book 300 to any instance of the book enhancement device 200 may result in the same enhancements, provided the supporting instance of the enhancement dataset can be downloaded as the book 300 is moved between devices (e.g., downloaded from the enhancement coordination server 400 over the network 151). In one or more embodiments, the content initialization routine 424 comprises computer readable instructions that receive a content request 207 for a custom content associated with the book 300, and transmit to the computer readable memory 204 of the book enhancement device 200 an audio file 114 (and optionally the configuration file 104) to enable the custom content to be transferred with the book 300 between electronic book enhancement devices 200. If a user profile 521 is associated with the book 300, the user 100 of the user profile 521 may be able to control whether the supporting enhancement dataset for a book 300 may be downloaded as the book 300 moves freely between book enhancement devices, or whether additional requirements may need to be met (e.g., a password or credential, etc.).

The enhancement unit synchronization routine 426 may determine whether the enhancement dataset stored on the book enhancement device 200 is synchronized with the enhancement coordination server 400, according to one or more embodiments. The enhancement unit synchronization routine 426 may comprise a software application or portion thereof that checks for latest software versions and/or synchronizes and/or backs up custom content the user 100 may have defined locally on the book enhancement device 200 and/or the computing device 600. In one or more embodiments, the enhancement unit synchronization routine 426 may periodically check for updated versions of each of one or enhancement datasets stored and/or installed on the book enhancement device 200, and/or notify the book enhancement device 200 through the network 151 that a new version is available. In one or more embodiments, the enhancement unit synchronization routine 426 may determine that a custom content is available for the book 300 of a user 100A, for example as may have been defined by a different user 100B remotely and uploaded to the enhancement coordination server 400 for access by the user 100A. The enhancement coordination server 400 then may transmit the audio dataset 101 (and/or other enhancement dataset) to the book enhancement device 200 of the user 100A to enable the voice of the second user 100B to remotely enhance a visual content of the book 300 for the first user 100A. For example, the user 100A may be a grandchild having a copy of the book 300A and a book enhancement device 200A, and the user 100B may be a grandparent having a copy of the book 300B and a book enhancement device 200B. Alternatively, the grandparent may be able to exclusively use the software application (e.g., the enhancement application 610) to generate the remote enhancement for the book 300 of the grandchild.

In one or more embodiments, the enhancement coordination server 400 may include a logging system 430 which may be a software application or portion thereof for receiving, processing and taking action in response to interaction logs 130 and/or entries 136 of interaction logs 130 of the interactions of the user 100 with a book 300 and/or a book enhancement device 200, according to one or more embodiments. The logging system 430 may comprise a log agent 432, a log assessment routine 434, a log notification routine 436, a configuration adjustment ruleset 437, and/or a configuration adjustment routine 438, according to one or more embodiments.

The log agent 432 may comprise a software application or portion thereof that receives, processes, and stores interaction logs 130 and/or entries 136 thereof communicated over the network 151. In one or more embodiments, the log agent 432 may comprise computer readable instructions that receive an interaction log 130 from a book enhancement device 200 and optionally store the interaction log 130 in a profile associated with an enhancement unit (as further described below), for example a user profile 521. The log assessment routine 434 may comprise a software application or portion thereof that evaluates an interaction log 130 and/or entries 136 thereof. The log assessment routine 434 may comprise computer readable instructions that when executed compare one or more interaction entries 136 of the interaction log and determine one or more interaction entries 136 are less than an interaction threshold. In one or more embodiments, the log assessment routine 434 may comprise computer readable instructions that when executed (i) determine an interaction of the user 100 from the interaction log 130; (ii) apply an interaction ruleset specifying a criteria for a sufficient interaction of the user 100 based a response time (e.g., a fast time) and/or a response accuracy (e.g., the correct button pressed for one interaction, or a percentage of correct buttons pressed for multiple interactions); and (iii) determine the interaction is less than an interaction threshold.

For example, a first entry 136A may be compared to a second entry 136B to compare the time between when the user 100 was provided a prompt versus when the user 100 provided a responsive action. It may then be determined, for example, that the user 100 took more than five seconds to provide the response (e.g., providing the user touch 259 to the correct interaction indicator 358), thus demonstrating that the user 100 may be having difficulty with the content of the book 300. The log notification routine 436 may comprise a software application or portion thereof that may generate notifications related to performance, difficulty, failures, successes, etc., based on the interaction logs 130. This may be especially useful for tracking progress of a class, measuring engagement of focus groups, and collecting anonymized usage data on user interactions with a book 300 to improve publisher and author content. In one or more embodiments, the log notification routine 436 may include computer readable instructions that when executed generate a performance notification comprising the user UID 521 of the user 100B for transmission to a different user 100A. For example, a performance notification may be generated and sent to a group administrator having an administrative permission with respect to the group (e.g., a user 100A administering a group). In an even more specific but not limiting example, an elementary school teacher (e.g., the user 100B) may be notified when a user 100A who is a student appears to be selecting incorrect answers in response to give prompts, and may be provided with the exact sheet 302 and/or prompt of the book 300 and related scores, as may be delivered in a report to the computing device 600 (e.g., on an application, through email, or other communication channel).

A configuration adjustment routine 438 may comprise a software application or portion thereof that automatically adjusts one or more configuration options of the book enhancement device 200, including for example with respect to an instance of the book 300. The configuration adjustment routine 438 may reference a configuration adjustment ruleset 437, which may comprise a set of general rules for any book 300, and/or may have specific rules of each book 300. In one or more embodiments, the configuration adjustment ruleset 437 may store coded rules for automatically changing configuration options. For example, fast response times of the user 100 may increase difficulty one tier, but even faster response times may increase difficulty by two tiers.

As an example of automatic configuration adjustment, upon a determination by the log assessment routine 434 that the interaction fails a threshold (e.g., which may be defined in the configuration adjustment ruleset), a configuration adjustment instruction may be generated and transmitted to the book enhancement device 200. If the book enhancement device 200 is not presently connected to the network 151, the configuration adjustment instruction may be stored for the next time such connection is detected. In one or more embodiments, the configuration adjustment routine 438 may comprise computer readable instructions that when executed detect the network connection from a book enhancement device 200 (e.g., associated with an enhancement unit of a group) and updates a configuration file 104 data of the book enhancement device 200 to adjust a first difficulty level (e.g., a difficulty level 115A) to a second difficulty level (e.g., a difficulty level 115B) to improve an enhanced reading experience of the user 100.

The enhancement coordination server 400 may include a group administration routine that includes a software application or portion thereof for creating, defining, and/or managing groups of user profiles 521 and/or enhancement units, according to one or more embodiments. In one or more embodiments, the group administration routine 480 may comprise computer readable instructions that when executed designate a set of two or more enhancement units, generate a group UID, and associate the group UID with the set of the set of two or more enhancement units to define the group in a database (e.g., the grouping database 530). The enhancement unit will now be described.

An enhancement unit may be a data entity that may be individually tracked in a database and to which custom content may become associated within the database (custom content, state datasets 140, interaction logs 130, and/or configuration files 104 can be said to "adhere" to the enhancement unit). For example, a pair of a user profile 521 and a book profile 442 may be an enhancement unit (e.g., as tracked by a combination of the user UID 512 and a book UID 441 corresponding to any printed copy of the book 300 having the same book title and the book content). Although possible to track the enhancement unit as a separate data entity having its own profile, it is also possible to track within the user profile 521 and/or the book profile 442 (a book reference in the user profile 521, and/or a user profile reference inside the book profile 442). For the combination of the user profile 521 and the book profile 442, any custom content generated by the user 100 associated with the user profile 521 may "adhere" to the book 300, regardless of the exact physical copy mounted to the book enhancement device 200 of the user 100, as long as the user 100 was logged into and/or otherwise known to own that book enhancement device 200. In this case, the user 100 could lose the exact physical copy of the book 300, but buy a replacement at a bookstore or online. The user 100 would therefore continue to have access to the custom content the user 100 may have defined (or others defined and sent to the user 100 remotely).

Another example of an enhancement unit may be a book GUID corresponding to a unique printed copy of a book 300. In this case, unique content may "adhere" to the unique printed copy, and follow the unique printed copy of the book 300 as it transfers between users 100 and/or book enhancement devices 200. Yet another example of an enhancement unit may be a specific manufactured copy of the book enhancement device 200 in combination with a book profile 442, as may be tracked by an enhancement device UID (e.g., a hardware ID) in combination with a book UID 441 corresponding to any printed copy of the book 300 having the book title and the book content.

The group administration routine 480, in one or more embodiments, may therefore group enhancement units of different types. A teacher (e.g., a user 100A) may be able to define a group representing his or her class, for example where three students may own book enhancement devices 200 and buy copies of the book 300, four students borrow book enhancement devices 200 from the school but purchase copies of the book 300 having assigned book GUIDs 443 (such that their coursework can "follow" the book if they later purchase a book enhancement device 200), and two other students who may own book enhancement devices 200 but check the book 300 out of the library for temporary use, but still wish to retain coursework that can be stored in their user profile 521, according to one or more embodiments. Enhancement units and flexibility in designating entities to which custom content can adhere may therefore ease the formation of groups of otherwise disparate hardware, software, registered profile status, and/or book ownership.

The enhancement coordination server 400 may also include a voice extension engine 490, according to one or more embodiments. In one or more embodiments, the voice extension engine 490 comprises computer readable instructions that when executed receive an audio file comprising a voice sample of a user 100 (e.g., reading text of a first page of the book), and input the voice sample into a voice synthesis engine to generate a voice profile from the voice sample. The voice extension engine 490 may also include computer readable instructions that when executed apply the voice profile to a text file (e.g., the book text 446) to an audio file 114 comprising a synthesized voice, and store the audio file 114 in the audio dataset 101, for example as an audio file 114 in association with a page UID 110 (and/or button UID 112). The result may automatically extend the voice of the user 100 to content the book (e.g., text on one or more other pages 303).

In one or more embodiments, the enhancement coordination server 400 may include a book enhancement database 440. The book enhancement database 440 may store one or more book profiles 442 each of which may store and/or include a reference to one or more enhancement datasets. In one or more embodiments, the book profile 442 may include a book UID 441 and/or one or more assigned book GUIDs 443 (which may be stored in a GUID dataset 448), a book title 444, book information 445 (e.g., publisher, version, copyright date, authors, editors, and/or other bibliographic information), digital and/or print files for the book content (e.g., a book text 446, book graphics 447), and/or an associated audio dataset 101 (and/or a reference to the audio dataset 101 stored in a different database). The book enhancement database 440 may be utilized to store book profiles 442 for both custom defined books (e.g., a blank notebook sold to a user 100, a create-your-own story book, etc.) and professionally defined instances of a book 300 (e.g., by a self-published author, by a publisher, etc.). The book text 446 may be queried by the voice extension engine 490 to extend a voice of a user 100 to content of the book 300. The book text 336 also may be queried for analysis and/or performance evaluation of data extracted from the log dataset 140, according to one or more embodiments.

In one or more embodiments, the enhancement coordination server 400 may include a custom enhancement database 450. The custom enhancement database 450 may store custom-defined instances of an audio dataset 101 or data thereof. In one or more embodiments, a custom audio dataset 101 may either be a complete copy of an audio dataset 101 with additional changes, and/or may only store data sufficient to describe any custom content added to a referenced audio dataset 101. As one example, and referring to FIG. 2.2, where the audio dataset 101 may be a professionally produced audio dataset 101, a user 100 may define the custom audio dataset 101 that may only include the page UID 110A associated with both the button UID 112A and the audio file 114D with the custom 119 field. The custom audio dataset 101 may be stored in association with a number of other data entities and/or designated enhancement units, including a reference to the book profile 442 (e.g., the book reference 451, including any book GUID 443), a reference to the user profile 521 and then a book 300 (e.g., via the user reference 452 and the book reference 451 in combination), and/or an enhancement device reference 453 in combination with a book reference 451. As an example of use of the custom enhancement database 450, in one or more embodiments, may occur upon a user 100 mounting the book 300 in a book enhancement device 200 to which the user 100 is logged into the user profile 521. In this example, the custom enhancement database 450 may be queried to determine whether: (i) the user profile 552 is referenced (e.g., whether the user UID 512 is returned), and if so; (ii), whether the book profile 442 is referenced (e.g., whether the book UID 441 is returned), and if so; (iii) whether a custom audio dataset 101 is stored, and if so; (iv) download the custom audio dataset 101. Such a query and download may be effected as part of the content initialization routine 424 and/or the enhancement unit synchronization routine 426, according to one or more embodiments.

In one or more embodiments, the enhancement coordination server 400 may include a log database 460 that may store data describing interactions of users 100 with books 300 and/or book enhancement devices 200. Data may be logged according to enhancement unit, similar to data in the custom enhancement database 450. For example, the user reference 452 in combination with a book reference 451 may be associated with an interaction log 130. Another enhancement unit is also demonstrated, the unique book reference 461 associated with an interaction log 130. In one or more other embodiments, the interaction log 130 may be stored in association with the user profile 521 and/or the book profile 442. Alternatively or in addition, the log database 460 may be used to store anonymized instances of the interaction log 130 for query and analysis by professional creators, authors, and publishers, to help improve books 300 and book enhancements.

In one or more embodiments, the enhancement coordination server 400 may include a template database 470. The template database 470 may store templates for creation of enhancement datasets, for example the audio dataset 101. As a simple example, there may be a "fairytale" template (e.g., the enhancement template 472A) recommended for creating content for ages three to five that provides instructions to a user 100 how to set up and enhance a book 300. In the example fairytale template, "page 1" of a book 300 may have an area to draw a "hero" (e.g., that will complete and/or add to the visual content 305 of "page 1" once added) and "page 2" may include two interactions indicators 358, one to record the text to be written in a box about the hero, and one to record a calling or strange happening that propels the hero into the story beginning on "page 3". In the present example, the enhancement template 472 may be stored data that includes audio instructions for the user 100 when the user opens to a page (e.g., as sensed by the page detection sensor 242).

For example, the template, once loaded into the book enhancement device 200 and initiated by the user, may begin a content-creation process: "Page 1 is where you draw you're hero! Page 2 is where your write about your hero. Then, when you are done writing, hold the first button and read the text aloud. You can press the button to hear your recording, or hold the button again to re-record. When you are satisfied, press the second button and record your hero's 'calling to adventure'. When you are ready, turn the page and we'll keep going!"

In another example, the enhancement template 472B may be utilized for a training manual, for example for automotive repair. The template may comprise code for a visual layout application and/or software wizard that helps content creators. For example, the template may enable importation of 2D computer aided design (CAD) schematics, where the content creator can decide on a layout for the visual content 305, add text, define interaction indicators 358, and then record audio and/or define other enhancements. The enhancement template 472B, when loaded into the layout software application, may have a number of page patterns to select from, including a central area on each page 303 for the visual content 305 and then relatively small instances of the interaction indicators 358 around the parameter of the sheet 302 which the content creator can use to draw reference lines to each portion of the visual schematics in the center of the sheet 302. As just one example, the visual content 305 may be an engine diagram, where each interaction indicator 358 when pressed plays an audio file 114 of a sound of the engine under both normal operation and abnormal operation. The software application and/or wizard may then automatically generate a book profile 442 and/or enhancement dataset which may be uploaded to the book enhancement server 400.

Figure 5:
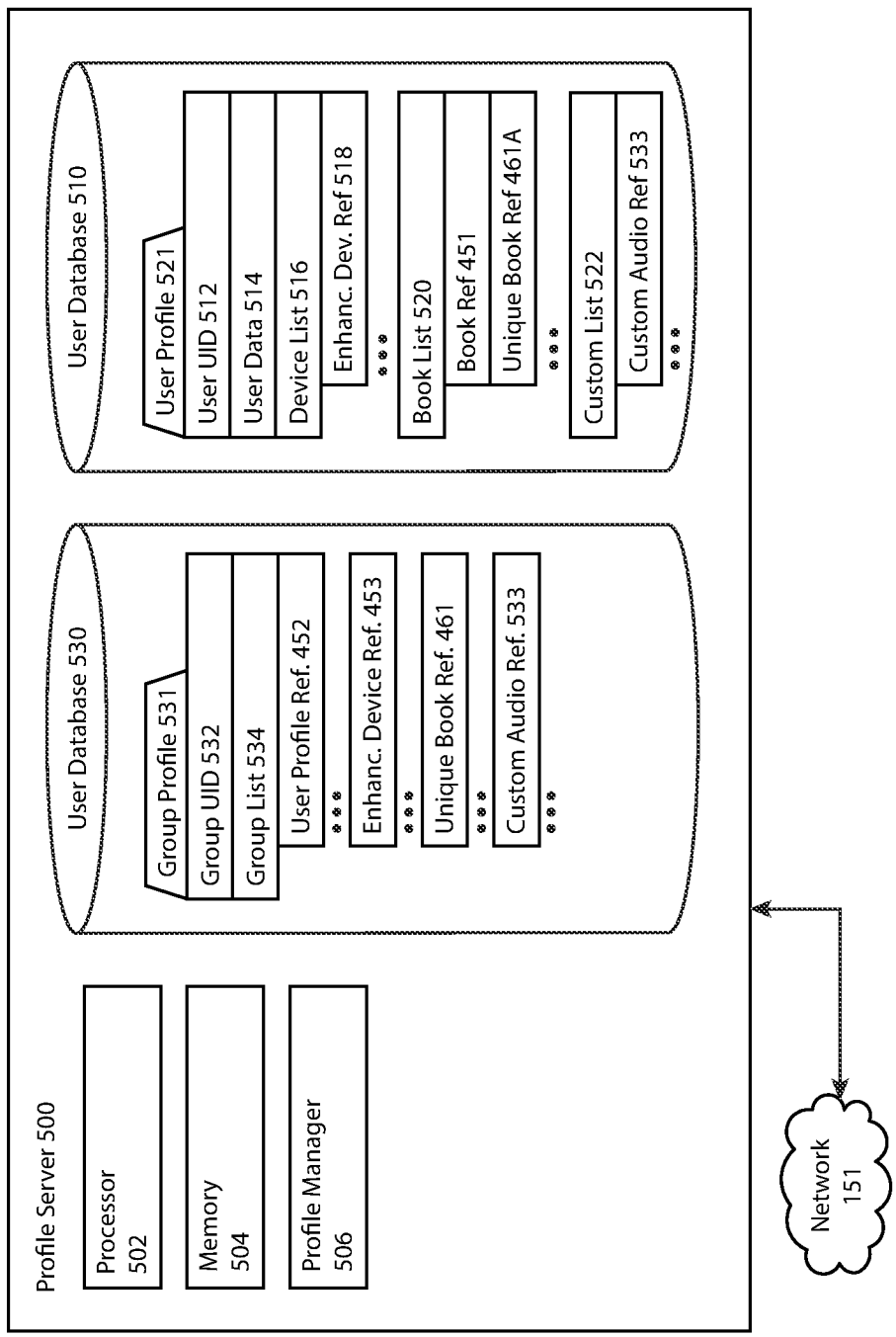
FIG. 5 illustrates a profile server including a user database storing user profiles with which custom content can be created and/or stored, and a grouping database enabling groupings of users participating in a common reading experience, for example for a teacher to define or assign content available to everyone in the group (e.g., elementary school class, corporate workshops, a private book club, etc.), according to one or more embodiments.

FIG. 5 illustrates a profile server 500 that may store one or more user profiles 521 associated with a user 100 and/or group profiles 531 that may group two or more instances of the user profile 521, according to one or more embodiments. The profile server 500 may include a processor 502, a memory 504, and a profile manager 506. The profile manager 506 may comprise a software application or portion thereof to authenticate a user 100 when the user 100 attempts to control or otherwise take action on behalf of a user profile 521, including logging into a book enhancement device 200, according to one or more embodiments.

In one or more embodiments, the profile server 500 may include a user database 500 comprising one or more user profiles 521. The user profile 521 may include a user UID 512, a user data 514, and/or a device list 516 of devices associated with the user profile 521 (e.g., instance of the book enhancement device 200 that the user 100 owns, leases, or is authorized to use, and/or computing devices 600 associated with the user 100). The user data 514, for example, may include data about or related to the user 100, for example personal data, demographic data, contact data, and/or geographic data. The user profile 521 may also include a book list 520 comprising one or more book references 451 and/or one or more unique book references 461 to books 300 that the user 100 may own or control, according to one or more embodiments. The user profile 521 may also include a custom list 522 that may include a custom audio reference 533 (e.g., a custom audio dataset 101 that may be stored in the custom enhancement database 450), according to one or more embodiments. In one or more other embodiments, custom audio datasets 101, interaction logs 130, and/or state datasets 140 may be stored directly in the user profile 521.

The profile server 500 may further comprise a grouping database 530 storing one or more group profiles 531, according to one or more embodiments. In one or more embodiments, the group profile 531 may comprise a group UID 532 and a group list 534 comprising one or more references to user profiles 521 (e.g., the user reference 452 within the group list 534), one or more enhancement device references 453, and/or one or more unique copies of a book (e.g., the unique book reference 461). In one or more embodiments, the group list 534 may include two or more enhancement units.

Figure 6:
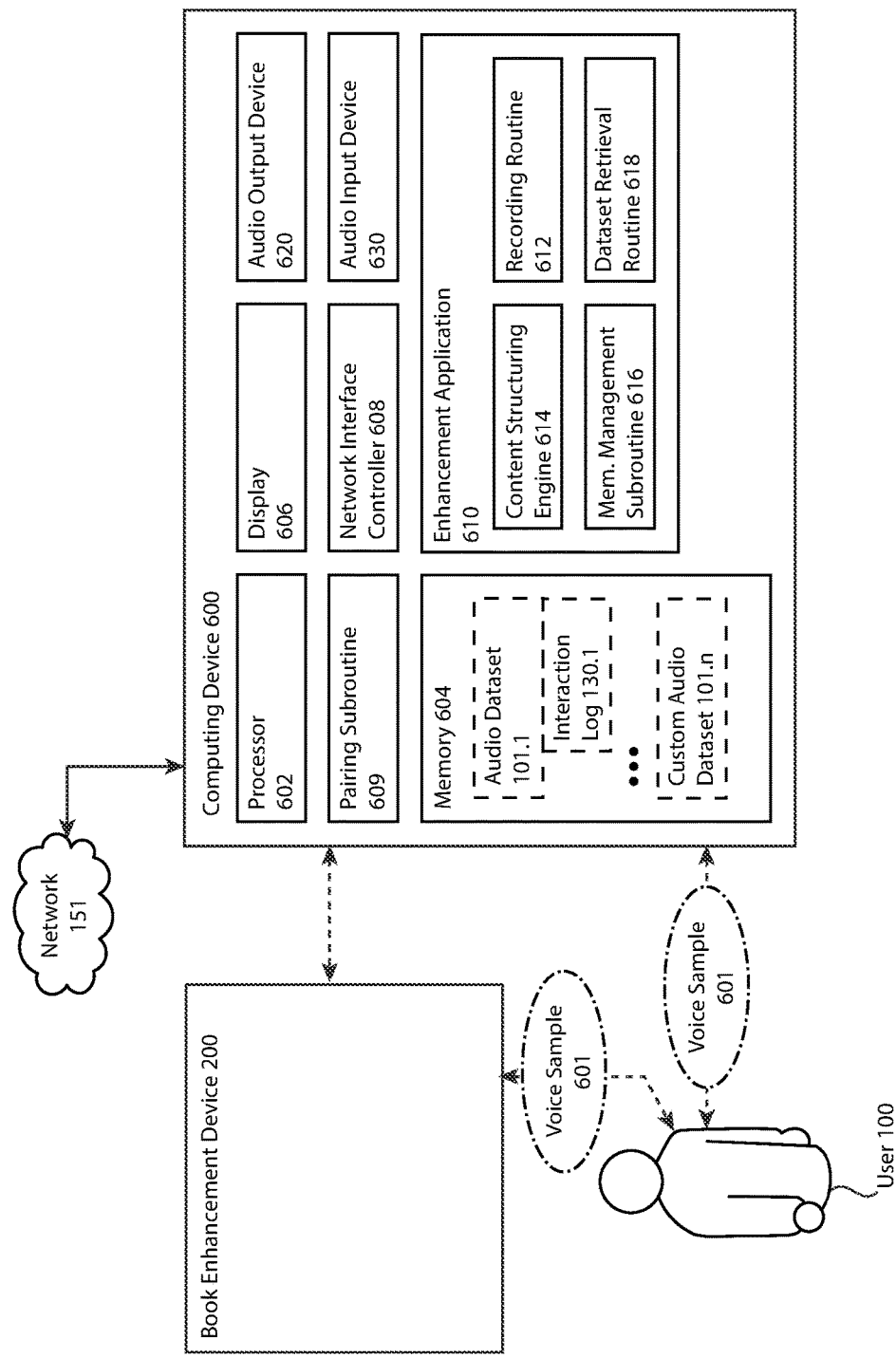
FIG. 6 illustrates a computing device of the user, such as a smartphone, tablet device, laptop, or personal computer, which may be associated with and/or paired with the book enhancement device to support content creation, content management, and/or profile management related to the book enhancement devices, according to one or more embodiments.

FIG. 6 illustrates the computing device 600, which may optionally support the book enhancement device 200 and/or a group of book enhancement devices 200, according to one or more embodiments. The computing device 600 may comprise an operating system (e.g., Linux, iOS, Windows, Android) on which software applications can be installed, one or more of such applications capable of supporting the book enhancement device 200 and/or communicating over the network 151 with one or more servers, such as the enhancement coordination server 400 and/or the profile server 500. In one or more embodiments, the computing device 600 may be a smartphone, a tablet computer, a notebook computer, and/or a desktop computer. The computing device 600 may include a processor 602, a memory 604, a display 606 (e.g., an LCD screen), an audio output device 620 (e.g., a speaker, a USB-C output, a headphone or headset jack), an audio input device 630 (e.g., a microphone, a USB-C input, a microphone or headset jack), and/or a network interface controller 608 that may include a wireless network interface controller.

In one or more embodiments, the computing device 600 may be wired or wirelessly communicatively coupled to one or more book enhancement devices 200. For example, by holding a button on the book enhancement device 200 (as may be selectable by holding a button 258 when the book 300 is not mounted), the book enhancement device 200 may enter a wireless pairing mode (e.g., via a Bluetooth® protocol) and show up as a pairable device on a user interface of the computing device 600. When communicatively coupled, the computing device 600 may be able to act as an interface to help manage content, define custom content, log in the user 100, and/or interface with the enhancement coordination server 400. For example, where the book enhancement device 200 does not include a display 203, it may be easier to use the display 606 to browse versions of book enhancements 200 that are available, re-record or scroll through custom defined content, change security settings on the user profile 521 (e.g., reset passwords, set up two-factor authentication, bind and unbind book enhancement devices 200, etc.), and take other actions. Similarly, in one or more embodiments, the network interface controller 212 of the book enhancement device 200 may include some of the capabilities required to communicate with the enhancement coordination server 400, for example wired, wireless, and/or cellular communication protocols (e.g., WiFi®), and may therefore leverage the network interface controller 608 of the computing device 600.

The memory 604 may store one or more instances of the audio dataset 101, associated interaction logs 130, associated state datasets 140 (not shown), and/or associated custom audio dataset 101. It is possible the computing device 600 may have relatively large memory capacity compared with the book enhancement device 200, and therefore content of a user 100 may be primarily stored until needed and/or content may be backed up on the memory 604, according to one or more embodiments.

In one or more embodiments, the computing device 600 may comprise an enhancement application 610. The enhancement application 610 may include a content structuring engine 614, which may operate similar to the content structuring engine 414, as shown and described in conjunction with the embodiment of FIG. 4, except that the content structuring engine 614 may execute at least partially on the processor 602 of the computing device 600. In one or more embodiments, the content structuring engine 414 and/or the content structuring engine 614 comprises computer readable instructions that when executed: (i) select a book UID 441 (and/or a book GUID 443); (ii) select a page UID 110; (iii) select a button UID 112; and (iv) store a user audio file 114 in an audio dataset 101 in association with the page UID 110 and the button UID 112 of the page UID 110. In one or more embodiments, the user audio file 114 may be recorded on the computing device 600. In one or more embodiments, a recording routine 612 may comprise computer readable instructions when executed receive an audio signal of a user 100 on an audio input device 630, and record a user audio file 114 of the audio signal of the user 100. Although not shown, the enhancement application 610 may also include a conditional structuring engine 418 and/or arbitrary scripting capability that may enable more complex enhancements and enhancement triggers to be defined.

In one or more embodiments, the enhancement application 610 may include a memory management subroutine 616 comprising computer readable instructions when executed select an instance of the audio dataset 101 on the computer readable memory 204 of the book enhancement device 200 to update or delete. For example, the user 100 may be able to view on the user interface of the enhancement application 610 a list of "currently installed books" having enhancement datasets stored in the book enhancement device 200, and may see an icon next to each if updates or special downloadable content (e.g., "DLC") is available.

In one or more embodiments, the enhancement application 610 may include a dataset retrieval routine 618 that may generate a content request 207. The content request 207 may be generated, for example, upon mounting of the book 300 and a subsequent determination is on the book enhancement device 200 and/or the computing device 600 that a matching audio dataset 101 is not present on either device.

It should be noted that in one or more embodiments, the computing device 600 may carry out several functions of the book enhancement device 200. For example, a more minimal implementation of the book enhancement device 200 may include no audio output device 220, no audio input device 230, and no storage of audio datasets 101. Rather, the book enhancement device 200 may utilize the audio output device 620, the audio input device 630, and/or the memory 604 of the computing device 600 to carry out these functions. The computing device 600 and the enhancement application 610 may also include a client-side component of the voice extension engine 490. For example, the user 100 may be able to submit the voice sample 601 through the client-side component, which is communicated to the voice extension engine 490, according to one or more embodiments. Alternatively, or in addition, the voice sample 601 may be submitted directly through the book enhancement device 200, which then may be communicated directly through the network 151 and/or passed through the computing device 600.

Figure 7:
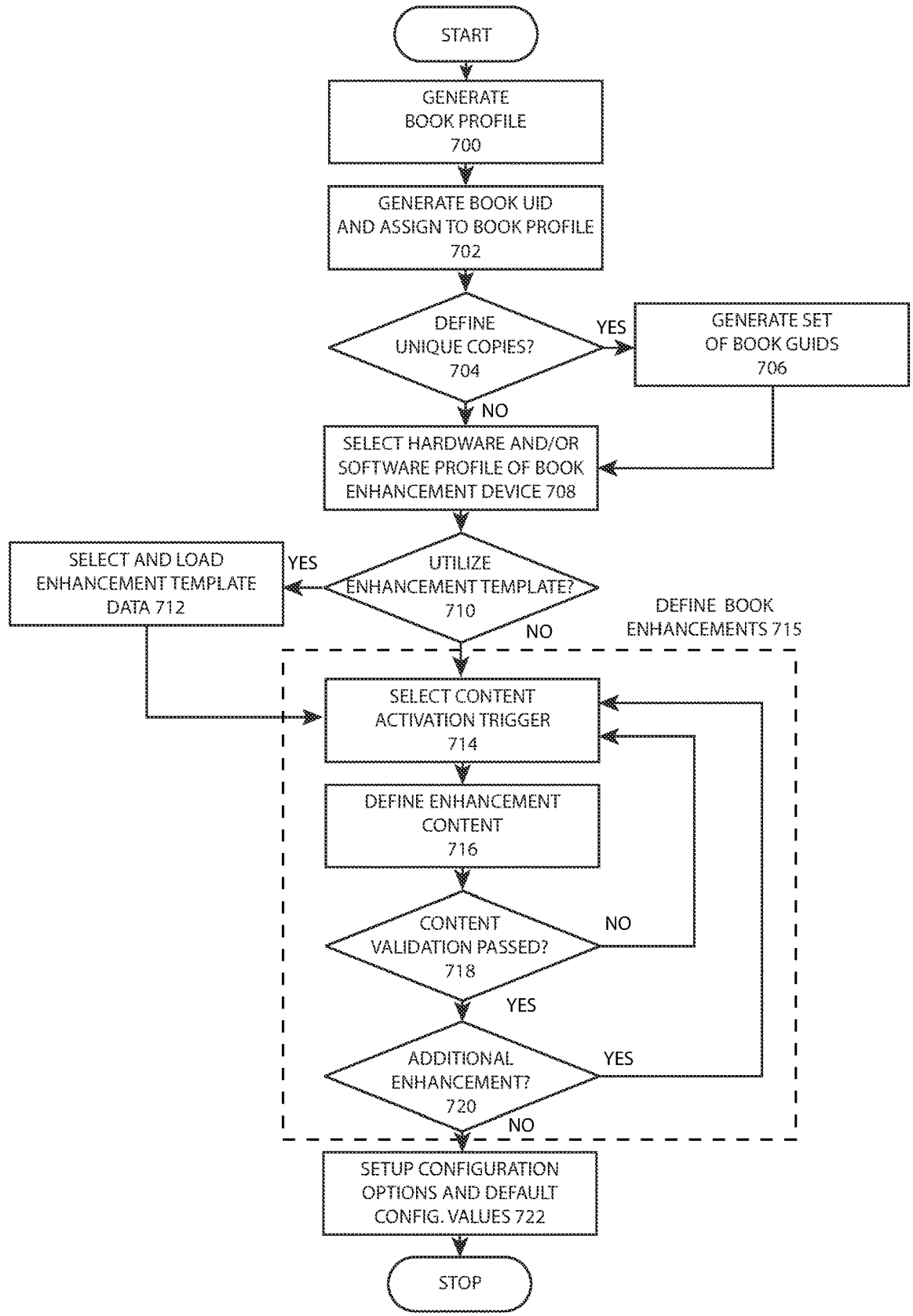
FIG. 7 illustrates a book provisioning process flow enabling content creators and/or publishers to define new enhanceable books, and also illustrating enhancement of such books, according to one or more embodiments.

FIG. 7 illustrates a book provisioning process flow 750 comprising one or more processes that can be utilized to provision a new instance of the book 300 and supporting enhancement data therefore, according to one or more embodiments. Operation 700 generates a book profile, for example reserving memory for the book profile 442 in the book enhancement database 440. Operation 702 generates a book UID 441 and assigns (e.g., stores within or otherwise associates) the book UID 441 to the book profile 442. Operation 704 determines whether unique copies of the book 300 should be defined and/or should be utilizable for tracking.

A discussion of the user of the book UID 441 and the book GUID 443 is now provided. The book UID 441 may be used to assign a unique identifier to a combination of a book title (e.g., the book title 444), version (e.g., as stored in the book information 445), and content (e.g., as stored in the book text 446 and/or the book graphics 447). Many physical copies of the book 300 with such book title, version, and content can be produced (e.g., in a printing or other fabrication run). Each such physical copy would then bear the book UID 441, for example electronically in the beacon 307 detectable by the book detection sensor 240 (and/or printed in a code that could be manually read by the user 100). The book UID 441 may be human readable (e.g., "The Jungle Book, 18th printing"), partially human-readable ("JUNGB00018"), and/or a random string of values as may be generated by a hash function or other algorithm (e.g., via SHA-256). An enhancement unit can be designated for tracking when some other unique trackable component, etc. (e.g., a user profile 521, a trackable instance of the book enhancement device 200) is designated.

In contrast, the book GUID 443 may be a value, in one or more embodiments, that may uniquely distinguishes a copy of the book 300 having a book title 444 and a book content against all other copies of the book 300 having the book title 444 and the book content. The book GUID 443, in one or more preferred embodiments, is a random string of characters such that there is a low likelihood of a value "collision" among generated values. Any generated values may be checked for such collision, in one or more embodiments. The book GUID 443 may be electronically stored, for example in the beacon 307 readable with the book detection sensor 240. The book 300 associated with the book GUID 443 may therefore represent its own enhancement unit that may be tracked and to which custom content, interaction logs 130, state datasets 140 and/or preferred configuration may automatically "adhere" (e.g., in the log database 460, in the custom enhancement database 450, etc.). A book 300 may have both a book UID 441 and a set of assigned book GUIDs 443 for each physical copy of the book 300, according to one or more embodiments.

Returning to the embodiment of FIG. 7, if unique copies are to be defined, operation 704 proceeds to operation 706 which may generate a set of one or more book GUIDs 443, for example by calling a GUID generator and/or hash function provided with a random input such as data generated from an entropy source. Any generated book GUIDs 443 may be stored in the GUID dataset 448 of the book profile 442, according to one or more embodiments. Alternatively, or in addition, a set of book GUIDs 443 may already have been embedded in hardware (e.g., NFC chips), and the set "taken out of inventory" of an enterprise resource planning system (ERP system) or other inventory system. For example, a content creator or publisher, when setting up the book profile 442, may purchase and request delivery of attachable beacons 307 (and/or other beacons, such as the beacons 306) such that any book or publication having certain suitable characteristics to match the design of the book enhancement device 200 (e.g., meeting requirements for page size, binding thickness, number of pages, etc.) can be used to create the book 300. In one or more embodiments, a book GUID 443 may be generated and embedded in a book identifier electronically readable by a book detection sensor 240. Operation 706 then may proceed to operation 708.

If no unique copies are to be defined, operation 704 may also advance to operation 708. Operation 708 may select a hardware profile and/or a software profile of a book enhancement device 200 that may be able to support the book 300. For example, there may be several versions of the book enhancement device 200 (e.g., a small version for notebook-sized paper with six touch sensors 208 and a large version for full-size paper with twenty touch sensors 208). As another example, there may be a range of models of the book enhancement device 200 developed and sold to consumers over a number of years having different capabilities. For example, there may be an older version without a display 203 and a newer version with a display 203. As another example, there may be a version with mechanical buttons 258 and a newer version with software definable buttons 258 on a resistive touchpad. Selection of supportable hardware and/or software may also be used to determine the available enhancement templates 472 for content development. Operation 708 may then proceed to operation 710.

Operation 710 may determine whether an enhancement template 472 should be utilized. If an enhancement template 472 should be utilized, operation 710 proceeds to operation 712 in which data of an enhancement template 472 may be selected and loaded, for example into a content creation application, a content creation wizard, and/or other tool. Operation 712 then proceeds to operation 715 for defining book enhancements for the book 300. If no enhancement template 472 is to be selected, operation 710 may also proceed to operation 715. It should also be noted that optionally, an operation 711 (not shown) may be defined which may determine a number of pages or buttons per page defined within the book profile 442. For example, sixteen pages may be specified, each of which may be assigned a page UID 110, and each page UID 110 or group of pages UID 110 may have defined one or more associated instances of the button UID 112. These selections may also be automatically selected as a default, may be automatically set up during selection of an enhancement template 472, and/or may be defined as the book enhancements are defined in operation 715.

Operation 715 defines one or more enhancements for the book 300, for example by selecting an enhancement and a trigger for that enhancement (e.g., supportable by the hardware and/or software of the book enhancement device 200), according to one or more embodiments. In one or more embodiments, operation 715 may comprise at least four operations: operation 714, operation 716, operation 718, and operation 720. Operation 714 may select an activation trigger for an enhancement. The trigger may be simple or relatively complex. In one or more embodiments, an enhancement trigger may include the detection of a new book 300 mounted to the book enhancement device 200, the detection of a new active page 303 (e.g., through detection of the beacon 306), detection of a user touch 259 (e.g., thorough a touch sensor 208), a movement of the book enhancement device 200 (e.g., as sensed by an accelerometer), a specific voice input provided by the user 100 to a microphone 282 (in such case that the book enhancement device 200 includes a voice control and/or interaction interface), etc. In one or more embodiments, other triggers may require a specific sequence of user touches 259, certain timings of user touches 259, certain actions taken by the user 100 in combination with certain data stored in the state dataset 140 and/or interaction log 130, etc. The defined trigger then may be stored in an enhancement dataset.

Operation 716 then defines an enhancement content. For example, the enhancement content may include a sound (e.g., from the audio file 114), a vibration, a lighting (e.g., the indicator lights 218), a vibration, and/or other enhancements perceptible to the user 100. Although not shown, an operation 717 may also store data within the state dataset 140 and/or the interaction log 130, for example to track previous choices the user 100 made while interacting with the book 300. Operation 718 may validate the trigger and/or the enhancement, for example to determine if a selection is outside of the hardware or software capabilities of the book enhancement device 200, counter to the enhancement template 472, and/or to ensure quality control on arbitrarily executable scripts (e.g., to ensure the script finish executing within a finite time period, such as 5 seconds). If validation is not passed, operation 718 may return to operation 714, possibly without storing any data permanently within the enhancement dataset. However, operation 718 may also provide helpful guidance or identified errors for the content creator. Otherwise, if validation is passed, operation 718 may proceed to operation 720. Operation 720 may determine if another enhancement is to be added. If another enhancement is to be added, operation 722 returns to operation 714. Otherwise, operation 720 may store and/or commit the enhancement dataset and proceed to operation 722.

Operation 722 may set up configuration operations and/or default configuration values. For example, configuration options may include which languages the book 300 will support, which difficulty levels the book 300 will support, etc. Default values may then be set for the book enhancements defined in operation 715. If the content creator wishes to define enhancement content such as additional versions (e.g., Spanish), operation 715 may be repeated for those configurations. Alternatively, or in addition, the configuration for which the book enhancements are defined may be selected prior to operation 715. Operation 722 may also allow for setup of any configuration page 308 of the book 300 to match selectable options. Operation 722 may also allow for hardware and/or software specific selections, for example whether audio files 114 can overlay one another (e.g., overlaid audio signals played on the speaker 222), interrupt one another, and/or are scheduled or queued. Other hardware and/or software options of the book enhancement device 200 may include maximum brightness of the indicator lights 218 when playing the book 300, modes of sensing depending on the type of beacons planned to be used with the book 300, sensitivity of sensors (e.g., due to a certain thickness of paper planned to be in the book 300), etc.

Figure 8:
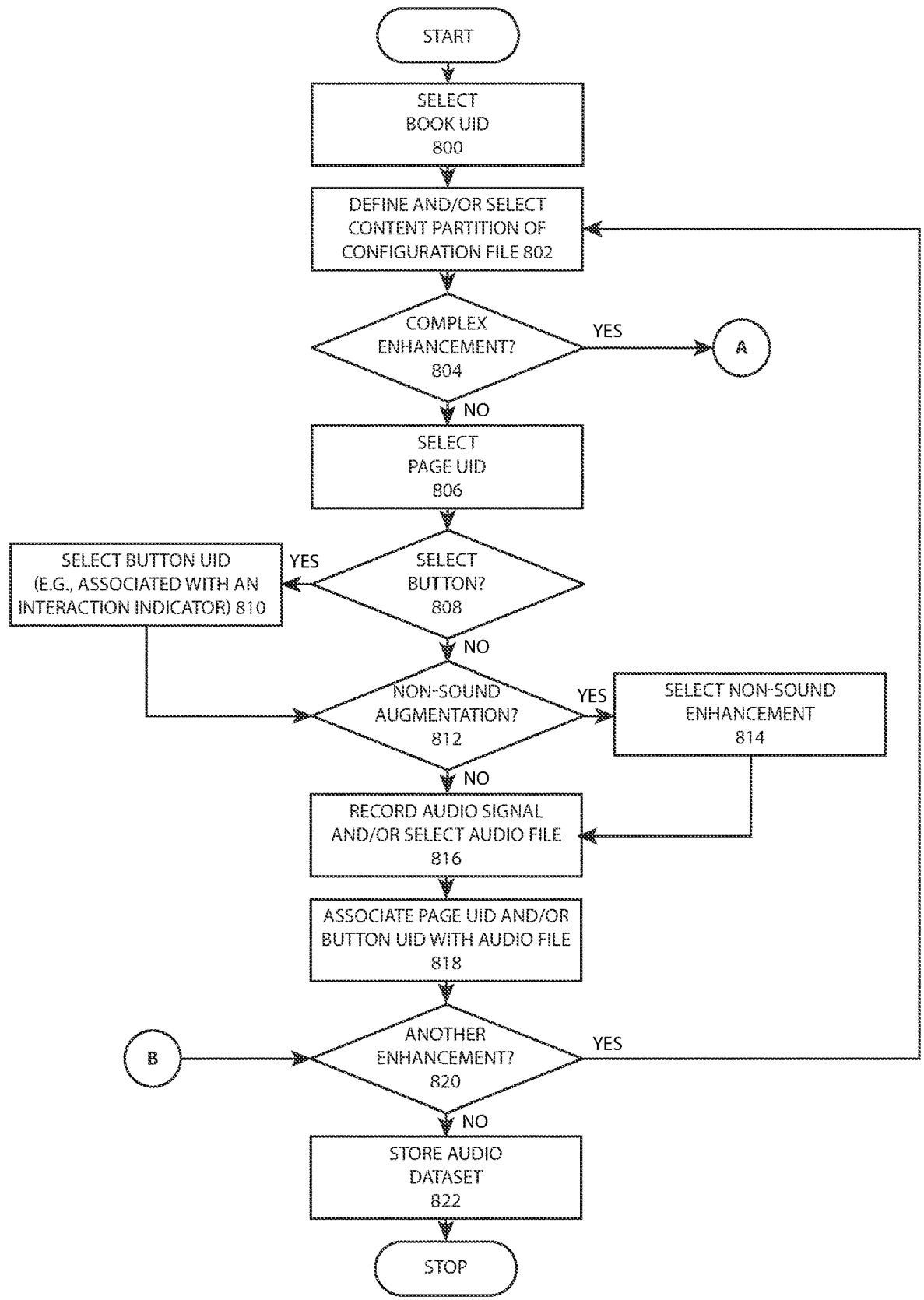
FIG. 8 is an audio dataset generation process flow for illustrating creation of the audio dataset usable to enhance a book with audio, for example the audio dataset as structured in FIG. 2.2, according to one or more embodiments.

FIG. 8 illustrates an audio dataset generation process flow 850, according to one or more embodiments. Although FIG. 8 illustrates generation of an audio dataset 101, it will be evident that various operations may be replaced with other forms of enhancement to define a general enhancement dataset generation process flow, according to one or more embodiments.

Operation 800 selects a book UID 441, for example from book profile 442. Operation 802 defines and/or selects a content partition of a configuration file 104, for example a difficulty level 105, a language 106, a content type 107, an ability 108, and/or a custom 109 field, according to one or more embodiments. Operation 804 determines whether an enhancement is a complex enhancement, in which case operation 804 proceeds through connector 'circle A' to the the audio dataset generation process flow 950 of FIG. 9. Where no complex enhancement is to be defined, operation 804 may proceed to operation 806 which may select a page UID 110 of a sheet 302 of the book 300, as such available page UIDs 110 may be stored in association with the book profile 442. Operation 808 determines whether a button is to be selected, in which case operation 810 selects a button UID 112. The button UID 112 may be associated with an interaction indicator 358. Operation 810 may then proceed to operation 812, which may also be proceeded to in such case that no button 258 will act as a trigger for the enhancement.

Operation 812 determines whether a non-sound enhancement should be alternatively and/or additionally triggered, in which case operation 814 selects such non-sound enhancement, for example lighting, vibration, displayable graphics on a display 203, etc. Operation 814 then proceeds to operation 816. Similarly, where a non-sound enhancement is not to be selected, operation 812 may proceed to operation 816. Operation 816 records an audio signal (e.g., of a user 100) and/or selects an audio file 114 to be triggered. Operation 818 then associates the page UID 110 and/or button UID 112 with the audio file 114, for example representing triggers within the audio dataset 101 that can be read by an audio routine 246.

Operation 820 determines whether an additional enhancement is to be applied. If an additional enhancement should be defined, operation 820 returns to operation 802. Otherwise, operation 822 proceeds to operation 822 which may store and/or commit the audio dataset 101 (e.g., within the book enhancement database 440).

Figure 9:
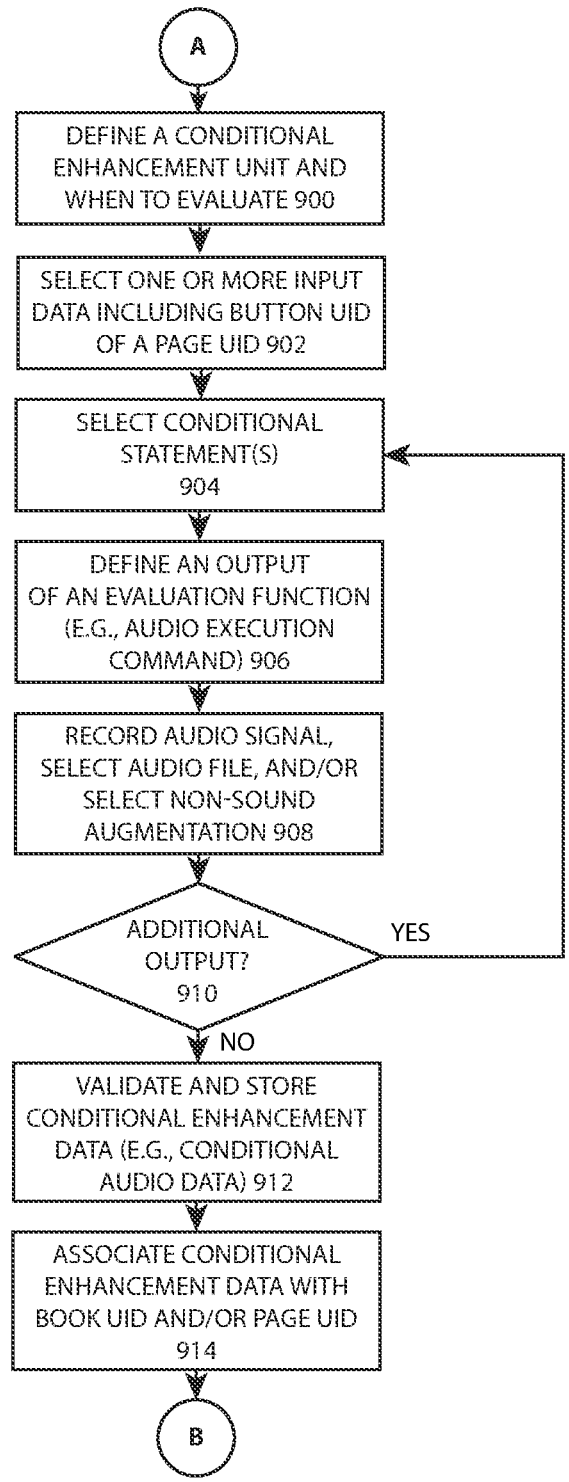
FIG. 9 illustrates an audio dataset generation process flow illustrating one method for structuring a complex conditional enhancement that can allow for highly creative and flexible content, such as standardized testing, "choose-your-own adventure" stories, and/or other arbitrarily complex content, according to one or more embodiments.

FIG. 9 illustrates an audio dataset generation process flow 950 usable to define more complex triggers and/or enhancements, according to one or more embodiments. Operation 900, which may initiate as a result of a selection in operation 804 of FIG. 8, defines a conditional enhancement unit and a trigger for when to evaluate the conditional enhancement unit. An objective of the conditional enhancement unit, for example, may be identification of the correct number of clues the user 100 must have selected to correctly guess the perpetrator of a crime in a detective story. In another example, the objective may be a certain enhancement content of the book 300 (e.g., enhancements for a next chapter) may not unlock unless a certain threshold of correct answers are provided as may be tracked in the state dataset 140 for interactions of the user 100 with the book 300. Operation 902 may select one or more input data that will be used to evaluate whether the trigger is met, and specifically, in one or more embodiments and the embodiment of FIG. 9, a button UID 112 of a page UID 110. Operation 902 may store each input in a function 120, according to one or more embodiments.

Operation 904 may select a conditional enhancement statement, for example whether one input data was provided before another, whether the input data was provided as a response within an elapse time of a prompt, etc. Operation 904 may be used to define the conditional 122, according to one or more embodiments. Operation 906 may then define an output of an evaluation of a function 120 comprising the conditional 122, for example generation of an audio execution command 124 (and/or another enhancement execution command). Operation 908 may then select an audio file 114 and/or record an audio signal to be stored as the audio file 114, and/or may select a non-sound enhancement. Operation 908 may then proceed to operation 910 which may determine whether an additional output should be selected, in which case operation 910 may return to operation 904. Otherwise, operation 910 may proceed to operation 912, which may validate (e.g., check for errors, timeout loops, etc.). Operation 910 may also store the conditional enhancement data, specifically in the case of FIG. 9 and one or more other embodiments, as a conditional audio data. Operation 914 may then associated the conditional enhancement data with the book UID 441 and/or the page UID 110, according to one or more embodiments. Operation 914 may then end, or return along path 'circle B' to operation 810 of FIG. 8. Once an enhancement dataset such as the audio dataset 101 has been defined (for example as described in conjunction with FIG. 7, FIG. 8, and/or FIG. 9), a book 300, when mounted on the book enhancement device 200, may read and/or execute enhancements based on the enhancement datasets, according to one or more embodiments.

Figure 10:
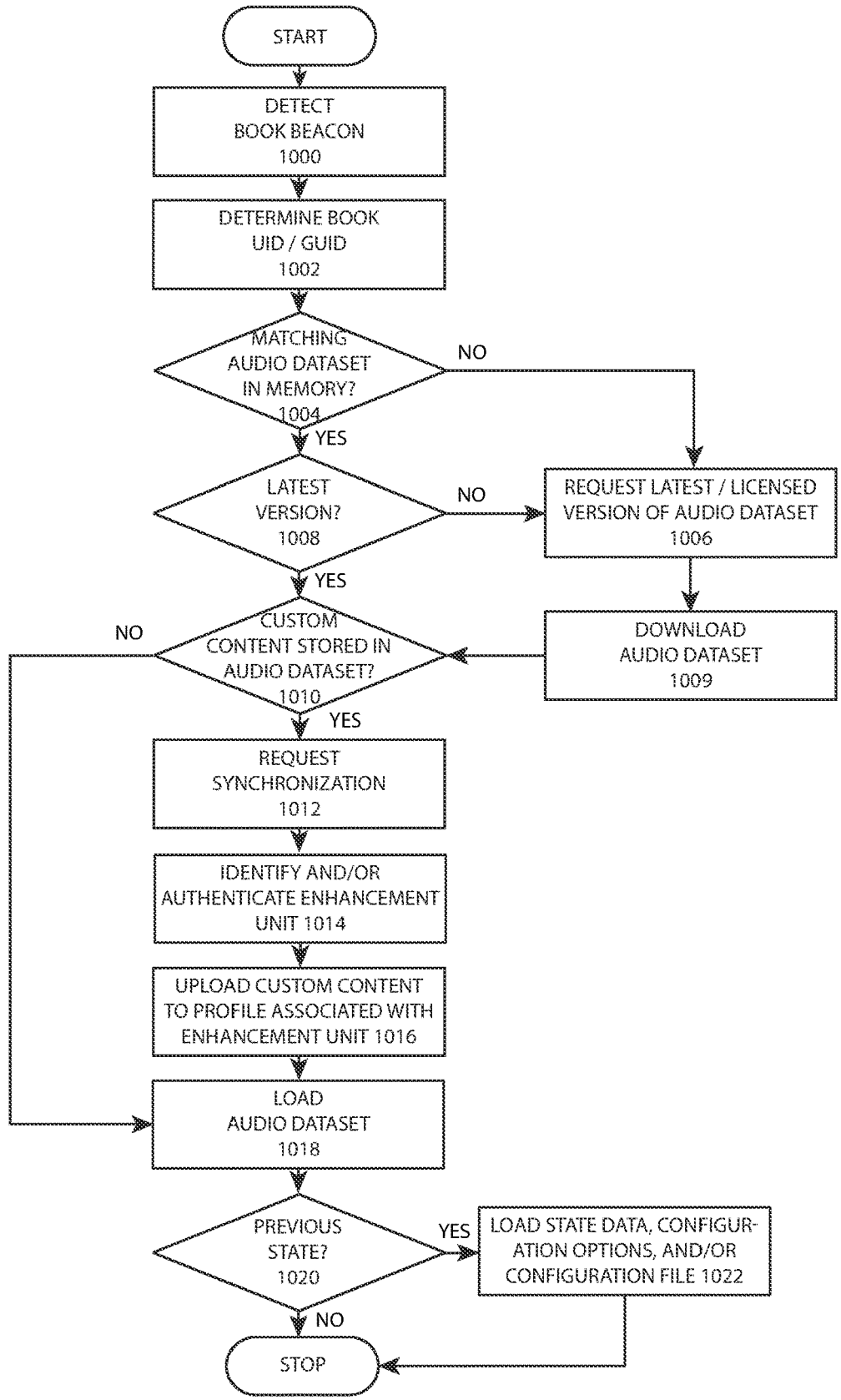
FIG. 10 illustrates a book initiation process flow for initiating a book, a book profile and its associated enhancement dataset when coupled the book enhancement device, according to one or more embodiments.

FIG. 10 is a book initiation process flow 1050, for example executable by software of the book enhancement device 200, according to one or more embodiments. Operation 1000 detects a book beacon, for example the beacon 307. Operation 1002 determines a book identifier that is a book UID 441 and/or a book GUID 443, for example as may be electronically stored and extracted in the book beacon. Operation 1004 determines whether an enhancement dataset such as an audio dataset 101 matches the book identifier in memory (e.g., as may be stored in a book reference 102 and/or a unique book reference 403 in the memory 204). If no matching enhancement dataset is determined, operation 1004 may proceed to operation 1006 which may request a latest and/or licensed version of the enhancement dataset such as the audio dataset 101, for example by generating the content request 207. Operation 1006 may then proceed to operation 1009 which may download the enhancement dataset, for instance the audio dataset 101. If a matching enhancement dataset is determined in operation 1004, operation 1004 may proceed to operation 1008 which may determine whether the stored version of the enhancement dataset is a latest version, for example by checking a version number and/or a version control checksum with the enhancement coordination server 400 over the network 151. If the enhancement dataset is not in its latest version, operation 1008 may proceed to operation 1006. If the enhancement dataset is in its latest version, operation 1008 may proceed to operation 1010.

Operation 1010 may determine whether custom content may be stored in association with the enhancement dataset such as the audio dataset 101. For example, the custom dataset may have been defined by the user 100 in the audio dataset 101, for instance in the embodiment of FIG. 2.2 the custom dataset may include the audio file 114D, the custom 119 field and/or the custom 109 option of the configuration file 104. If no custom content is stored, operation 1010 may proceed to operation 1018, as further described below. However, if custom content is stored, operation 1010 may proceed to operation 1012 which may generate a synchronization request. A server, such as the coordination server 400, may then synchronize custom data with local data of the book enhancement device 200 and/or a supporting instance of the computing device 600. In one or more embodiments, synchronization may occur through the recognition of an enhancement unit. For example, operation 1012 may proceed to operation 1014, which may identify and/or authenticate an enhancement unit. Operation 1016 may then upload the custom content (e.g., the entire instance of the audio dataset 101, or just the custom portions thereof) to a profile associated with the enhancement unit. The profile, for example, may be to store a custom audio dataset 101 in the custom enhancement database 450 in association with a user reference 452, a book reference 451, a unique book reference 461, and/or an enhancement device reference 453, according to one or more embodiments. Operation 1016 may then proceed to operation 1018. Although operation 1016 relates to uploading custom content, it will be recognized that operation 1016 may instead download custom content if the book enhancement device 200 instead lacks any custom content backed up and/or stored on the server. Known version control and/or backup architectures may be utilized to ensure proper synchronization such that custom enhancements of the user 100 are not lost, and/or can be reverted in the event an improper synchronization overwrites custom content (e.g., an error resulting from incorrect device clocks), according to one or more embodiments.

Operation 1018 loads the enhancement dataset such as the audio dataset 101 into working memory such that it is ready for use and/or to have instructions executed against it. Operation 1020 optionally determines if a previous state is associated with the enhancement unit, and if so proceeds to operation 1022 which may load the state dataset 140 and/or configuration data. Note that a previous state dataset 140, configuration options, and/or configuration file 104 may also be transmitted, backed up, and later downloaded. For example, operation 1010 may alternatively, or in addition, determine whether the previous state dataset 140, configuration options, and/or configuration file 104 are available. Operation 1012, operation 1014, and operation 1016 may then request synchronization of such data, identify an enhancement unit, and then download such data.

In one or more embodiments, additional operations (for example integrated into FIG. 10) may create permanent or semi-permanent associations, or "bindings" between various profiles, devices, and/or books. For example, a book 300 may become registered or "bound" to a user profile 521, a book enhancement device 200 may become bound to a user profile 521, a book 300 may become bound to a device profile for a book enhancement device 200, etc.

In one or more embodiments, a user profile 521 (e.g., through an association of a user UID 512) may be bound to a unique printed copy of the book 300 having the book GUID 443 and/or the book enhancement device 200 having a enhancement device UID (e.g., of a device profile, not shown).

Figure 11:
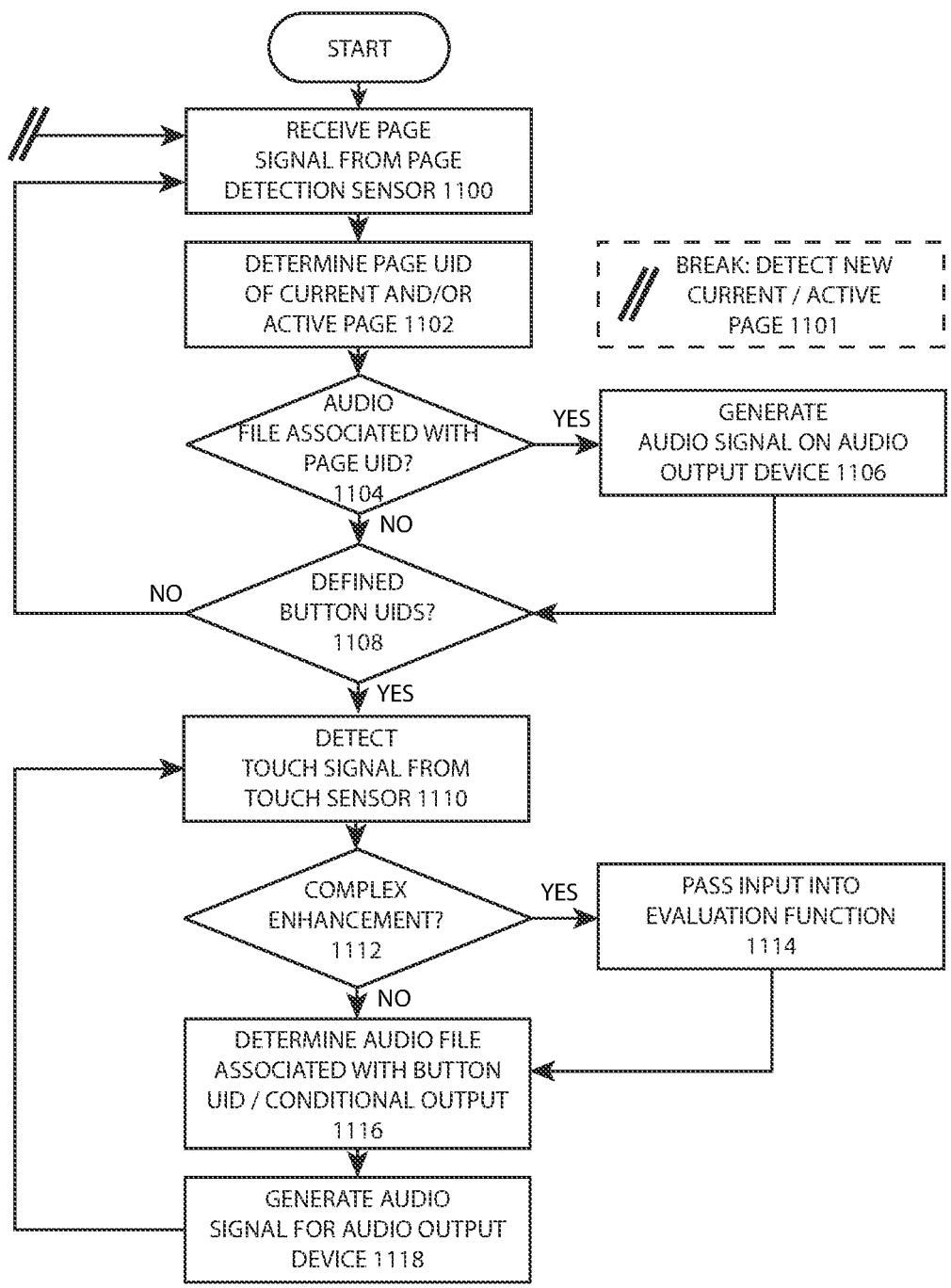
FIG. 11 is an enhancement execution process flow illustrating a process by which interactions may be detected and a defined response generated, according to one or more embodiments.

FIG. 11 illustrates an enhancement execution process flow 1150, according to one or more embodiments. Operation 1100 receives a page signal 243 from a page detection sensor 242. For example, the user 100 may turn to a sheet 302 of the book 300. The detection of operation 1100 may be continuous, or only occur upon a new signal input. In one or more embodiments, at any time during the operation of the enhancement execution process flow 1150, operation 1101 may create a break in process that returns to operation 1100. For example, operation 1101 may be configured to initiate any time that a beacon 306 (e.g., a beacon 306B) is no longer detected in a detection zone 292 and/or upon a new instance of a beacon 306 (e.g., a beacon 306B) being detected in the detection zone 292. Operation 1102 may determine a page UID 110 of a current and/or active sheet 302 of the book 300. Operation 1104 may then determine if an audio file 114 is associated with the page UID 110. If an audio file 114 is associated with the page UID 110, operation 1104 may proceed to operation 1106, which may generate an audio signal on an audio output device 220 and then proceed to operation 1108. Operation 1104 and operation 1106 may be used, for example, to implement an automated reading of a book 300 when the user 100 turns each sheet 302. For example, when the user 100 turns to "page 1", the title of the book and its author may be automatically read with an audio signal via the speaker 222, and when the user 100 turns to a spread in which both "page 2" and "page 3" are visible to the user 100, each may be automatically read sequentially and automatically.

Operation 1108 may determine if one or more button UIDs 112 have been specified, and if not returns to operation 1100. If one or more button UIDs 112 have been specified, operation 1108 may proceed to operation 1110 which may detect one or more touch signals 209 (e.g., from a user touch 259) from a touch sensor 208, such as a touch sensor 208. Operation 1112 determines whether the touch signal 209 may act as an input to a complex enhancement, in which case operation 1114 may pass the input into an evaluation function (e.g., the function 120). Otherwise, operation 1112 will advance to operation 1116. Operation 1116 may determine an audio file 114 associated with the button UID 112 and/or an output of a function 120. Operation 1118 may then generate an audio signal for the audio output device 220, and then return to operation 1110. Operation 1110 through 1118 may loop until the occurrence of operation 1101 causing a break. The enhancement execution process flow 1150 may terminate upon dismounting of the book 300 from the book enhancement device 200, generation of the shutdown signal 215, upon completion of certain conditions (e.g., completion of a multiple choice test in the book 300), and/or other conditions.

In one or more embodiments, both a simple and complex enhancement and triggers can overlap and/or intersect. For example, and as operation 1110 through operation 1118 illustrate, selecting a touch sensor 208 may simultaneously initiate an audio file 114 and also act as an input data to a function 120. As just one example, and referring to the embodiment of FIG. 3, each chemical or piece of lab equipment selected (as each are shown to the user 100 as visual content 305 next to interactions indicators 358) may have its own sound when the user touch 259 is provided, but selecting the right chemicals and equipment, in the correct order, may generate an additional audio signal (e.g., an audio file 114 encoding a voice that says "you did it! You can turn the page to go onto the next challenge").

Figure 12:
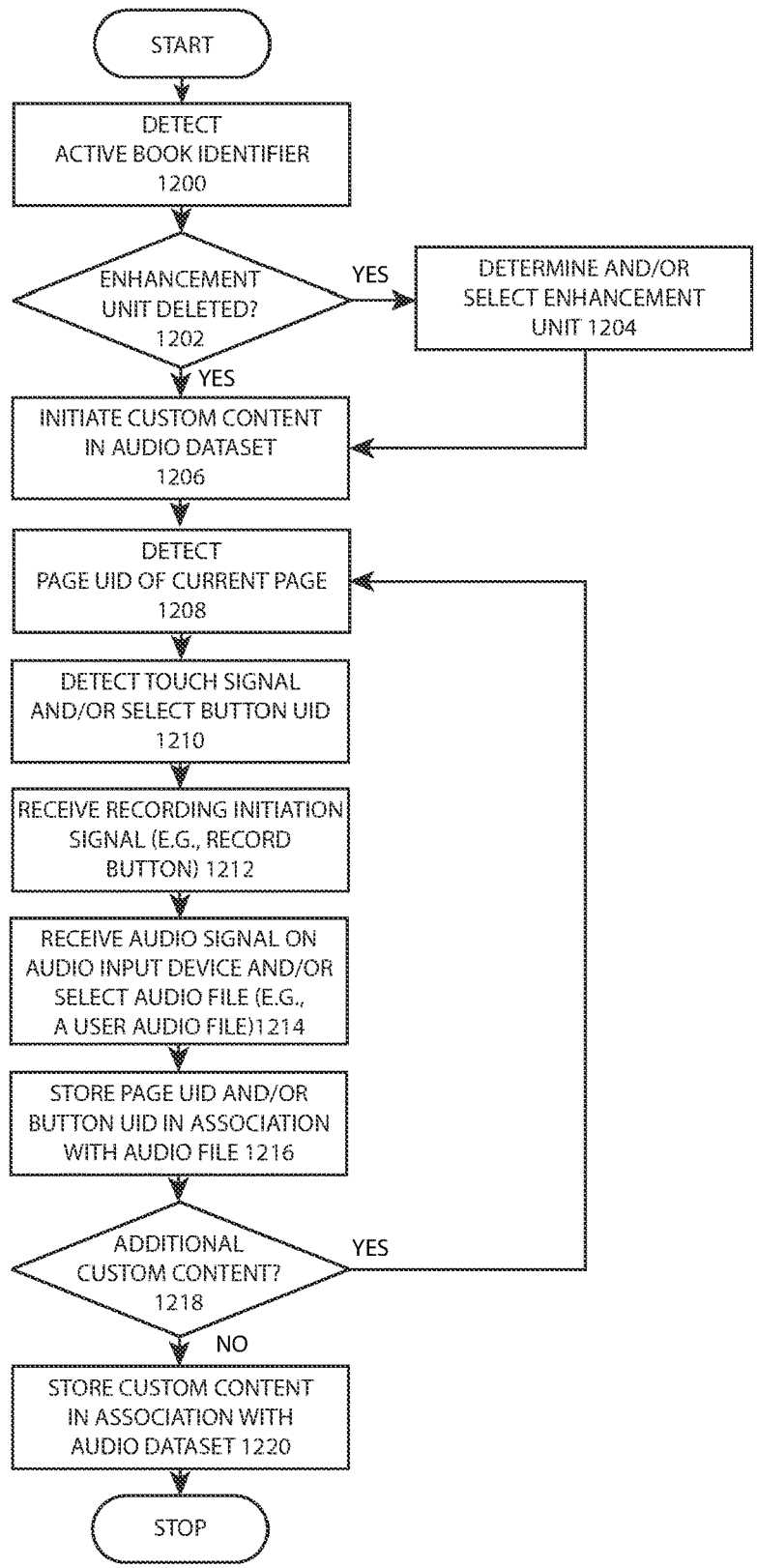
FIG. 12 illustrates a custom content generation process flow, for example by which a user who may not be a publisher may define custom enhancements that can be transmitted to other users, for example their friends, family, and students, according to one or more embodiments.

FIG. 12 illustrates a custom content generation process flow 1250, according to one or more embodiments. The content generation process flow 1250 may illustrate an efficient and natural feeling interaction between the user 100 and the book 300 to enhance the book, while using the book 300 itself in combination with the book enhancement device 200 as a user interface for content creation, according to one or more embodiments. Operation 1200 detects an active book identifier, for example a beacon 307 (that may electronically store a book UID 441 and/or a book GUID 443). Operation 1202 determines if an enhancement unit to which custom content may adhere is detected. If detected, or if an enhancement unit need not be specified, operation 1202 proceeds to operation 1206. However, if an enhancement unit is not detected and one should be specified, operation 1202 may advance to operation 1204 to determine and/or select an enhancement unit. For example, in one or more embodiments, there may be a hierarchy of enhancement unit selection. If a book GUID 443 is detected indicating a unique physical copy of the book 300 is to be tracked, the custom content may "adhere" to a unique profile of the book 300 designated with the book GUID 443, and/or may be tracked in the custom enhancement database 450 with a unique book reference 461 associated with the custom audio dataset 101. Continuing the example, the second next important profile on the hierarchy can be defined as a user profile 521 that is logged in on, or otherwise known to own or control, the book enhancement device 200. Third on the hierarchy may be a hardware identifier of the book enhancement device 200 in combination with the book UID 441, etc. Note that in the last case, custom content may be held in a transitionary state until a user 100 logs into a user profile 521 on the book enhancement device 200, at which time the custom content may be shifted to a different enhancement unit (e.g., the user profile 521 in combination with the book UID 441), either in the memory 204 of the book enhancement device 200, the memory 404 of the coordination server 400, the custom enhancement database 450, and/or another location. Operation 1206 initiates custom content in an enhancement dataset such as an audio dataset 101. For example, memory may be reserved and/or attributes generated for custom content, e.g., the custom 109 field of the configuration file 104, the custom 119 designation to be associated with an audio file 114 to be created, etc.

The user 100 may be able to naturally interact with the book 300 while generating enhancements, according to one or more embodiments. Operation 1208 detects a page UID 110 of a current and/or active page 303 of the book 300, for example through sensing a page UID 110. As an operation 1207, not shown, the user 100 may record an audio file 114 or other enhancement to initiate automatically upon detection of the page UID 110. Operation 1210 may then detect a touch signal 209 associated with a button UID 112, and/or the user 100 may otherwise select a button UID 112 (e.g., through the computing device 600 which may be used to support the custom content creation). Operation 1212 then receives a recording initiation signal, for example by the user 100 depressing a record button 216 which may be a physical button on the book enhancement device 200 and/or a touchscreen UI element on the enhancement application 610, according to one or more embodiments. Alternatively, or in addition, the recording signal may be generated by simply holding the touch sensor 208 associated with the button UID 112 (where pressing may allow the user 100 to playback the recording to ensure they are satisfied with it).

Operation 1214 may receive an audio signal on an audio input device (e.g., the audio input device 230, the audio input device 630. For example, a microphone 232 may be used to record a voice of the user 100 as they hold the book enhancement device 200 with the book 300 attached. Operation 1214 may alternatively or in addition select an audio file 114, for example one that may have been pre-recorded, downloaded, or otherwise created or selected by the user 100. As just one example, operation 1214 may be used to select one of one or more of a number of audio sounds available to the user 100 (e.g., water rushing, an explosion, a siren, a famous soundbite from a presidential speech, etc.), for example as may be selectable through an interface of the enhancement application 610. Custom effects may also be applied to the audio signal and/or its associated audio file 114, for example musical auto-tuning, voice filters, etc.

Operation 1216 may store a page UID 110 and/or a button UID 112 in association with an audio file 114, according to one or more embodiments. Operation 1218 determines if additional custom content should be defined, in which case operation 1218 returns to operation 1208. If the creation of custom content is complete, the custom content may be stored in association with the audio dataset 101 in operation 1220. Operation 1220 may define such an association with an enhancement dataset, wherever stored, for example on the book enhancement device 200, on the computing device 600, and/or on the coordination server 400, according to one or more embodiments.

Figure 13:
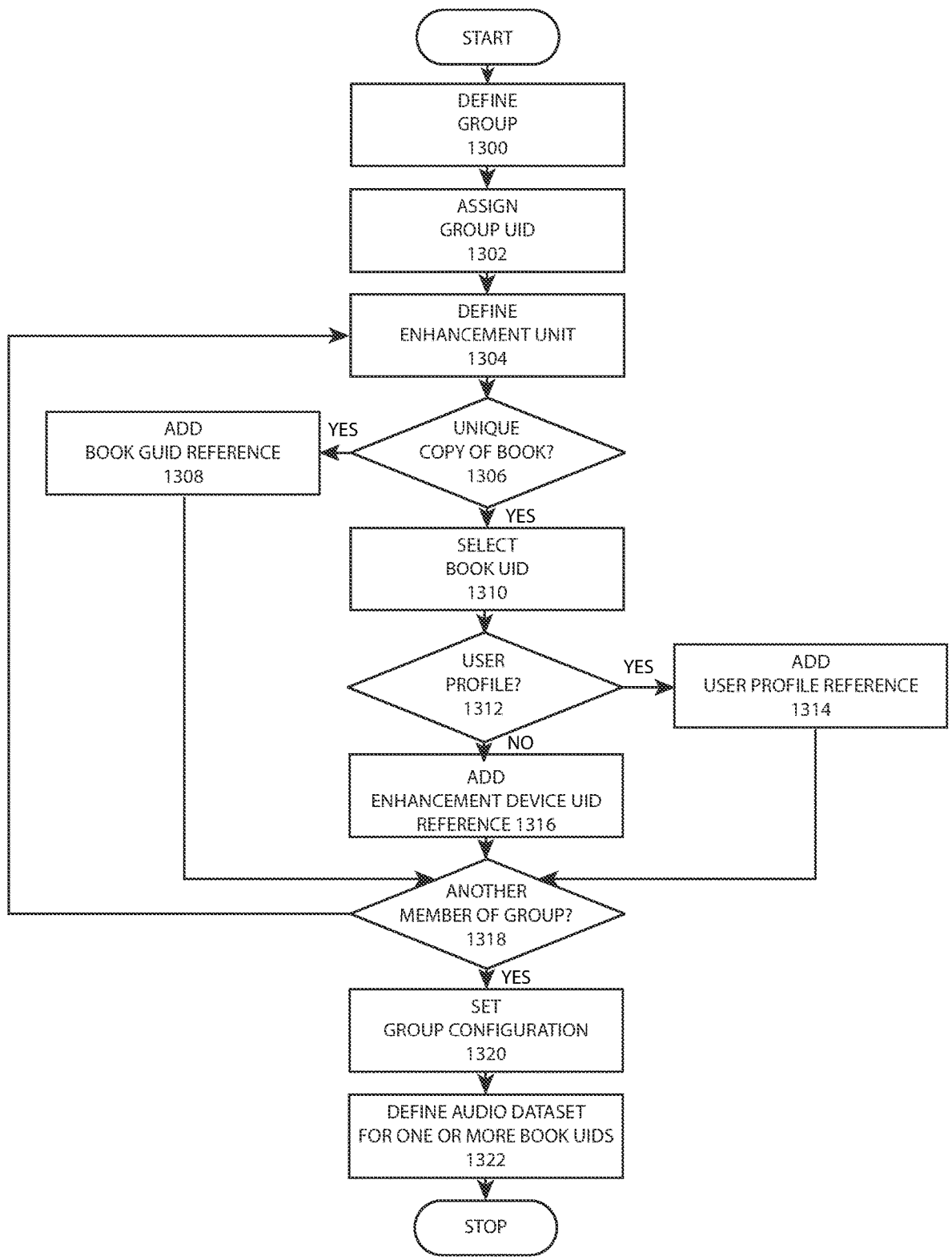
FIG. 13 illustrates a group enhancement setup process flow for defining and administering a group of users for a shared enhancement experience, including accommodation of varying enhancement units where various users in the group my own or borrow book enhancement devices and/or books in various combinations, according to one or more embodiments.

FIG. 13 illustrates a group enhancement setup process flow 1350, according to one or more embodiments. Operation 1300 defines a group for participation and/or receipt of custom content. The group may represent, for example, a set of family members, students in an academic class, attendees of a seminar, members of an organization or body (e.g., a corporate board), etc. Operation 1302 may assign a group UID 532 to the group, and may set up a group profile 531. Operation 1304 may then select members of the group. Specifically in the embodiment of FIG. 13, and one or more other embodiments, the selection may be made through selecting enhancement units, including disparate enhancement units as previously described. Operation 1306 determines whether a unique physical copy of a book 300 should be specified, in which case operation 1309 adds a unique book reference 461, for example by storing the book GUID 443 in an attribute for the unique book reference 461. Operation 1308 then proceeds to operation 1318. If no unique copy is to be selected, operation 1306 may advance to operation 1310 which selects and/or references a book 300 (e.g., of a similar title and content), for example by storing the book UID 441. Operation 1310 may then proceed to operation 1312 which may determine whether a user profile 521 should be selected. If a user profile 521 is to be selected, operation 521 may proceed to operation 1314 which may add a user reference 452 (e.g., by storing a user UID 512). Operation 1314 may then proceed to operation 1318. If no user profile 521 is to be selected, operation 1306 may proceed to operation 1316, which may utilize some other identifier in combination with the book designation. For example, operation 1316 may utilize a book enhancement device reference, for example storing a MAC address, an IOT address, a static IP address, a network address, or other unique identifier assigned to the book enhancement device 200, according to one or more embodiments.

Operation 1318 determines whether additional enhancement units should be defined, in which case operation 1318 returns to operation 1304 for designation of another enhancement unit. Otherwise, operation 1318 may proceed to operation 1320 which may set a group configuration. For example, an administrator of the group may determine a default language or difficulty such that each member of the group and/or enhancement unit initially begins on the selected defaults. The administrator may have an administrative permission, and may be able to distribute and/or allocate content creation responsibilities, opportunities, and/or sharing privileges amongst the group. Operation 1320 may also be used to lock certain features and/or configuration options, for example preventing a change in difficulty level 105 until the beacon 309 (e.g., in the form of a gold mastery star sticker) may be detected on the detection zone 294. Operation 1320 may then proceed to operation 1322, in which an enhancement dataset such as the audio dataset 101 may be defined for the selected books of the enhancement unit, for example the book 300 associated with the book GUID 443 that may have been selected in operation 1308 and/or the book UID 441 that may have been selected in operation 1310. For example, enhancement content may be defined according to the embodiments of FIG. 7, FIG. 8, and FIG. 9, according to one or more embodiments. In one or more embodiments, for example following defining an enhancement dataset, a network connection from an enhancement unit of the set of two or more enhancement units of the group may be detected, and the audio dataset 101 transmitted to a different instance of the book enhancement device 200 associated with the enhancement unit.

As a specific example, a seminar may be given to a corporate board with a set of base material in an audio dataset 101 (prerecorded audio files 114 with predetermined triggers), but certain "blank" locations for enhancement may allow a facilitator to add custom material in their own voice, or other commentary or writing prompts, allowing the other users 100 of the group to feel a closer connection with a personality involved in organizing and/or running the seminar. Alternatively, or in addition, members of the group may also define custom content available to the rest of the group, as for example may be uploaded from the book enhancement device 200 be utilized by each user 100 and then downloaded by the other instances of the book enhancement device 200 in the group. For example, an exercise at the seminar may include a prompt at the top of a sheet 302 (e.g., part of the visual content 305). Continuing the example, the prompt may ask the user 100 to "tell us your best and worst experience with a merger or acquisition in less than one minute", where each interaction indicator 358 on the sheet 302 is assigned to a particular enhancement unit and/or user 100 of the group, and upon completing the exercise each member of the group will have access to the others' responses. The dataset retrieval routine 247 and/or the enhancement unit synchronization routine 426 may, for example, check for and download new custom content available to the group, as may be stored in the group profile 531 (e.g., in a custom audio reference 533), according to one or more embodiments.

Figure 14:
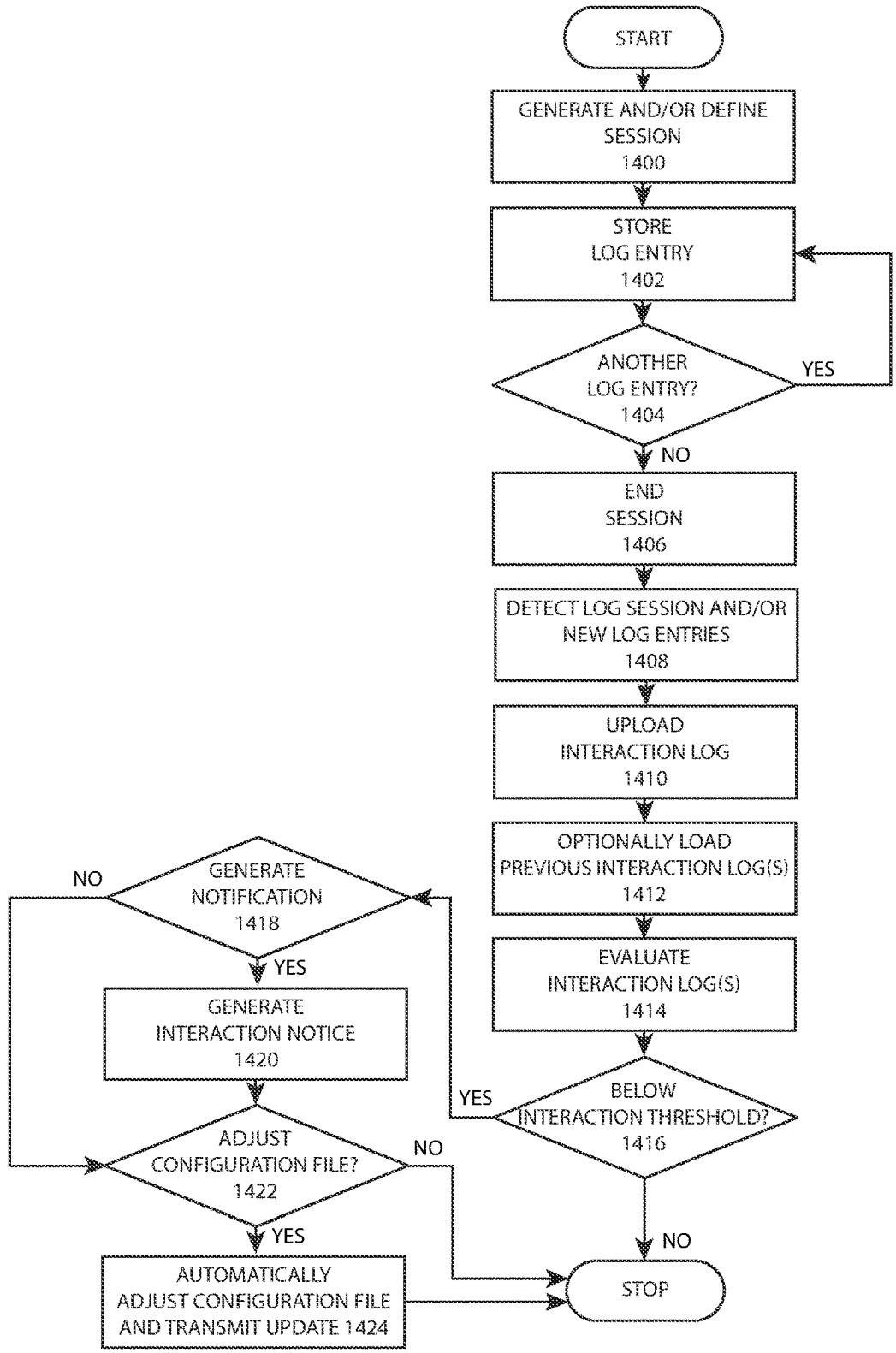
FIG. 14 illustrates an interaction log process flow, including illustrating automatic notification and/or content configuration adjustment depending on an evaluation of the interaction logs, for example to assist a user in lowering the difficulty of an interaction, to ensure a user completed reading or interaction with a book, etc., according to one or more embodiments.

FIG. 14 illustrates an interaction log process flow 1450, according to one or more embodiments. Operation 1300 may generate and/or define a session in which interactions between the user 100 and the book 300 and/or book enhancement device 200 may be tracked. For example, a session may be associated with a single read-through of a book 300 of an enhancement unit. An interaction log 130 may be initiated on one or more computers, for example the book enhancement device 200, the coordination server 400, and/or the computing device 600. Operation 1402 may then store a log entry (e.g., an entry 136) related to an interaction with the user 100. For example, a communication from the book enhancement device 200 to the user 100 may be logged (e.g., the playing of an audio file 114, which may include a prompt, instruction, and/or action for the user 100 to take). The communication from the user 100 to the book 300 and/or book enhancement device 200 may also be logged, for example the user 100 providing the touch signal 209, the user 100 speaking to provide a voice answer to a voice interface, etc. Entries 136 may be stored sequentially based on a timestamp 137, and/or stored in other arrangements. Operation 1404 determines whether another entry is to be made and/or another interaction incurs, in which case operation 1404 loops back to operation 1402. Otherwise, the session may end, for example by operation 1406. The session could end because the user 100 turns off the device.

The session may also end because the user 100 completes the book 300, as may be sensed by the user 100 turning to a last sheet 302 of the book 300 or completing interactions associated with the last sheet 302. However, in one or more embodiments, the session may span multiple times the user 100 may pick up, set down, turn off, and/or turn on the book enhancement device 200, or similarly mount and dismount the book 300 from the book enhancement device 200. A timer may also be defied to reset any session. For example, where a user 100 begins to read a book 300 but only gets through a few pages, the session and the associated interaction log 130 may be discarded after 3 months. The length until reset, or other parameters initiating or preventing reset, may be defined in the configuration file 104, according to one or more embodiments.

Following session completion, operation 1406 may submit the interaction log 130 for analysis, either locally on the book enhancement device 200, locally or remotely to the computing device 600, and/or remotely to the enhancement coordination server 400, according to one or more embodiments. Alternatively, or in addition, the session need not have ended in order to submit the interaction log 130 or entries thereof for analysis. For example, individual entries 136 and/or groups of entries 136 (e.g., interactions associated with a page UID 110) may be submitted as they are generated and evaluation and/or configuration adjustments made in real-time.

In one or more embodiments and the embodiment of FIG. 14, the interaction log 130 or portions thereof may be uploaded to the enhancement coordination server 400. Operation 1408 detects a session and/or new log entries 136. Operation 1410 may then upload the interaction log 130 (or entries 136 from the interaction log 130), for example to the enhancement coordination server 400.

The interaction log 130 or data thereof can then be evaluated, including for a determination that it may be beneficial to the user 100 to adjust a configuration option and/or to provide the user 100 with useful feedback and/or recommendations. Operation 1412 may then optionally load any previous interaction logs 130 that can also be utilized in this analysis (e.g., comparing a past performance on a past session with a current performance on a current session). Operation 1414 then evaluates the interaction log 130, and optionally any other interaction logs 130 loaded. The evaluation may apply rules and/or an algorithm (including machine learning algorithms) to determine useful information about the interactions of the user 100, for example if the user 100 may be struggling, succeeding too easily, getting bored, getting distracted, is confused on how to utilize the book 300 and/or book enhancement device 200, and/or other information. As one example, operation 1416 may determine if an interaction is below an interaction threshold, such as a long response time, a consistently incorrect answer on the same type of prompt across multiple pages, or the book 300 is closed too often within a short time period which may demonstrate frustration or disinterest. If activity is above the interaction threshold, operation 1416 may terminate or may loop back to operation 1408 for detection of additional entries 136. If below the interaction threshold, operation 1416 may proceed top operation 1418 which may determine whether a notification should be generated. If not, operation 1418 proceed to operation 1422. However, if a notice should be generated, operation 1418 proceeds to operation 1420 which generates and may transmit the notice. The notice may be sent to the user 100 on the book enhancement device 200 (e.g., an audio file 114 that includes a voice saying "we notice you may be having difficulty, do you want to go through the tutorial again?"). The notice may also be a performance notification to a group administrator having an administrative permission with respect to the group, for example the group set up as shown and described in conjunction with the embodiment of FIG. 13.

Operation 1422 determines whether the configuration file 104 should be automatically adjusted (or an adjustment recommended to the user 100). If not, operation 1422 may proceed to terminate, or loop back to operation 1408. Otherwise, if an automatic adjustment should be made, operation 1422 proceeds to operation 1424 which may automatically determine an adjustment for the configuration file 104. If operation 1422 is performed locally on the book enhancement device 200, the configuration option may be committed in the enhancement dataset such as the audio dataset 101. If the determination is made remotely on a server, and/or on the computing device 600, the server or the computing device 600 may transmit an instruction resulting in update of the configuration file 104, according to one or more embodiments. The change to the configuration file 104 may be, for example, changing a difficulty level 105 (that may provide more hints or explicit instructions), changing a language 106 (or setting an option so both languages play sequentially), changing a content type 107, changing an ability 108, and/or switching between default or custom content. Operation 1424 may then terminate, or loop back to operation 1408.

Figure 15:
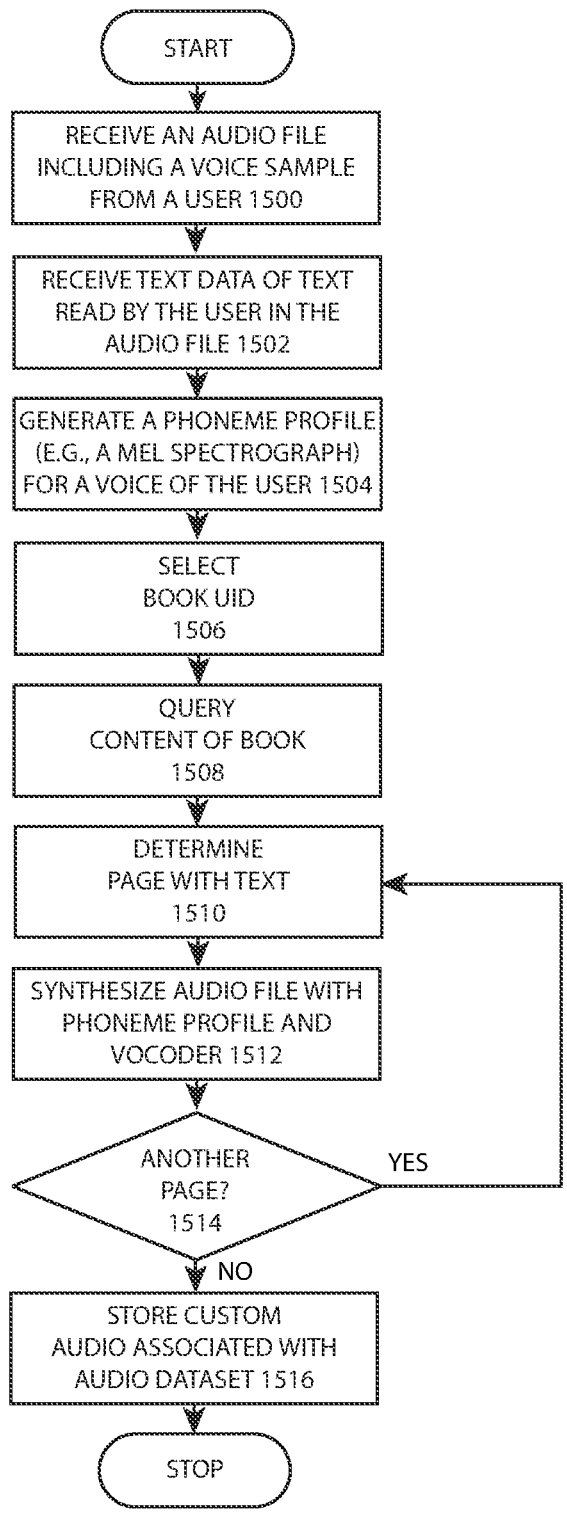
FIG. 15 illustrates a voice extension process flow enabling a user to extend their voice to be extended to other content which the user has not been recorded reading to further profile for expanded enhancement of the book, according to one or more embodiments.

FIG. 15 illustrates a voice extension process flow 1550, according to one or more embodiments. Operation 1500 may receive an audio file that includes a voice sample 601 from a user 100. For example, the user 100 may be asked to record their voice speaking a certain passage that is ideal for analysis (e.g., one containing a variety of words having a wide mix of sounds). Alternatively, or in addition, an audio file 114 that the user 100 may have recorded reading the text on a page 303 of the book 300 may be submitted, in one or more embodiments.

Operation 1502 may then receive a text data of text read by the user 100 in the audio file 114. Operation 1502 may automatically designate the text file associated with the certain passage, or may extract the text from a page 303 read by the user 100 (e.g., the text may be extracted after query to the book profile 442). Operation 1502 also may be useful, for example, if the user 100 has written their own text (e.g., for a book they are creating), and must submit a text file associated with it for optimal voice analysis.

A voice synthesis profile may then be created for the voice of the user 100, as may be stored in association with the user profile 521, and/or another enhancement unit. In one or more embodiments, the voice sample 601 may be input into a voice synthesis engine to generate a voice profile from the voice sample 601. In one or more embodiments and the embodiment of FIG. 15, the voice profile may comprise a phoneme profile. In one or more embodiments, operation 1504 may therefore generate a phoneme profile for a voice of the user 100, for example a mel spectrogram, as may be known in the art. In one or more embodiments, the voice profile may be applied to a text file (e.g., from the book text 446) to generate an audio file 114 comprising a synthesized voice.

Operation 1506 may then select a book, for example though selection of a book UID 441. Operation 1508 then queries a content of the book 300, specifically content stored in the book profile 442. Operation 1510 determines a page (e.g., a sheet 302 and/or a page 303 associated with a page UID 110) with text within the book 300, and extracts a relevant portion of the text (e.g., all or a portion of book text 446). Operation 1512 then synthesizes an audio file 114 with the phoneme profile and a vocoder, as may be known in the art. Operation 1512 then advances to operation 1514, which determines if another sheet 302 requires additional audio file 114 production, in which case operation 1514 returns to operation 1510. If all pages 303 are complete (e.g., all pages 303 for which page UIDs 110 are defined in the book profile 442), operation 1514 may proceed to operation 1515 which may store a custom audio associated with the audio dataset 101. Voice extension, as that illustrated by the voice extension process flow 1550 may allow a content creator to quickly extend their voice to other content that they wrote, may allow for a simple way for celebrities or other known voice actors to license or extend their voice over content, or may help those who have difficulty reading for long periods. For example, a grandmother may wish her voice to be extended over a much larger range of content but is only capable of generating the voice sample for extension.

Although one method of voice extension from a sample to additional content is shown and described to allow for enhancement of the book 300, it should be noted that modifications to the process may be made. One skilled in the art may also recognize additional processes and/or procedures for voice extension of a user 100 over content of the book 300, including those enabled by other machine learning and artificial intelligence applications (e.g., Resemble.AI™, Murf.ai™, Lovo AI™, Speechify™, and other similar systems and methods).

Figure 16:
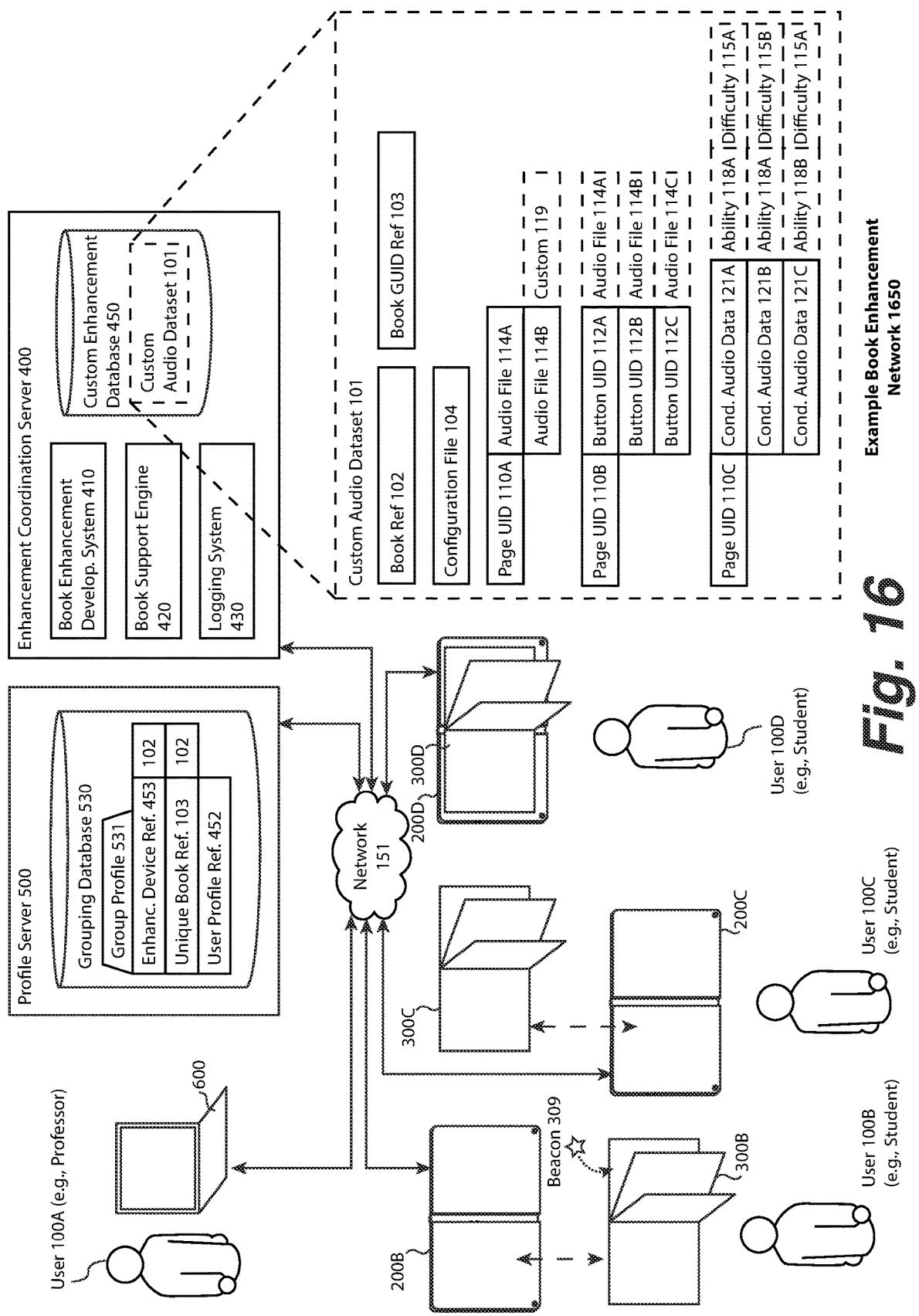
FIG. 16 illustrates an example book enhancement network in which a professor defines custom content in a workbook for a set of students organized into a learning group, each student using the book enhancement device and the book to engage in interactive learning, communicate with each other and the professor, and take interactive exams including adjustable content suitable for a wide range of learning styles and even disability accommodation, according to one or more embodiments.

An example will now be described. FIG. 16 illustrates an example book enhancement network 1650 in which a professor, shown as the user 100A, defines custom content in a workbook (the book 300) for a set of students organized into a learning group (the user 100B, the user 100C, and the user 100D), according to one or more embodiments. The professor, for example, may teach at an elementary school, a middle school, a high school, and/or a university. In the present example, a high school will be used. There may be an arbitrary number of students within the class, but for the present example three are shown for illustration.

The professor decides to teach a course with the assistance of the book enhancement device 200 and the book 300. First, the professor may decide which workbook to teach from. For example, a history workbook may be selected (e.g., the book 300). The book 300, for example, may include a combination of default content that the professor may select or assign, but may also enable the professor to define their own enhancements, pre-record their own commentary, create emphasis, add notes, and/or build their own custom assignments and tests. The book 300 may be initially associated with a default instance of an enhancement dataset, which the professor may then modify to result in the custom audio dataset 101.

In the present example, the professor may be able to inform the class that they should acquire both the book enhancement device 200 and/or the book 300 as course materials. The acquisition of these materials will now be described to demonstrate the flexibility of the learning platform, according to one or more embodiments. The third user 100D may already own a book enhancement device 200, which is registered to a user profile 521 of the user 100D, and the user 100D may also wish to order and own the book 300. The professor may therefore add the user profile 521 as an "enhancement unit" to the group profile 521. An enhancement unit may specify an entity to receive the custom content of the lesson plan. The enhancement unit may also be utilized for tracking the state of interactions, configuration options, and custom content created by the student. When a new version of the custom audio dataset 101 becomes available, the user 100D will be notified and/or a copy automatically downloaded. For example, this process may be managed by the enhancement unit synchronization routine 426 of the enhancement coordination server 400.

In contrast, the user 100C may also own their own book enhancement device 200, but may wish to check out a copy of the book 300 from the library. However, the user 100C may never have created a user profile 521. In this case, the professor may copy a device ID from the book enhancement device 200C when defining the student group. A temporary profile may be set up, and the group profile 531 may point to the temporary profile, for example through the enhancement device reference 453. The book reference 102 may also be combined with the temporary profile and/or device ID, such that the custom audio dataset 101 can be tracked and the user 100C create custom content.

Finally, the user 100B may not own their own instance of the book enhancement device 200. Instead, the user 100B may wish to rent a book enhancement device 200, or use one of several classroom-owned instances. However, in this case, the user 100B may care more about their coursework, or wish to retain their and/or the professor's custom content following the end of the course. In this case, the user 100B may purchase the copy of the book 300B. The book 300B includes at least one way to uniquely distinguish it against all other physical copies. For example, the user 100B may be able to a uniquely tracked instance of the book 300 when ordering online or purchasing from a bookstore. Alternatively, or in addition, the professor may have a set of stickers, each electronically storing a book GUID 443 that can be placed onto any instance of the book 300. For example, the sticker may be based on a near-field communication protocol and the professor may place the sticker on a first sheet 302 of the book 300 in the detection zone 290, as illustrated in FIG. 3. The professor may then add the uniquely tracked physical copy to the group profile 531 as the unique book reference 103. After the course ends, the user 100B may be able to keep the book 300B, and listen to it again if borrowing or later buying a book enhancement device 200 (and/or listen to any recorded audio through an online portal offered by the publisher).

Following setup of the class, the professor may initially configure the workbook. In one or more embodiments, the professor may be able to also use an instance of the book enhancement device 200 and book 300 as an interface to define content. However, in the present example, the professor will use specially purposed software (e.g., the enhancement application 610) running on the computing device 600, in this case a laptop computer. First, the professor may be able to bring up a digital copy of the book 300 on the application, and setup triggers for various enhancements by clicking on the digital representation. The professor may utilize the book enhancement development system 610 and/or the book enhancement development system 410 in this process. As a straightforward example, the professor may select a representation of a touch sensor 208 and define an audio recording. The book 300 may also include certain interaction indicators 358 for the professor to select to define quizzes or tests. Yet other interaction indicators 358 may be designated by the professor for the student to record any questions for the professor.

Next, the professor may be able to set initial configuration options in the configuration file 104. Many configuration options may start in a default value, for example English as a default language and a first ability 118A and difficulty 115A applicable to the majority of students. However, the professor may change some of the options, including at the student-specific level. In the present example, the user 100D may have a learning disability (e.g., dyslexia), and may have special permission or accommodation for learning support. The professor may therefore select for the user 100D to experience enhancements that are designated for a second ability level, the ability 118B. The ability 118B may allow for additional times for responses, additional attempts for tests, and/or allow for submission of questions to the professor before a response is required. The result of the modified ability 118B is further described, below.

The professor may begin the course by lecturing in a physical classroom and then assigning additional homework through the book 300. However, in one or more embodiments, the course may be taught entirely online or remotely.

The experience of using the book enhancement device 200 from the perspective of the student will now be described. A student, the user 100B, may first attach their book 300 to the book enhancement device 200. In the present example, the book enhancement device 200 may include many of the features of the example book enhancement device 250 of FIG. 2.4, including a housing 251 made from plastic or alloy, a hinge 252, a button array 256, a speaker 262, and microphone 282. Similarly, the book enhancement device 200 may be built into a form-factor that resembles a hardback book binding (e.g., ¼ inch thin, or ½ inch when "closed"). The book enhancement device 200 may include numerous components as illustrated in FIG. 2.1, for example a network interface controller 212 that includes WiFi and Bluetooth connectivity protocols. The user 100 may connect the book enhancement device 200 to a WiFi network through support of a wirelessly paired smartphone. Alternatively, or in addition, even where the book enhancement device 200 does not have its own screen and is not supported by another device, it may be able to audibly "read" through available and/or detected WiFi networks. The user 100 may then be able to enter an appropriate password or credential, for example using the button array 256 or a voice interface.

In the present example, the book 300 may be made of paper sheets 302, with a simple binding 304 of glue or staples. Visual content 305 may be printed on each page, including for example text and pictures (e.g., similar to a standard history textbook), interaction indicators 358 which can be pressed to trigger an enhancement (e.g., a historical audio file, such as a speech by a famous world leader), and other interaction indicators 358 intended to be custom enhanced by the professor and/or students.

Shortly after mounting the book 300, an indicator light may begin glowing yellow to inform the student that the book 300 is being installed, including any custom content defined by the professor. For example, computer executable instructions stored on the book enhancement device 200 may detect a book identifier such as the beacon 307 and/or the additional beacon 309. The instructions (e.g., the dataset retrieval routine 247) may then extract a unique identifier of the book, for example the book UID 441, and query an enhancement dataset for the book 300. In the present example, the custom audio dataset 101 may be queried on the enhancement coordination server 400, version checked, and then downloaded. If the processor or students make additional updates to the custom audio dataset 101, such changes may be merged and the custom audio dataset 101 stored on the book enhancement device 200 automatically updated. In one or more other embodiments, it will be recognized that the book enhancement device 200 need not download the entire enhancement dataset, but may generate a query over the network 151 each time an interaction and/or trigger is called for, which may further support real-time communications and updates among the group.

Once the custom audio dataset 101 is downloaded, the user 100B may open the book 300 to a first page 303A of a first sheet 302A (e.g., "page 1"). Here, the title of the book 300 and its editors may be printed on the page as visual content 305. In one or more embodiments, the professor may also have ordered custom printed version of the books for students with custom visual content 305, such as the name of the educational institution, a course catalog number, and/or the professor. Generally, when a user 100 opens to the first page 303A of the first sheet 302A, an audio signal may be generated from an audio file 114A that says: "A History of the Middle East. Edited by Dana Harling. Published by Aurora South Publishing Company of Austin, Texas." However, in the present example, the professor may have opted for their own greeting to the student, recorded as the audio file 114B with the custom 119 attribute. Therefore, when the student 100B turns to "page 1", an audio signal is generated instead from the audio file 114B: "Welcome to a History of the Middle East! I'm really looking forward to working with each of you. Remember, if you have any questions my office hours are Monday and Thursday."

Computer executable instructions on the book enhancement device 200 may have detected the book 300 is open and on "page 1", because no beacons 306 are detected in the detection zone 292. The book enhancement device 300 may then look up the page UID 110A, check the configuration file 104 for the status of a custom setting, and read the audio file 114B.

When the user 100B turns to a next page (e.g., the page 303B of the sheet 302A), the user 100B may see a number of interaction indicators 358, each with a blank box underneath in which the user 100B may write with a pen. Automatic instructions (triggered the first time the user 100B turns to the page) may explain that the user 100B should hold down an interaction indicator 358 to record an introduction of themselves to the class, for example by recording their name and their favorite event in history. The instructions continue to explain that, on the following day, the user 100B should return to the page. Each interaction indicator 358 will have a recorded statement by the other students (e.g., the user 100C and the user 100D). The user 100B may then listen to each statement and write the other student's name in the blank box provided below their assigned interaction indicator 358.

When the user 100B records their personal statement, it may be uploaded and added to the custom audio dataset 101, for example as the audio file 114C linked with a button UID 258A (e.g., associated with an interaction indicator 358A). The book enhancement device 200B of the user 100B may later download the audio file 114D and the audio file 114E defined by the user 100C and the user 100D, respectively.

The user 100B may then turn to the page 302B of the sheet 303C (e.g., "page 6"), which may include no enhancements, e.g., just traditional text and graphics for a student to study and read. However, the user 100B may be able to annotate, underline, and highlight text as they choose. In one or more embodiments, there may also be three subtle interaction indicators 358 along the outer margin of text for the user 100B to record audio notes if they so choose. At the bottom margin of the page, another interaction indicator 358 may be placed for recording a question for the professor. Next to this interaction indicator, yet another interaction indicator 358 may be placed for hearing a later recorded answer by the professor. If the professor's answer is available (e.g., an audio file 114 was recorded in association with the button UID 112C of the "answer" interaction indicator 358), the user 100B may be notified, for example by a feint green LED light may light up on the book enhancement device 200 when the user 100B is on the appropriate page. The question-and-answer audio may persist after the course ends, memorializing the interaction.

Next, the user 100B may turn their attention to the page 302A of the sheet 303D (e.g., "page 7"). Here, the professor may have defined a quiz that tests the student's comprehension of the previous text, or their critical thinking. In one or more embodiments, the test may include an open-ended response (e.g., the user 100 selecting an interaction indicator 358 to record their answer as an audio file 114). In one or more embodiments, the test may include a multiple choice question (e.g., with each choice selectable with a user touch 259 to one of four an interaction indicators 358). The multiple choice quiz may be implemented with one or more instances of the conditional audio data 121 associated with the page UID 110D. For example, an input data may be defined as a selection of the user 100, where the correct input data provides for an instruction to initiate a first enhancement (e.g., a "correct" chime), and an incorrect input data provides for a second enhancement (e.g., the book enhancement device 200 vibrates, but makes no sound). For brevity, the inputs and outputs are not shown in the embodiment of FIG. 16.

The custom audio dataset 101 may support different ability levels, in one or more embodiments. In the present example, the user 100B may be at a default ability level designed in the configuration file 104. In contrast, the user 100D may have a learning disability and/or have access to an academic accommodation in learning. In this case, the professor may adjust the configuration file 104 such that a different ability level applies to the user 100D. In the above multiple choice example, when the user 100D turns to the page 302A of the sheet 303D (e.g., "page 7"), the user 100D may instead provide input into the conditional audio data 121C with the ability 118B designation. For example, this may extend the allowable time limit for a response, or allow the user 100D to listen to the audio prompt multiple times in case it helps them to write it down.

Each of the students may continue to progress through the book 300, learning, interacting, communicating with each other and the professor, and/or otherwise contributing to the course using the book 300 as a natural interface.

As each student interacts with the book 300, a set of interaction logs 130 may be generated. The interaction log 130 may provide helpful insight to the professor in creating the next batch of content (e.g., Chapter 2 of the text), evaluating the performance of the students (and feedback for the professor's teaching ability), and/or providing statistical information to an educational institution or publisher (e.g., anonymized data).

The interaction log 130 and/or a state dataset 140 stored for each enhancement unit also may be utilized to help ensure that each student had a seamless experience closing the book 300 when they are finished with a study session, and just as easily opening the book 300 to pick up where they left off. For example, the student may be informed of the page number that they left off on before powering off the book enhancement device 200. The state dataset 140 and/or interaction log 130 may also record data in process (e.g., previous choices selected or interactions already completed on a page), so that previous interactions do not need to be repeated and/or choices of the user 100 cannot be later changed.

In one or more embodiments, the interaction log 130 also may be used for analysis or evaluation by the professor and/or an automated system, such as the logging system 430. In one or more embodiments, and as described in detail above, the logging system 430, may receive the interaction log 130 and evaluate its data. If not meeting a certain threshold, a notice may be automatically provided to the professor, for example on the computing device 600. The professor, for instance, may find that the user 100C is struggling with reading comprehension of long historical passages, especially where primary sources written in an older style of grammar are displayed in the text. In this case, the professor may update the configuration file 104 to adjust the difficulty that the user 100C will experience. For example, prompts may use simpler language and may have easier analytical requests. The user 100C, for example, may provide inputs to the conditional audio data 121B with the difficulty 115B, where the multiple choice question is entirely different than the one provided for the conditional audio data 121A, and/or a fewer number of choices for potential answer choices are presented (e.g., three instead of four). It should be noted that the ability level 118A may still remain at a default level: the user 100B may maintain the same time period to respond, and receive no other special accommodation. Alternatively, the logging system 430 may automatically adjust the configuration file 104, for example utilizing the configuration adjustment routine 480. As each instance of the custom audio dataset 101 is downloaded by each book enhancement device 200, its appropriate configuration as specified by the professor may be downloaded and/or set uniquely for each student, according to one or more embodiments.

As a result of one or more of the features of the example book enhancement network 1650, the professor and students may have user of a flexible learning platform. The platform may include advantages of digital convenience and flexibility while retaining the traditional qualities of paper books. An advantage may include the ability for students to communicate with each other and with the professor through a book 300 interface. An advantage may include that that users 100 may have an enhanced experience that holds their attention while reading and interacting with the book 300. Another advantage may include that the professor can both leverage default content while still being able to modify, improve, and/or supplement the default material. This level of involvement through the book interface 300, and especially voice audio, may also add a personal quality that brings the professor and students closer together. It may also foster a more open learning environment, especially for remote learning which is generally conducted through display screens (e.g., on laptops, tablets, smartphones, PC monitors, etc.). The professor may have selected this learning platform, at least in part because the book enhancement device 200 includes the benefits of defining some content digitally, but without requiring the user of screens or general technologies that may pose distractions for students. The book enhancement network 1650 may also provide valuable time-saving support for the professor, for example notifying the professor of struggling students (as identified through interaction logs 130) and/or taking automatic steps to improve the experience of the student.

In a further explanation of possible advantages, the student may also be able to keep the book 300 after the course ends, even if they return or sell their book enhancement device 200. Conversely, if the student sells the book 300, data related to the book 300 associated with the user profile 521 of the user 100 may remain stored such that the user 100 could later re-purchase the book 300 and have access to its enhancements. In another advantage, the user 100 may have flexibility in the amount of monetary investment in the learning platform, for example whether they purchase or borrow the book enhancement device 200 and/or the book 300, whether they sign up for a user profile 521, etc.

From the perspective of a company operating the enhancement coordination server 400 and/or offering the book enhancement device 200 and/or book 300, there are also numerous possible advantages. First, one or more of the above advantages for professors and students may offer a compelling set of features and capabilities that represents a valuable product and service offering in the marketplace. Second, new content (including improved versions of a textbook, different language support, new configuration options, etc.) may be able to be monetized, or provided for with a licensing and/or subscription model. The book enhancement device 200 may also provide valuable data (e.g., which can be anonymized) that can assist authors and publishers in creating more compelling and competent content. Numerous other possible advantages will be apparent to one skilled in the art.

Although the present embodiments have been described with reference to specific example embodiments, it will be evident that various modifications and changes may be made to these embodiments without departing from the broader spirit and scope of the various embodiments. For example, the various devices, engines, agent, routines, and modules described herein may be enabled and operated using hardware circuitry (e.g., CMOS based logic circuitry), firmware, software, or any combination of hardware, firmware, and software (e.g., embodied in a non-transitory machine-readable medium). For example, the various electrical structure and methods may be embodied using transistors, logic gates, and electrical circuits (e.g., application specific integrated circuitry (ASIC) and/or Digital Signal Processor (DSP) circuitry).

In addition, it will be appreciated that the various operations, processes, and methods disclosed herein may be embodied in a non-transitory machine-readable medium and/or a machine-accessible medium compatible with a data processing system (e.g., the book enhancement device 200, the enhancement coordination server 400, the profile server 500, the computing device 600). Accordingly, the specification and drawings are to be regarded in an illustrative rather than a restrictive sense.

The structures in the figures such as the engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smartphone, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the book enhancement network 150 according to the present invention will be apparent to those skilled in the art. Various aspects of the invention have been described above by way of illustration, and the specific embodiments disclosed are not intended to limit the invention to the particular forms disclosed. The particular implementation of the loyalty rewards programs may vary depending upon the particular context or application. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A book enhancement device comprising:
a housing comprising an inner surface and an outer surface,
a book coupler attached to the housing to secure a book to the housing,
a page detection sensor generating a page signal usable to determine an open page of the book,
a computer processor communicatively coupled to the page detection sensor,
an audio output device communicatively coupled to the computer processor comprising at least one of a speaker and an audio output interface,
a power source electrically coupled to the audio output device and the computer processor,
a non-transitory computer readable memory communicatively coupled to the computer processor, the computer readable memory storing:
an audio dataset comprising one or more page UIDs and one or more audio files, each of the one or more page UIDs associated with an audio file within a data structure of the audio dataset; and
an audio routine comprising computer readable instructions that when executed on the computer processor:
receive the page signal from the page detection sensor,
determine a page UID for the open page within the one or more page UIDs,
query the audio dataset for the audio file associated with the page UID, and
generate an audio signal of the audio file on the audio output device to enhance a reading experience of the book based on the open page; and
one or more touch sensors distributed on the inner surface of the housing and communicatively coupled to the computer processor,
wherein the audio dataset further comprising one or more button UIDs associated with each of the one or more page UIDs, and wherein each of the one or more audio files are associated with each of one or more button UIDs,
wherein the audio routine further comprising computer readable instructions when executed on the computer processor receive a touch signal and query the audio dataset for the audio file associated with the button UID associated with the page UID,
wherein the audio dataset comprising a contingent audio data associated with at least one of the one or more page UIDs, the contingent audio data activating the audio file upon satisfaction of a conditional,
wherein an activation condition activating the audio file comprises at least one of a sequence of two or more touch signals and a timing of one or more touch signals, and
wherein the audio routine further comprising computer readable instructions when executed on the computer processor:
query the audio dataset for the contingent audio data associated with the page UID,
detect two or more touch signals, generate an input data comprising a button UID associated with each of the two or more touch signals, pass the input data into a function evaluating the contingent audio data, determine satisfaction of the conditional, and generate an audio signal of the audio file on the audio output device to increase interactive options of the book for a user.

2. The book enhancement device of claim 1, wherein the computer readable memory further comprising a state dataset comprising at least one of a page UID of a last open page, a page UID of a previous open page, a button UID of a last button for which the touch signal was detected, a button UID of a previous button for which the touch signal was detected, an audio UID of a last instance of the audio file that was played, and an audio UID of a previous instance of the audio file that was played.

3. The book enhancement device of claim 2, further comprising:

an audio input device communicatively coupled to the computer processor comprising at least one of a microphone and an audio input interface, and a recording button communicatively coupled to the computer processor.

4. The book enhancement device of claim 3, wherein the computer readable memory further comprising a recording routine comprising computer readable instructions that when executed:

receive an activation signal from the recording button, select a page UID, wherein the page UID is detected by the page detection sensor, optionally select a button UID, wherein the button UID is detected by the one or more touch sensors, receive an audio signal of a user on the audio input device, and record a user audio file of the audio signal, the user audio file stored in the audio dataset in association with the page UID, and optionally the button UID of the page UID, and wherein the computer readable memory further comprising a custom playback subroutine comprising computer readable instructions that when executed:

switch between playback of the audio file and the user audio file.

5. The book enhancement device of claim 4, further comprising:

a hinge in the housing allowing a first portion of the inner surface to fold onto a second portion of the inner surface, a hinge switch generating an open signal when the first portion and the second portion are greater than a first angle and generating a closed signal when the first portion and the second portion at least are detected to be less than a second angle, and wherein the computer readable memory further comprising a shutdown routine comprising computer readable instructions that when executed at least one of turn off the power source and place the computer processor in a power conservation mode.

6. The book enhancement device of claim 5, wherein the computer readable memory further comprising a state storage routine comprising computer readable instructions that when executed:

detect a shutdown signal, store the state dataset, detect a startup signal, and retrieve the state dataset.

7. The book enhancement device of claim 6, wherein the computer readable memory further comprising a configuration file comprising a different page UID associated with a configuration page of the book, wherein the computer readable memory further comprising a configuration routine comprising computer readable instructions that when executed:

detect the different page UID associated with the configuration page of the book, detect the touch signal, determine the button UID associated with the touch signal, query the configuration file for a configuration option associated with the button UID, and set the configuration option of the configuration file to enable customization of the reading experience using the configuration page of the book as a user interface.

8. The book enhancement device of claim 7, wherein the computer readable memory comprising an interaction log storing a first interaction entry associated with a prompt for the user and a second interaction entry associated with a response of the user, each of the first interaction entry and the second interaction entry comprising a timestamp and from which an elapse time from the prompt to the response can be calculated.

9. The book enhancement device of claim 8, further comprising:

a window in the housing such that a visual identifier of the book is visible to the user when the book is mounted in the housing even when the hinge is closed, a data port, wherein the computer readable memory installed in the data port and is removable;

a wireless network interface controller, wherein the wireless network interface controller is at least one of a Bluetooth controller and a WiFi controller;

wherein the computer readable memory further comprising a configuration beacon subroutine comprising computer readable instructions that when executed:

detects a configuration beacon attachable to the book and automatically adjusts the configuration option of the configuration file, wherein the audio dataset comprising a book UID identifying the book, wherein the page detection sensor comprising at least one of:

a magnetic sensor detecting a magnetic ink on a page of the book, an optical sensor determining a pattern on the page of the book, a light sensor determining light input received through one or more sheets of the book, and an electronic proximity detector for detecting a beacon coupled to one or more sheets of the book, wherein the electronic proximity detector is at least one of a near-field communication (NFC) detector and a radio frequency identifier (RFID) detector, wherein the one or more touch sensors defined on a touch sensor pad having an x-axis and a y-axis forming a touch plane on the first portion of the inner surface and the second portion of the inner surface, wherein the one or more touch sensors arranged in a grid on the first portion of the inner surface and the second portion of the inner surface, and wherein the book coupler comprising a magnet.

10. A book enabling audio and interactive enhancement, the book comprising:

two or more sheets bound with a binding, each sheet of the two or more sheets including two pages, a book identifier electronically storing a book UID readable with a book detection sensor, and one or more beacons storing a page UID readable by a page detection sensor to enable detection of an open page which a user is reading or interacting to enable automatic or interactive content enhancement, wherein a beacon of the one or more beacons is assigned to the two or more sheets and two or more interaction indicators are allocated among the two or more sheets such that a page UID and button UID pairing that is unique within the book may be determined with minimal use of beacons, wherein the book identifier electronically storing a book GUID readable with the book detection sensor that uniquely distinguishes a copy of the book having a book title and a book content against other copies of the book having the book title and the book content, and wherein a page of the book further comprising a configuration indicator for receiving an attachable beacon that when detected by the book enhancement device can automatically change a configuration option of a configuration file.

11. The book of claim 10, further comprising:

a visual content on one or more pages of the book comprising one or more interaction indicators for receiving a touch input of a user, wherein an interaction indicator of the one or more interaction indicators positioned on the page for communicative coupling with a touch sensor of a book enhancement device.

12. The book of claim 11, further comprising:

one or more magnets attached to a sheet of the two or more sheets configured to couple to a magnet of the book enhancement device while still enabling flexing of the sheet of the two or more sheets.

13. The book of claim 12, wherein the magnet is a magnetic strip that is embedded in a first sheet of one or more sheets of the book such that that the magnetic strip is hidden from view and the book remains softback when uncoupled from the book enhancement device.

14. A method for electronically enhancing a book, the method comprising:

selecting a page UID of a page of the book that comprises a beacon physically coupled to the page of the book;

selecting a button UID associated with an interaction indicator visible to a user on the page of the book;

receiving a first audio signal;

storing an audio file of the first audio signal;

generating an audio dataset associated with a book UID on a non-transitory computer readable memory;

associating within the audio dataset the page UID, the button UID, and the audio file such that the book can be sound enhanced when the user turns to the page associated with the page UID and selects an interaction indicator associated with the button UID;

selecting the page UID of the page of the book;

selecting the button UID associated with the interaction indicator;

receiving a second audio signal;

storing an audio file of the second audio signal;

associating within the audio dataset the page UID, the button UID, and the audio file of the second audio signal such that the book can be alternatively enhanced when the user turns to the page associated with the page UID and selects the interaction indicator associated with the button UID; and storing within a configuration file data specifying the audio file of the first audio signal and the audio file of the second audio signal, wherein the audio file of the first audio signal comprising at least one of a first language, a first difficulty level, and a first content type, and wherein the audio file of the second audio signal comprising at least one of a second language, a second difficulty level, and a second content type.

15. The method of claim 14, further comprising:

generating an interaction log comprising the book UID;

detecting a first touch signal of the user; and generating an interaction entry comprising an elapse time from a previous instance of a touch signal.

16. The method of claim 15, further comprising:

storing within a configuration file data specifying the audio file of the first audio signal and the audio file of the second audio signal.

17. The method of claim 16, wherein the audio file of the first audio signal comprising a default content, and wherein the audio file of the second audio signal comprising a custom content.

18. The method of claim 14, further comprising:

selecting a second button UID associated with a second interaction indicator visible to a user on the page of the book; and defining a function comprising a first input that is a first button UID and a second input that is the second button UID, the function upon satisfaction of a conditional outputting an audio execution command for generation of an audio signal of the audio file on an audio output device to enhance complex interaction with the book.

19. The method of claim 15, further comprising:

comparing one or more interaction entries of the interaction log;

determining the interaction entry is less than an interaction threshold; and automatically updating a configuration file data such that the audio file of the second audio signal is played when a second touch signal is received to automatically adjust a first difficulty level to a second difficulty level to improve an enhanced reading experience of the user.

20. The method of claim 19, further comprising:

generating a book GUID and embedding the book GUID in a book identifier electronically readable by a book detection sensor;

storing at least one of a second audio file and the configuration file data on a server in association with the book GUID;

detecting mounting of the book in a book enhancement device;

determining the book GUID is absent from a computer readable memory of the book enhancement device;

generating a content request for a custom content associated with the book; and downloading to the computer readable memory of the book enhancement device at least one of the second audio file and the configuration file data from the server over a network to enable the custom content to be transferred with the book between book enhancement devices.

* * * * *